(12) United States Patent
Smith et al.

(10) Patent No.: US 9,621,663 B2
(45) Date of Patent: *Apr. 11, 2017

(54) SYSTEMS AND METHODS FOR ASSESSING AN ASSET'S CONTRIBUTIONS TO THE SOCIAL MEDIA PERFORMANCE OF A PEER GROUP

(71) Applicant: Share Rocket, Inc., Carrollton, TX (US)

(72) Inventors: Scott H. Smith, Dallas, TX (US); Christopher E. Kracht, Carrollton, TX (US); David Flaxman, Chevy Chase, MD (US); Michael Ostman, Westford, MA (US); Blair Lazuka, Lunenburg, MA (US)

(*) Notice: Subject to any disclaimer, the term of this patent is extended or adjusted under 35 U.S.C. 154(b) by 249 days.

This patent is subject to a terminal disclaimer.

(21) Appl. No.: 14/284,457

(22) Filed: May 22, 2014

(65) Prior Publication Data

US 2014/0258408 A1  Sep. 11, 2014

Related U.S. Application Data

(63) Continuation of application No. 14/259,787, filed on Apr. 23, 2014.

(Continued)

(51) Int. Cl.
*H04L 29/08* (2006.01)
*G06Q 50/00* (2012.01)
(Continued)

(52) U.S. Cl.
CPC .......... *H04L 67/22* (2013.01); *G06F 17/3053* (2013.01); *G06F 17/30064* (2013.01);
(Continued)

(58) Field of Classification Search
CPC .......... G06F 17/30064; G06F 17/3053; G06F 17/30551; G06Q 30/0201; G06Q 50/01; H04L 67/22; H04L 67/306
See application file for complete search history.

(56) References Cited

U.S. PATENT DOCUMENTS

| | | | |
|---|---|---|---|
| 2010/0121849 A1* | 5/2010 | Goeldi | G06Q 10/00 707/736 |
| 2014/0059495 A1* | 2/2014 | Klaus | G06Q 10/105 715/841 |

(Continued)

*Primary Examiner* — Arvin Eskandarnia
*Assistant Examiner* — Gil H. Lee
(74) *Attorney, Agent, or Firm* — Apex Technology Ventures, LLC

(57) ABSTRACT

Described herein are systems and methods for assessing an asset's contributions to the social media performance of a peer group and comparing those contributions against those of other peer group members. In particular, the performance of one or more social media profiles associated with a peer group comprising the asset may be assessed. Share assessments may be made as to a share or a portion of the social media performance of the peer group that may be attributable to the asset. Similar assessments may be made with respect to other entities belonging to the peer group. The peer group members, including the asset, may then be ranked in accordance with their contributions to the peer group's social media performance. Peer groups may be customized or dynamically defined by a user such that the share assessments may be used to accurately benchmark assets against their peers and/or develop best practices.

18 Claims, 17 Drawing Sheets

Related U.S. Application Data

(60) Provisional application No. 61/906,167, filed on Nov. 19, 2013.

(51) Int. Cl.
*G06Q 30/02* (2012.01)
*G06F 17/30* (2006.01)

(52) U.S. Cl.
CPC ... *G06F 17/30551* (2013.01); *G06Q 30/0201* (2013.01); *G06Q 50/01* (2013.01); *H04L 67/306* (2013.01)

(56) References Cited

U.S. PATENT DOCUMENTS

| | | | | |
|---|---|---|---|---|
| 2015/0006248 A1* | 1/2015 | Li | G06Q 30/0202 | 705/7.31 |
| 2015/0032504 A1* | 1/2015 | Elango | G06Q 30/0201 | 705/7.29 |
| 2015/0066948 A1* | 3/2015 | Carlton | G06F 15/17306 | 707/748 |
| 2016/0036939 A1* | 2/2016 | Freund | H04L 67/306 | 709/204 |

* cited by examiner

SYSTEMS AND METHODS FOR ASSESSING AN ASSET'S CONTRIBUTIONS TO THE SOCIAL MEDIA PERFORMANCE OF A PEER GROUP

This is a continuation application of U.S. patent application Ser. No. 14/259,787, filed Apr. 23, 2014, and claims the benefit of priority to U.S. Provisional Patent Application No. 61/906,167, filed Nov. 19, 2013, both of which are expressly incorporated herein by reference.

FIELD OF THE DISCLOSURE

The embodiments relate generally to systems and methods for collecting, analyzing, assessing, and displaying an entity's social media performance and, more specifically, systems and methods that assess an entity's social media performance with respect to other entities within the same peer group, organization, or industry.

BACKGROUND

With the proliferation of social media networks and individual user's propensity to endorse, share, or otherwise express opinions regarding social media content, there is an ever-growing volume of valuable data that can be used to analyze or otherwise derive the general significance, influence, and impact surrounding such content. Moreover, individual user's interactions with social media content can provide insights relevant to the entities that author or place the content (either directly or through subsidiaries/contractors/employees/etc.).

The advertising industry is over a trillion dollar per year industry with an ever-growing focus on online advertising and social media content. Marketers and brands are constantly trying to optimize existing ad campaigns and look for new ways to reach potential customers. Moreover, businesses and their agents/personnel are actively engaging in social media, attempting to elevate their public profile, drive consumer traffic, and influence the public's behavior and opinions. Gathering data associated with social media content and deriving insights therefrom is therefore of chief importance.

In response to this need, many systems and methods have been developed to gather, analyze, and transform the vast quantity of social media data that is available through the various social media platforms such that the data can be placed in a form useful to the entities responsible for authoring, buying, and placing social media content items. Among other things, entities placing content within social media platforms are interested in learning if the content is reaching its target demographic, whether that target demographic is interacting with the content, and whether the entities' online efforts are having an impact on consumer behavior. To this end, systems and methods have been developed to assess social media marketing efforts and convey information that can be used by marketers or brands to make decisions going forward.

These systems and methods, however, fail to deliver valuable insights with respect to how an individual's or entity's social media performance may compare to its peers, who is most effective at creating consumer interaction, and what entities most efficiently engage with the public over today's various social media platforms. The known systems and methods for assessing online marketing campaigns also lack adequate techniques for comparing one entity versus another, or one industry versus another. Nor do they account for the intra-organizational or intra-industry impact that one entity's social media activity may have on another entity. Rather, advancements in known systems and methods have primarily focused on expanding the quantity of data gathered and analyzed, identifying those social media users wielding the most influence among a demographic, and assessing a sentiment associated with discrete social media content items and/or users.

Accordingly, systems and methods could benefit from improved devices and techniques for analyzing social media data and transforming that data to facilitate a holistic assessment of an entity's social media activity. Moreover, improved device and techniques are needed to facilitate side-by-side comparisons of social media performance across a peer group, within an organization, across an industry, or across multiple industries.

SUMMARY OF THE DISCLOSURE

In accordance with certain embodiments of the present disclosure, systems and methods for analyzing social media data, assessing various aspects of social media performance, comparing the social media performance of a plurality of entities within a peer group, and displaying useful information to users in a comprehensive and/or intuitive fashion are disclosed. In one aspect, social media data can be analyzed in the context of peer groups such that assessment, scoring, ranking, and/or best practices empirical data can be derived therefrom. This data may then drive transformation and investment efforts with respect to social media activity, advertising, marketing, and all other spending efforts within the context of a competing set of industries, markets, brands, organizations, or individuals. Peer groups may be defined in a number of ways and may comprise an industry, an organization, a trading area, and/or a group of user-selected or predetermined entities or individuals. The peer groups may further span across similar entities within an industry, a subset of entities within an industry, a plurality of industries, and/or any other relevant boundaries of competitive forces.

In another aspect, the system may comprise a method for assessing an entity's social media performance across one or more social media platforms in light of, among other things, subject matter, market size, geographic considerations, time constraints, vertical goodwill, and/or horizontal goodwill. In some embodiments, vertical goodwill may reflect the impact that an entity's social media performance attributed to, or influenced, the performance of other entities belonging to a different tier within the same peer group, organization, industry, or hierarchy. Horizontal goodwill, on the other hand, may reflect the impact that an entity's social media performance attributed to, or influenced, the performance of other entities belonging to a common tier within the same peer group, organization, industry, or hierarchy.

In another aspect, systems and methods of the present disclosure may facilitate comparing an entity, such as a brand, organization, sub-brand, affiliate, individual, or subset of individuals, against similarly situated entities within a peer group.

In a further aspect, any insights, assessments, and comparisons performed in conjunction with the systems and methods disclosed herein may be used to benchmark entities with respect to their competition and/or develop best practices. In one embodiment, benchmarking and/or best practices may be qualitatively and/or quantitatively based, at least in part, on empirical statistical data and analysis within an industry, across an industry, or across a peer group.

Moreover, systems and methods described herein may comprise a user interface for displaying social media performance and assessment information pertaining to one or more entities. In some embodiments, in addition to performance and assessment information, the user interface may communicate information for comparing an entity's performance to one or more other entities within a peer group. The user interface may also present ranking information pertaining to an entity's performance relative to the peer group, social media platform information. In one embodiment, peer groups may be customizable within the interface using one or more filters for further defining or refining the presented information. For example, filters may comprise one or more of an industry filter, a tier filter, a geographic filter, a temporal filter, a subject matter filter, a market size filter, a demographic filter, and a social media platform filter.

In another aspect, the user interface may be configured to display information pertaining to one or more entities within a tier of a peer group, organization, brand, or industry, including competing industry participants, sub-brands, peer groups, and individuals. Alternatively or additionally, the user interface may be configured to display multi-tier performance assessment information. For example, the interface may simultaneously display data pertaining to entities spanning a plurality of tiers within a peer group, organization, brand, or industry.

Additional objects and advantages of the present disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are illustrative and explanatory only and are not restrictive of the claims.

The accompanying drawings, which are incorporated in and constitute a part of this specification, illustrate several embodiments and together with the description, serve to explain the principles of the disclosure.

DESCRIPTION OF THE EMBODIMENTS

Disclosed herein are various embodiments of a system for collecting, evaluating, transforming, and displaying social media assessment and performance information. In one aspect, the system may gather data associated with an entity from one or more social media platforms. The system may further collect data pertaining to other entities within the entity's peer group, organization, and/or industry. The collected data may then be analyzed to derive assessment information indicative of the entity's social media performance and, in some embodiments, to directly compare the performance of the entity to that of other entities.

In another aspect, the assessment of an entity's social media performance may take into account the social media performance of related entities. For example, the social media performance of an entity may be positively or negatively impacted by the social media performance of one or more other entities within the entity's peer group, organization, or industry, including entities belonging to different hierarchical tiers within the entity's organization or industry.

The systems and methods disclosed herein can also be used to derive industry benchmarks and/or best practices for an individual, peer group, organization, industry, or industry subset.

While the systems and methods described herein are primarily concerned with gathering and analyzing data from social media platforms, one skilled in the art will appreciate that the systems and methods described below can be used in other contexts, including the analysis of data gathered from any number of sources such as privately maintained databases or public sources accessible via the Internet.

Reference will now be made in detail to certain illustrative embodiments, examples of which are illustrated in the accompanying drawings. Wherever possible, the same reference numbers will be used throughout the drawings to refer to the same or like items.

Figure 1:
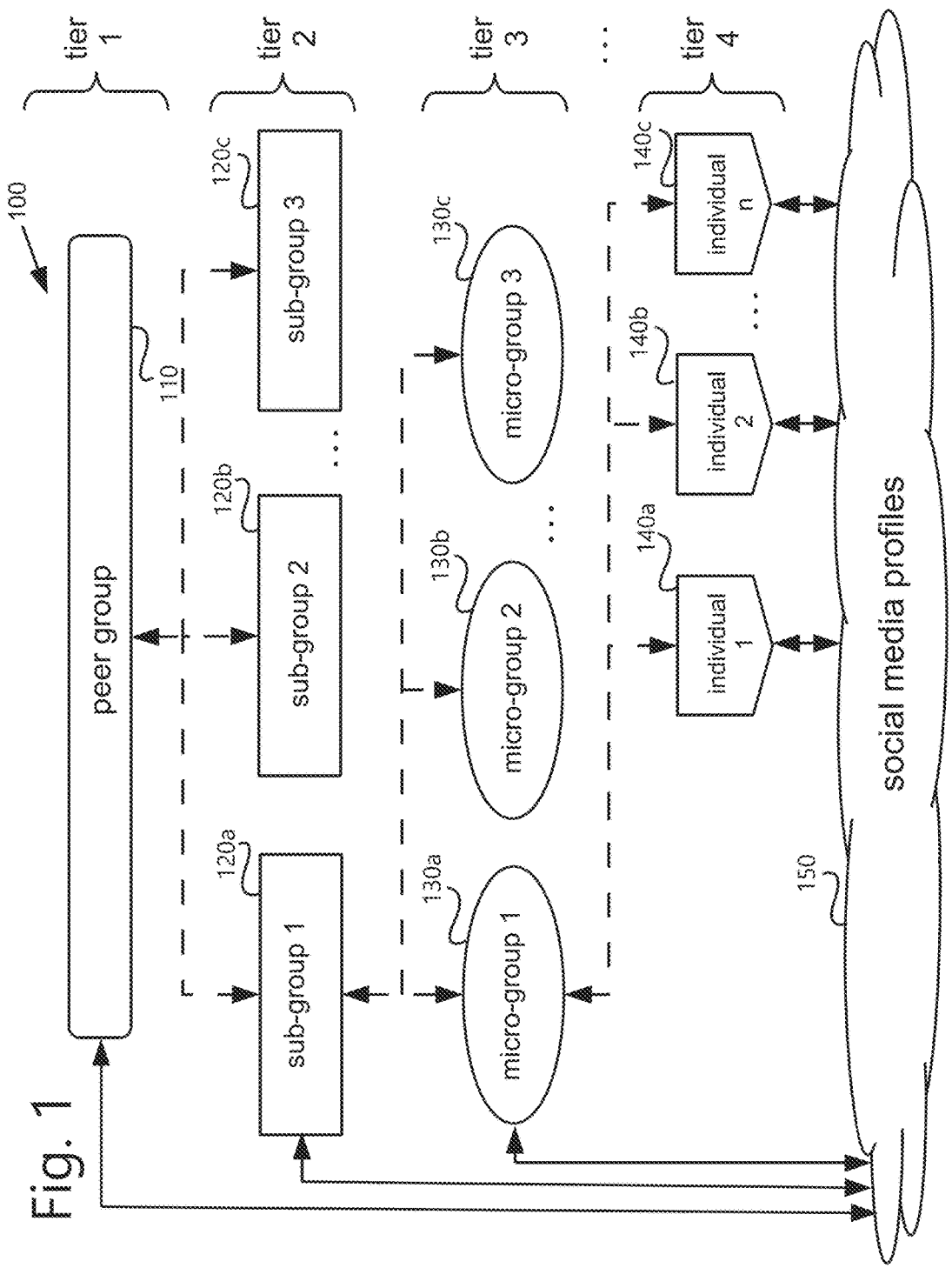
FIG. 1 depicts some aspects of an illustrative embodiment of a system as described herein.

FIG. 1 depicts one illustrative embodiment of a hierarchical structure 100. In one aspect, hierarchical structure 100 may comprise a plurality of vertical tiers, each tier representing one or more subsets or groupings within the hierarchy. In another aspect, the first tier may represent a peer group. The peer group may comprise one or more assets sharing one or more common traits. The first tier of a peer group may be the highest level, broadest, or most encompassing subset or group within the hierarchy, i.e., peer group 110 at the first tier may comprise every asset within the hierarchical structure. Each subsequent tier may comprise progressively narrower groups or subsets of entities than the previous tier and/or represent one or more subsets of the entities belonging to the previous tier in the hierarchy. As depicted in FIG. 1, hierarchical structure 100 may comprise four vertical tiers. In other embodiments, however, structure 100 may comprise fewer or additional tiers.

As used herein, an "asset" is meant to describe any entity, the social media performance of which is to be assessed, scored, and/or presented. As shown in FIG. 1, an asset may comprise any entity, including but not limited to, an organization, a profession, a brand, a network, an industry, a sub-organization, a sub-brand, an affiliate, a department, a section, a program, an employee, a contractor, an individual, etc. Thus, structure 100 may comprise one or more tiers, each tier comprising one or more assets, the assets becoming more narrowly defined at each successive tier.

In one illustrative embodiment, peer group 110 (the highest tier in structure 100) may be a television network. In such an embodiment, the tier 2 assets, i.e., sub-groups 120a, 120b, 120c, may represent one or more subdivisions within network 110. For example, tier 2 may comprise one or more affiliate television stations 120a, 120b, 120c, each associated with network 110 of tier 1. The tier 3 assets, i.e., micro-groups 130a, 130b, 130c, in turn, may represent one or more subdivisions encompassed by at least one asset of tier 2. For example, the tier 3 assets may comprise one or more television programs 130a, 130b, 130c, each associated with affiliate 120a of tier 2. Likewise, the tier 4 assets may comprise one or more subdivisions encompassed by at least one asset of tier 3. Continuing with this particular example, the tier 4 assets may comprise one or more individuals or television personalities 140a, 140, 140c, each associated with program 130a of tier 3.

Of course, this is only one example of peer group 110 and structure 100. In another example, peer group 110 may comprise one or more members of a profession such as television personalities. In such an embodiment, the tier 2 assets may represent subdivisions of the television personalities based on subject matter. For instance, asset 120a may be news anchors, asset 120 may be weather forecasters, asset 120c may be reporters, etc. Continuing with this example, tier 3 assets may be further refined subsets of each tier 2 asset and/or may be subdivided based on market size or geographic territory. Tier 4 assets may then, in one embodiment, represent the individual television personalities.

It should be noted, however, that each asset within a particular tier may not be associated exclusively with a corresponding asset of the next highest tier. In other words, though FIG. 1 depicts micro-group 130a of tier 3 as being associated with sub-group 120a of tier 2, that may not exclude the possibility that micro-group 130a of tier 3 may also be associated with sub-group 120b or 120c of tier 2. Similarly, though FIG. 1 depicts individual 140a of tier 4 as associated with micro-group 130a of tier 3, that does not exclude the possibility that individual 140a of tier 4 may also be associated with micro-group 130c of tier 3. Going one step further, it also does not exclude the possibility that an asset of tier 4 may be associated with multiple tier 2 assets. In other words, individual 140a of tier 4 may be associated with sub-group 120a of tier 2 as well as sub-group 120b of tier 2. In fact, any asset associated with peer group 110 at any tier may be associated with any other asset in hierarchical structure 100. Moreover, any asset associated with peer group 110 may also be associated with another peer group entirely (not depicted).

While the aforementioned examples describe peer group 110 (the highest tier in structure 100) as a television network or a profession, it should be understood that peer group 110 may represent any asset comprising one or more subsets of assets. For example, peer group 110 may be, among other things, an industry, market, organization, corporate entity, brand, business, or any subdivision thereof. The next tier of assets may comprise one or more subdivisions of the peer group. For example, where peer group 110 may be an organization, the next tier of assets may be one or more entities at least partially operated by, controlled by, supervised by, advised by, funded by, or otherwise associated with the peer group. This tier of assets may include, among other things, any division, department, franchise, affiliate, sub-brand, branch, or other entity that may be considered on a second, intermediate, or otherwise lower organizational tier than the peer group 110. The same may be true for each subsequent tier of structure 100. Again, these examples are not meant to encompass all embodiments. Rather, they are only illustrative of the possibilities and presented to afford one of skill in the art a framework within which to understand the systems and methods described herein.

In addition to each asset within structure 100 having an association with one or more tiers and/or other assets within the structure, each asset within each tier of structure 100 may be associated with one or more social media profiles 150. For example, one or more assets of structure 100 may be associated with one or more of a FACEBOOK, TWITTER, LINKEDIN, or INSTAGRAM profile. Profiles 150 may represent a social media presence on one or more social media platforms and may be used to, among other things, communicate announcements, politicize events, advertise products, disseminate news stories, or otherwise reach customers, consumers, or the public.

In one aspect, each asset within peer group 110 may have one or more social media profiles for which it may be directly responsible for placing content and/or engaging with the public. For example, each of peer group 110, sub-groups 120a, 120b, 120c, micro-groups 130a, 130b, 130c, and individuals 140a, 140b, 140c may have control over, or be responsible for maintaining, one or more respective social media profiles. Thus, when assessing the social media performance of an asset within structure 100, information from the one or more social media profiles controlled or maintained by the asset may be collected, analyzed, scored, and/or presented.

In some embodiments, however, when assessing the social media performance of an asset, information may be collected not only from those social media profiles controlled or maintained by that asset, but information may be collected from one or more social media profiles controlled or maintained by other assets within or outside of structure 100. For example, assessing the social media performance of asset 120a of tier 2 may involve collecting information associated not only with the social media profile(s) controlled or maintained by asset 120a, but also social media profile(s) controlled or maintained by other assets, such as assets 130a, 140a, 140b, and 140c. In this manner, an assessment of the social media performance of each asset within hierarchical structure 100 may take into account the contributions, positive or negative, of other related assets within the same structure or peer group.

In a further embodiment, and as described in more detail below, as one or more assets and/or social media profiles are entered into an assessment system such as, for example, the system depicted in FIG. 4, each asset may be associated with one or more social media profiles. The one or more assets may be entered into the assessment system manually (e.g., by a user) or in an automated/programmatic fashion. As discussed above, the social media profiles associated with each asset may or may not be directly controlled or maintained by the respective asset. In fact, any asset may be associated with any social media profile in structure 100 or other social media profile in the system. In alternative embodiments, rather than the one or more assets being associated with one or more social media profiles at the time that the assets are entered into the assessment system, the assets may be associated with the one or more social media profiles at some time after the assets are entered into the system. In further embodiments, the social media profiles associated with any one or more assets entered into the system may be updated to add, subtract, or substitute social media profiles.

In another aspect, and as described in more detail below, the weight afforded each social media profile to be included in an assessment of a particular asset's social media performance, or the weight afforded information collected with respect to each social media profile to be included, may be adjusted based, at least in part, on a relationship between that asset and the asset having control over the respective social media profile. For instance, in an embodiment in which asset 130a may represent a television program and asset 140a may represent a television personality appearing on the television program, and when assessing the social media performance of asset 130a, information collected from one or more social media profiles directly controlled or maintained by asset 130a may be weighted heavier than information collected from one or more social media profiles directly controlled or maintained by asset 140a. Similarly, the information collected from the one or more social media profiles directly controlled or maintained by asset 140a may be weighted heavier than information collected from one or more social media profiles directly controlled or maintained by asset 130b, which, in this embodiment, may be another television program airing in a time slot adjacent to asset 130a. Of course this is only one example of how one or more social media profiles may be considered and/or weighted when assessing the social media performance of an asset and is not meant to exclude other suitable possibilities for incorporating and/or variably weighting information associated with one or more social media profiles when assessing the social media performance of an asset.

By taking into consideration the social media profiles of related assets within structure 100, the social media performance assessment of each asset may reflect both vertical and horizontal goodwill garnered from related assets within the peer group, however that peer group is defined. As used herein, the term "vertical goodwill" may be used to describe the effect that an asset's social media performance benefited, hindered, or otherwise influenced the performance of other assets belonging to a different tier within the same structure 100. "Horizontal goodwill," on the other hand, may be used to describe the effect that an asset's social media performance benefited, hindered, or otherwise influenced the performance of other assets belonging to a common tier within structure 100.

Figure 2:
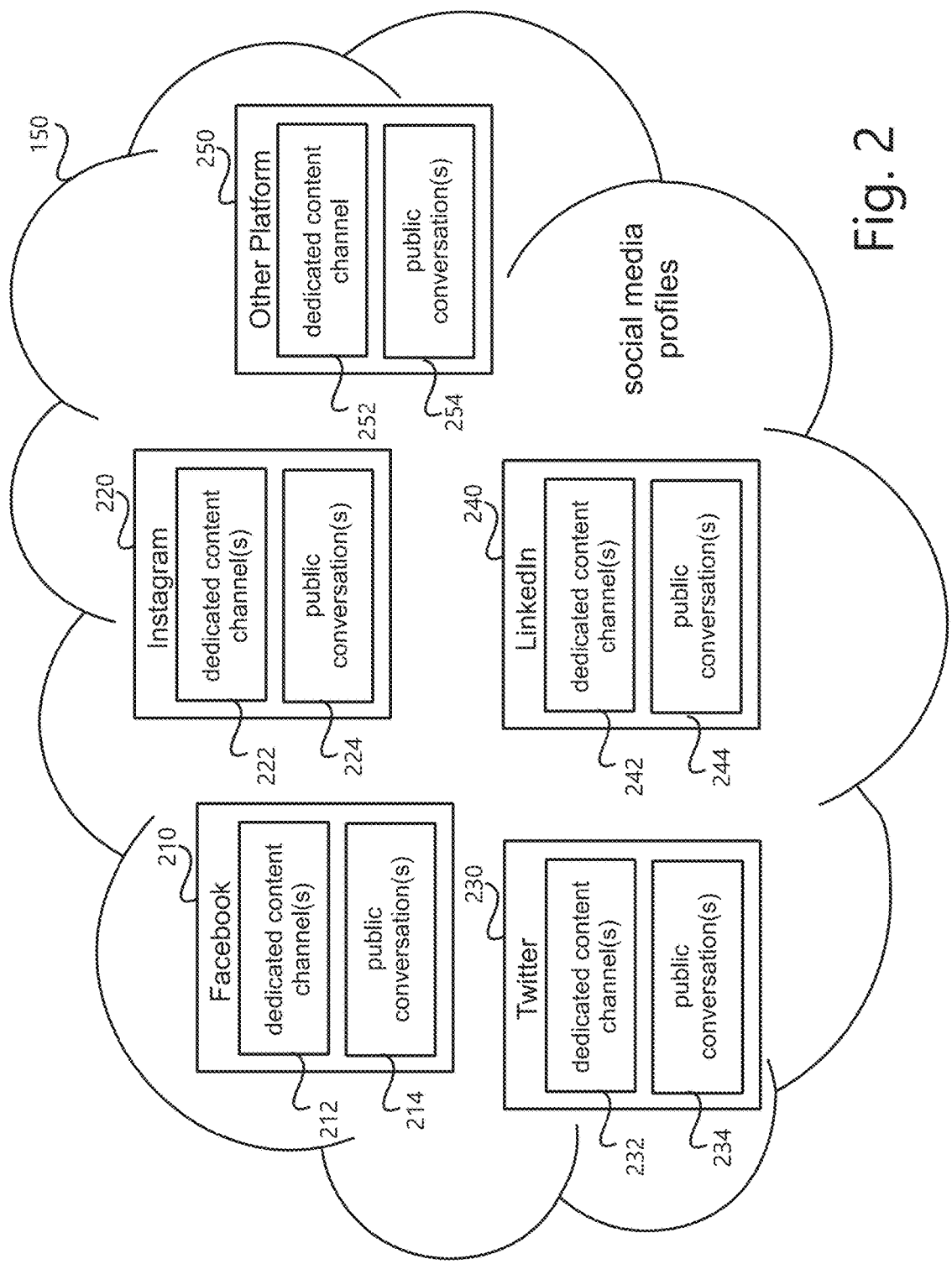
FIG. 2 depicts some aspects of an illustrative embodiment of a system as described herein.

FIG. 2 depicts an illustrative embodiment of one or more social media profiles, such as social media profiles 150 of FIG. 1. In one aspect, social media profiles 150 may comprise a plurality of social media platform-specific profiles, each maintained by a respective entity. The platform-specific profiles may comprise data indicative of the social media presence of the respective entity with the platform. In one embodiment, the platform-specific profiles, each controlled or maintained by a respective entity, may comprise data indicative of activity taking place on one or more social media platforms. Such data may include, but is not limited to, information associated with the placement of content on each platform by the respective entity, information associated with the placement of content by other members of the respective social media platform, information associated with other members' engagement of the entity and/or content placed by the entity, and/or information indicative of relationships between any two or more entities within the respective platform.

For example, social media profiles 150 may comprise a FACEBOOK social media profile 210, an INSTAGRAM social media profile 220, a TWITTER social media profile 230, a LINKEDIN social media profile 240, and/or other social media profiles 250. It should be noted, however, that social media profiles 210, 220, 230, 240, and 250 may only be representative of the possibilities. Social media profiles 150 may comprise any number of social media profiles, across any number of social media platforms, each profile being maintained by an asset within or outside of structure 100. In one embodiment, each asset of structure 100 may maintain each of a FACEBOOK, INSTAGRAM, TWITTER, and LINKEDIN profile. In other embodiments, one or more assets of structure 100 may maintain additional, fewer, or alternative profiles. In other words, social media profiles 150 may comprise the social media profiles maintained by any entity within or outside of structure 100, regardless of social media platform. In one embodiment, social media profiles 150 may comprise every social media profile of every social media platform, or some subset thereof. Moreover, any or all of the social media profiles may comprise the aforementioned data indicative of the social media presence of one or more entities with respect to a particular social media platform.

In another aspect, one or more of the social media profiles may comprise one or more dedicated content channels. In one embodiment, profile 210 may comprise one or more dedicated content channels 212, profile 220 may comprise one or more dedicated content channels 222, profile 230 may comprise one or more dedicated content channels 232, profile 240 may comprise one or more dedicated content channels 242, and profile 250 may comprise one or more dedicated content channels 252. In a further embodiment, a dedicated content channel may comprise a webpage, profile page, newsfeed, or communication channel controlled or maintained by the entity that controls or maintains the respective profile. The asset may also have an amount of control or a level of autonomy with respect to content disseminated through the dedicated content channel, including content originating from the asset and/or content originating from another member of the respective social media platform.

In a further aspect, any or all of the social media profiles may comprise one or more public conversations communicated over the respective social media platform. In one embodiment, social media profile 210 may comprise one or more public conversations 214, social media profile 220 may comprise one or more public conversations 224, social media profile 230 may comprise one or more public conversations 234, social media profile 240 may comprise one or more public conversations 244, and social media profile 250 may comprise one or more public conversations 254. In a further embodiment, a public conversation may be included within a social media profile where, for example, the asset responsible for controlling or maintaining the profile (or an affiliated entity, asset, etc.) is the subject of the conversation, is mentioned in the conversation, or the conversation relates to a subject matter in which the asset is interested, involved, or otherwise associated with. Of course, these are only examples of the types of public conversations that may be included within a social media profile and should not be considered exhaustive of the possibilities. Any suitable criteria for classifying a public conversation within a social media profile may be implemented and used in conjunction with this disclosure.

In one embodiment, public conversations may be initiated by the asset that controls or maintains the profile or by another asset within any tier of the structure. Alternatively, public conversations may be initiated without any such asset's involvement, e.g., initiated by a member of the respective social media platform that is unaffiliated with peer group 110, initiated by a member of the public, or initiated by some other entity related or unrelated to one or more assets within a hierarchical structure. In a further aspect, and regardless of the entity responsible for initiating the public conversation, the asset that controls or maintains the respective profile, or an asset within the peer group 110, may take part, or engage, in the public conversation or it may not.

Figure 3:
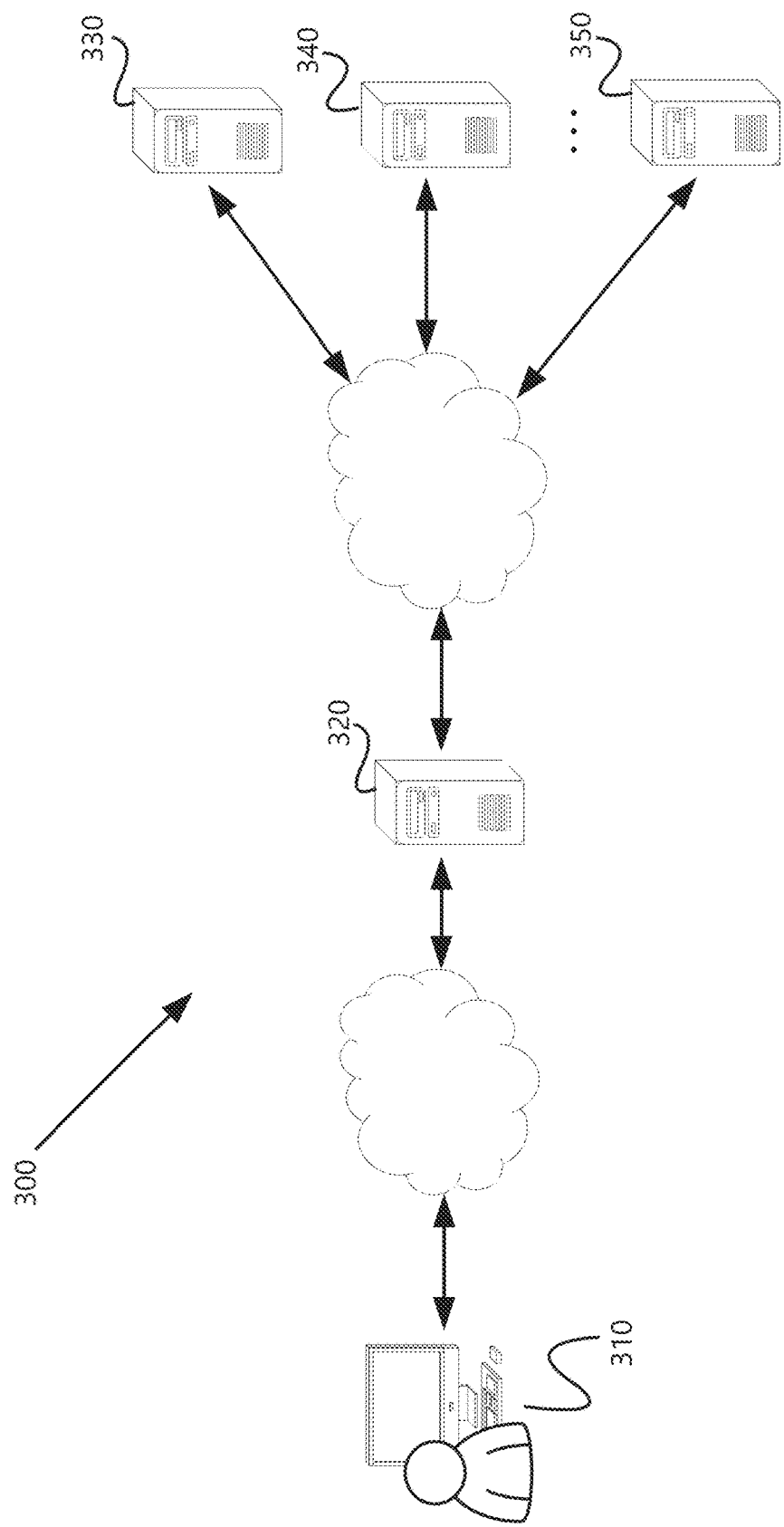
FIG. 3 depicts some aspects of an illustrative embodiment of a system as described herein.

FIG. 3 depicts an environment 300 for facilitating the collection, analysis, assessment, and presentation of social media performance information over a network, such as the Internet. In one aspect, environment 300 may comprise an end user device 310, a host server 320, and a plurality of social media servers 330, 340, 350. In one embodiment, host server 320 may be in communication with user device 310 and/or social media servers 330, 340, 350 via the Internet. In other embodiments, host server 320 may be in communication with user device 310 and/or social media servers 330, 340, 350 via any one or more suitable communication channels, including but not limited to, wireless networks, wired networks, and/or networks comprising wireless and wired components.

In another aspect, end user device 310 may be a personal computer. In other embodiments, user device 310 may be a smart phone, a tablet, a smart television, or any other processor-based or controller-based computing device.

In a further aspect, host server 320 may comprise, or otherwise be in communication with, one or more host databases (not depicted in FIG. 3). The one or more host databases may be maintained separate from host server 320 so that server 320 may more fully utilize its processing power. Alternatively, any or all host databases may be integrated with server 320. Moreover, information stored within any or all host databases may be duplicated across the one or more databases or distributed between them.

Host server 320 may autonomously communicate with social media servers 330, 340, 350, each corresponding to a social media platform such as FACEBOOK, TWITTER, LINKEDIN, or INSTAGRAM, to name a few. In one embodiment, host server 320 may communicate with social media servers 330, 340, 350 via one or more Application Programming Interfaces ("APIs"). Social media servers 330, 340, 350 may be publically accessible or they may be privately maintained and/or require credentials to access. Further, each social media server may be in communication with one or more respective databases. As described above with respect to host server 320, each of the respective databases may be maintained separate from its associated social media server, or integrated therewith. In one embodiment, one or more of social media servers 330, 340, 350 (and their respective databases) may gather and record member activities, statistics, and information in conjunction with members' engagement with the associated social media platforms. In one embodiment, the respective databases may be updated with member activity information in real-time, or they may be periodically updated at predetermined intervals.

In another aspect, host server 320 may be configured to access social media servers 330, 340, 350, and their respective databases, via the respective APIs. Host server may further be configured to collect a portion or all of the information contained in the respective database of each social media server. In this manner, all of the information available in each social media server/database may be collected by host server 320 and stored in the host database (s) for analysis, assessment, presentation, and/or recall. Access to the social media servers and their respective databases by third parties such as host server 320 may be permitted in an unfettered fashion (for example, all data may be made available in real-time) or meted out in accordance with one or more restrictions imposed by the respective social media platforms (for example, limits on the quantity of data available for retrieval within a predetermined period of time or restrictions as to what information is made available to third parties).

Though user device 310, host server 320, and social media servers 330, 340, 350 are each depicted as single servers/devices for simplicity, it should be appreciated that one or more of these components may actually comprise a distributed network comprising a plurality of servers/devices. Moreover, while FIG. 3 depicts only one user device 310 and three social media servers 330, 340, 350, environment 300 may comprise additional users and user devices, as well as more or fewer social media servers.

Figure 4:
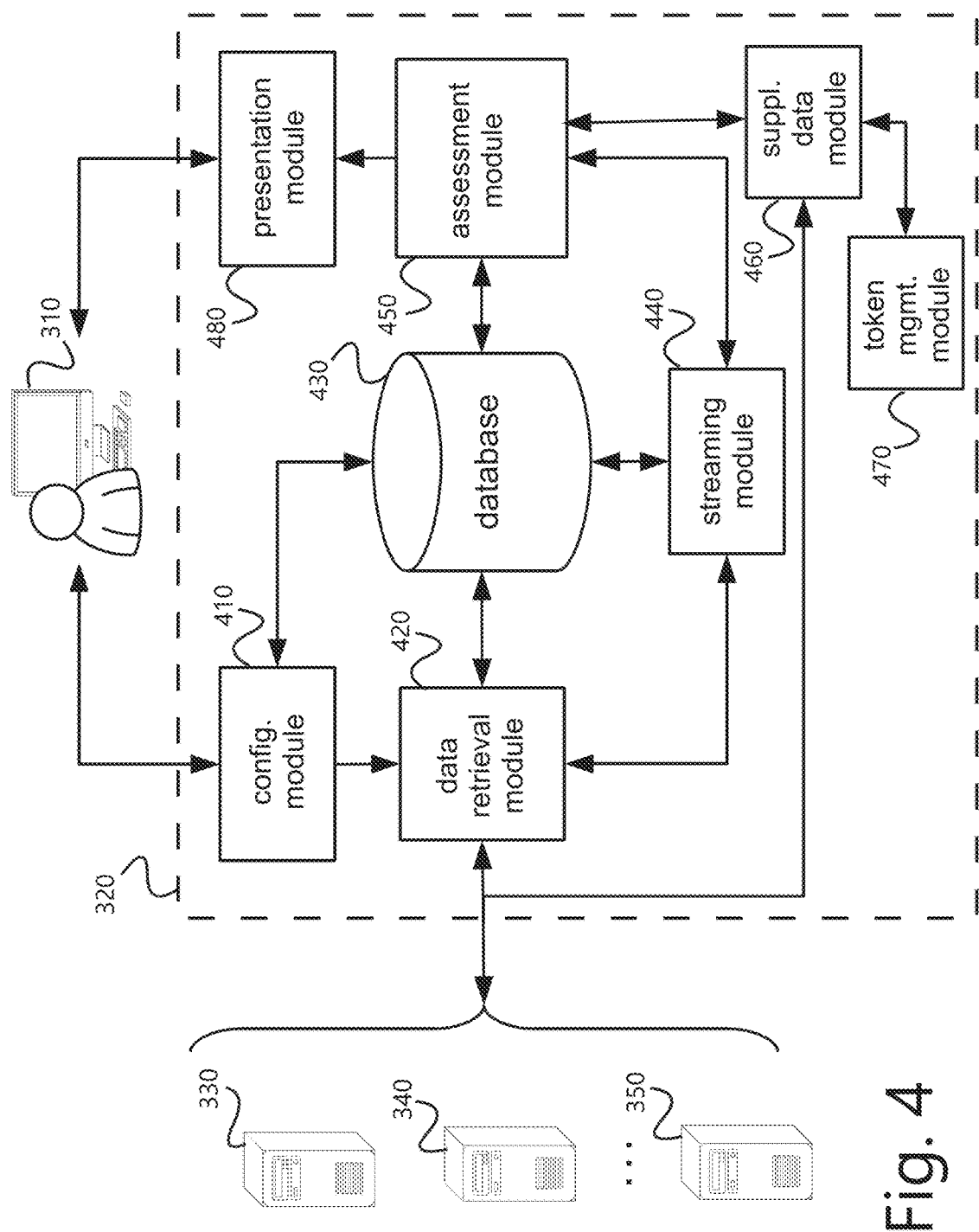
FIG. 4 depicts some aspects of an illustrative embodiment of a system as described herein.

FIG. 4 depicts another embodiment of host server 320. As shown in FIG. 3, host server 320 may be in communication with user device 310 and social media servers 330, 340, 350 via a network, such as the Internet.

In one aspect, host server 320 may comprise a configuration module 410, a data retrieval module 420, a database 430, a streaming data module 440, an assessment module 450, a supplemental data module 460, a token management module 470, and a presentation module 480.

In one aspect, a user desiring to assess the social media performance of one or more assets may access host server 320 via user device 310. For example, the user may access configuration module 410 of host server 320. In particular, the user may transmit identifying information to configuration module 410, the identifying information pertaining to one or more assets to be assessed and/or one or more social media profiles related to the one or more assets.

In one aspect, a user may transmit information associated with one or more assets, each belonging to a peer group and/or related to one or more of the social media profiles. For example, the user may transmit asset information identifying assets 110, 120a, 130a, 140a, 140b, and 140c.

In another aspect, a user may transmit information associated with one or more social media profiles, each of which may be related to one or more of the identified assets within the peer group. For example, the user may transmit information associated with one or more of social media profiles 150. Alternatively, host server 320 may programmatically identify one or more of social media profiles 150, each of which may be related to one or more of the identified assets, based, at least in part, on the asset identification information provided by the user. Regardless of how the social media profile information may be attained, the social media profile information may comprise identification and/or authentication information associated with each social media profile. In a further embodiment, the user may transmit (or host server may programmatically identify) any or all information necessary for host server 320 to access a corresponding social media server and/or retrieve data from the corresponding social media server associated with a social media profile.

In a further aspect, each identified asset may be associated with one or more social media profiles. In one embodiment, the user may associate each asset with one or more social media profiles. In other embodiments, each asset may be programmatically associated with one or more social media profiles. In such an embodiment, one or more of the programmatic associations may be presented to the user for the user's acceptance or rejection. In this manner, a user may be afforded an opportunity to customize which social media profiles may be associated with which assets.

For example, the user may associate asset 140*c* with a first subset of social media profiles 150, asset 140*b* with another subset of social media profiles 150, asset 140*a* with yet another subset of social media profiles 150, and so on, for each of assets 130*a*, 120*a*, and 110. Of course, this example is only illustrative of the possibilities and should not be construed as limiting of the suitable possibilities. Any combination of one or more social media profiles 150 may be associated with any of the identified assets, either manually or programmatically. Further, each social media profile may be associated with one or more assets, and vice versa. Moreover, and as discussed in more detail below, the assessment of each social media profile may be weighted differently for each asset to which it may be associated. For example, assuming that a particular social media profile may be associated with both assets 140*a* and 130*a*, a performance assessment of that social media profile may be weighted heavier when assessing the social media performance of asset 140*a* than when assessing the social media performance of asset 130*a* because asset 140*a* may be more closely related to, or responsible for maintaining, that social media profile.

In a further aspect, the user may associate ("tag") each asset and/or social media profile for which social media performance is to be assessed with additional trait or characterization information. In one embodiment, the asset or social media profile may be tagged with any trait information that may be helpful in assessing the asset's or profile's performance and/or identification of the asset's peers. The tagged information may also be useful in sorting the performance assessment results presented to the user, which is discussed in more detail below.

In some embodiments, the asset may be tagged with information including, but not limited to: information identifying one or more peer groups to which the asset belongs; information identifying one or more tiers within a peer group's hierarchical structure to which the asset belongs; information indicative of the industry in which the asset participates; information identifying the job responsibilities of the asset; information identifying which other assets within a peer group the asset may be related (and how closely the asset may be related to any such other assets); information indicative of the geographic location, reach, or territory of the asset; information indicative of the market size associated with the asset's activities; information indicative of a target demographic associated with the asset's activities; and/or information identifying a time period associated with the asset's activities. It should be noted that these examples are only illustrative of the possibilities, and assets may be tagged with any suitable trait information useful in the assessment of the asset's social media performance, determining the members of an asset's peer group, and/or defining relationships between an asset and one or more other entities.

In another aspect, such tagged information may serve to aid in the automated identification of those entities within an asset's peer group. For example, any or all entities comprising one or more similar tags may be presumed to belong to a common peer group. Such assets may or may not belong to the same organization or, in some cases, even the same industry.

In one embodiment, configuration module 410 may programmatically identify one or more entities sharing one or more common traits as compared to an asset. Configuration module 410 may then suggest to the user including those entities within a peer group associated with the asset. In a further embodiment, the user may then have an opportunity to accept or reject inclusion of the identified entities in the asset's peer group. Additionally or alternatively, the user may manually identify entities to include within each asset's peer group. Thus, the user may be afforded an opportunity to customize a peer group for one or more assets, and information may be collected not only from the social media profiles associated with the user's assets, but also from the social media profiles associated with the entities within the asset's peer group.

Such embodiments afford the user an ability to assess the social media performance of each asset compared to, or in light of, the performance of its peers, as the user defines those peers. Such contextual assessment may, among other things: provide the user with a more robust and comprehensive understanding of an asset's social media performance; enable comparison of the asset's performance to similarly situated entities; facilitate benchmarking within an industry, organization, or peer group; and/or promote the establishment of best practices within the industry, organization, or peer group.

In another aspect, the user may filter performance assessment results based, at least in part, on the trait information when the user desires to more narrowly tailor an asset's peer group. For example, where an asset is a television personality and the asset's peer group comprises all television personalities, the user may decide to review the asset's social media performance assessment results in light of a subset of the peer group, such as those television personalities appearing at the same time of day or television personalities associated with a common subject matter. Because each asset or entity for which social media data is collected may be tagged with the various trait information, sorting performance assessments based, at least in part, on whether each entity exhibits one or more particular traits can be done quickly and efficiently. Of course, these examples are only illustrative and should not be construed as exhaustive of the possibilities. Further details with respect to these aspects of the disclosure are discussed below.

After the social media profile information, asset information, trait information, and peer group information has been gathered at configuration module 410, and/or the various relationships/associations between the data sets has been determined, this data may be transmitted to data retrieval module 420 and/or database 430.

In one aspect, any or all of the information received at configuration module 410 from user device 310 may be transmitted to data retrieval module 420. In one embodiment, data retrieval module 420 may be configured to interface with one or more social media platforms, such as social media servers 330, 340, 350. As mentioned above, such interfacing may take place via one or more APIs. Moreover, each social media server may be in communication with one or more databases configured to store information associated with one or more users of the social media platform. In some embodiments, the databases corresponding to each social media server may store data pertaining to member activities, statistics, and information. Such data may be provided to the social media platform by a member, or collected in some other fashion (e.g., by monitoring a member's activities and/or engagements over the social media platform).

In a further aspect, data retrieval module 420 may be configured to transmit a request for data to any one or more of social media servers 330, 340, 350. Such a transmission may, in some embodiments, further comprise authentication information and/or credentials necessary for the retrieval of information from any of the social media servers or databases. In one embodiment, data retrieval module 420 may request all information maintained in one or more databases of the social media platform. In other embodiments, data retrieval module 420 may request all information maintained in one or more databases of the social media platform associated with one or more social media profiles. In particular, data retrieval module 420 may request all information associated with the social media profiles transmitted by configuration module 410. Such social media profiles may comprise one or more social media profiles associated with assets and/or one or more social media profiles associated with entities within those assets' respective peer groups. In a further embodiment, data retrieval module 420 may request only a subset of information maintained in one or more databases of the social media platform associated with one or more social media profiles.

Depending upon the permissions and/or policies of each social media platform and the needs of host server 320, data retrieval module 420 may request historical data associated with one or more social media profiles, an ongoing, real-time stream of data associated with one or more social media profiles, or periodic transmissions of the latest available data at predetermined time intervals. In some embodiments, any one or more of the aforementioned requests may be accomplished with a single request and/or transmission of authentication information, or alternatively, may be accomplished through a plurality of requests and/or authentication information transmissions. For example, where data retrieval module 420 requests an ongoing, real-time data stream associated with one or more social media profiles, data retrieval module 420 may be required to transmit updated authentication information at predetermined intervals in order to receive the stream in an uninterrupted fashion.

In one aspect, where one or more social media profiles may include public conversations, as discussed previously herein, a request from data retrieval module 420 to one or more social media servers may comprise one or more keywords for searching any or all publically available data of the respective social media platform. In an alternative embodiment, data retrieval module 420 may request all publically available data, or request a subset of the publically available data based on some criteria different from, or in addition to, keywords.

In a further aspect, data retrieval module 420 may be configured to request any data from one or more social media servers 330, 340, 350 to be used in conjunction with assessing the social media performance of an asset. In one embodiment, data retrieval module 420 may request data from social media servers 330, 340, 350 to be used in conjunction with assessing any one or more of the audience, voice, engagement, reach, influence, and impact (as described below) of an asset's or profile's social media presence or performance.

In one embodiment, an asset's social media audience, voice, engagement, reach, influence, and/or impact may comprise the audience, voice, engagement, reach, influence, and/or impact, respectively, of one or more social media profiles associated with that asset.

As used herein, the term "audience" may describe a relationship between a social media profile and other members of the social media platform. In one embodiment, the audience associated with a social media profile may indicate the number of platform members that have confirmed a relationship with the social media profile on the respective social media platform. In a further embodiment, and depending on the nomenclature used by the respective social media platform, the audience associated with a social media profile may be based, at least in part, on one or more components, including but not limited to, "friends," "followers," or "fans" associated with the social media profile. In some embodiments, these components may or may not be weighted equally when determining the audience associated with a social media profile. Further details regarding the collection and assessment of data from one or more social media platforms for determining, among other things, the audience associated with a social media profile are set forth below.

As used herein, the term "voice" may describe a messaging activity level associated with a social media profile. In one embodiment, the voice associated with a social media profile may indicate the frequency with which content may be published to the social media platform by an entity that maintains the social media profile. In a further embodiment, and depending on the nomenclature used by the respective social media platform, the voice associated with a social media profile may be based, at least in part, on one or more components, including but not limited to, "posts," "comments," "tweets," "replies," or "re-tweets" associated with the social media profile. In some embodiments, these components may or may not be weighted equally when determining the voice associated with a social media profile. In still further embodiments, content published by the audience or other members of the respective social media platform may also be included among the components of the voice associated with a social media profile, though content published by the asset that controls or maintains the social media profile may be weighed differently than content published by the audience or other members. Additionally, the media format of each component may be taken into consideration when weighing the components. For example, "posts" comprising a video format may be deemed a separate component and/or weighed differently than textual "posts." Likewise, "tweets" comprising an image format may be deemed a separate component and/or weighed differently than "tweets" comprising only text or a video format. Further details regarding the collection and assessment of data from one or more social media platforms for determining, among other things, the voice associated with a social media profile are set forth below.

As used herein, the term "engagement" may describe an ability for the social media profile to communicate a message reliably, i.e., while the voice associated with a social media profile may indicate the frequency with which content may be published by an asset that controls or maintains the social media profile, engagement may indicate whether that activity is worthwhile. In one embodiment, the engagement associated with a social media profile may indicate whether other members of the respective social media platform are interacting with the published content. In a further embodiment, and depending on the nomenclature used by the respective social media platform, the engagement associated with a social media profile may be based, at least in part, on one or more components, including but not limited to, "shares," "likes," "comments," "mentions," "re-tweets," "favorites," and "replies," and may also include, but may not be limited to, hashtag mentions and/or search term/keyword matches within a public conversation. In some embodiments, these components may or may not be weighted equally when determining the engagement associated with a social media profile. In still further embodiments, interactions with published content by any one or more of the asset that controls or maintains the social media profile, the audience of the social media profile, and other members of the respective social media platform may be included in one or more of the components of the engagement associated with the social media profile, though interactions by the asset that controls or maintains the social media profile may be weighed differently than interactions by the audience or other members. Additionally, the media format of each component may be taken into consideration when weighing the components. For example, "comment" comprising a video format may be deemed a separate component and/or weighed differently than textual "comments." Likewise, "re-tweets" comprising an image format may be deemed a separate component and/or weighed differently than "re-tweets" comprising only text or a video format. Further details regarding the collection and assessment of data from one or more social media platforms for determining, among other things, the engagement associated with a social media profile are set forth below.

As used herein, the term "reach" may describe a potential first and second order audience, i.e., while the audience associated with a social media profile may indicate the number of platform members that have confirmed a relationship with the social media profile, reach may indicate whether that audience is a beneficial or useful audience. In one embodiment, the reach associated with a social media profile may indicate both the audience associated with the social media profile, as well as the audience of the audience. In a further embodiment, rather than simply taking into consideration the audience of the audience, the reach associated with a social media profile may take into consideration only the audience of the engaged audience, i.e., the audience of those social media platform members that not only are considered a part of the social media profile's audience, but those members that have engaged the content associated with the social media profile. Further details regarding the collection and assessment of data from one or more social media platforms for determining, among other things, the reach associated with a social media profile are set forth below.

As used herein, the term "influence" may describe an ability for the social media profile to convert reach into engagement. In one embodiment, the influence associated with a social media profile may comprise a ratio of engagement to reach. Thus, and for example, assuming two social media profiles having equal reach, the social media profile associated with greater engagement may have greater influence. Further details regarding the collection and assessment of data from one or more social media platforms for determining, among other things, the influence associated with a social media profile are set forth below.

As used herein, the term "impact" may describe an efficiency with which a social media profile may generate influence and/or engagement. In one embodiment, assuming two social media profiles having equal influence and/or engagement, the social media profile associated with less voice may have greater impact. In other words, voice may be associated with energy expended by an asset controlling or maintaining a social media profile. Thus, the social media profile associated with less voice while achieving equal or greater influence and/or engagement may be characterized as more efficient. Further details regarding the collection and assessment of data from one or more social media platforms for determining, among other things, the impact associated with a social media profile are set forth below.

In another aspect, upon receiving a request from data retrieval module 420, and optionally verifying any authentication information transmitted in conjunction with such request, the one or more social media servers may retrieve any or all of the requested information from its respective database(s) and transmit that information to data retrieval module 420.

Host server 320 may further comprise a database 430. As shown in FIG. 4, database 430 may comprise a single database integrated with host server 320. In alternative embodiments, however, database 430 may be maintained separate from host server 320 so that, among other things, server 320 can more fully utilize its processing power. In further embodiments, rather than a single database, database 430 may comprise a plurality of databases that may or may not be located in a single location. Moreover, any or all information stored within database 430 may be duplicated across one or more databases or distributed between them.

Any or all of the information received at configuration module 410 from user device 310 and/or received at data retrieval module 420 from social media servers 330, 340, 350 may be transmitted to database 430 for storage. In one aspect, database 430 stores one or more of social media profile information, asset information, trait information, and peer group information received from configuration module 410, as well as some or all associations between multiple data sets. For example, database 430 may store information for associating asset information to corresponding social media profile information, trait information, and/or peer group information.

In another aspect, database 430 may store information received from one or more social media platforms via data retrieval module 420. For example, database 430 may store information retrieved for asset and/or social media profile assessment, including but not limited to data indicative of the audience, voice, engagement, reach, influence, and/or impact associated with a social media profile. In some such embodiments, database 430 may further store one or more components that may be used in determining the audience, voice, engagement, reach, influence, and/or impact associated with a social media profile, including but not limited to, data indicative of "friends," "followers," "fans," "posts," "comments," "tweets," "replies," "re-tweets," "shares," "likes," "mentions," and "favorites."

Database 430 may further store information for correlating some or all data associated with a social media profile, and/or correlating some or all social media profiles with one or more assets. In further embodiments, database 430 may also store algorithms for determining one or more of the audience, voice, engagement, reach, influence, and/or impact associated with a social media profile based on one or more of the aforementioned components. One or more illustrative algorithms for determining the audience, voice, engagement, reach, influence, and/or impact associated with a social media profile are described below.

Additionally, where one or more of the audience, voice, engagement, reach, influence, and/or impact associated with a social media profile may comprise a plurality of components, database 430 may further store weights assigned to each component. In this manner, the relative weight assigned each component may be customized based, at least in part, on contextual information. In some embodiments, the contextual information may comprise, for example, the industry in which an asset participates, the market size in which the asset is engaged, and/or the geographic location of the asset. However, it should be noted that these examples are only illustrative of the possibilities and the components may be weighted in any suitable fashion and/or in view of any contextual information or other considerations. In some embodiments, the weights assigned to each component may be predetermined and/or industry-based. In further embodiments, the predetermined weights may be presented to the user via configuration module 410 and the user may be afforded an opportunity to modify the predetermined weights of one or more components used in the assessment of any or all assets or social media profiles.

In another aspect, database 430 may store authentication information necessary to retrieve data from one or more social media servers 330, 340, 350. In one embodiment, data retrieval module 420 may read or recall authentication information from database 430 prior to, or in conjunction with, transmitting a request for data to one or more social media servers. Conversely, where authentication information may be transmitted from one or more social media servers 330, 340, 350 to data retrieval module 420, that authentication information may be transmitted from the data retrieval module to database 430 for storage.

In a further aspect, any asset or social media profile modifications made by the user via configuration module 410 may also be stored in database 430. Such modifications may include, but are not limited to, changes to existing assets or social media profiles, additions of new assets or social media profiles, and removal of existing assets or social media profiles. In this manner, database 430 may maintain an up-to-date record of all assets and corresponding social media profiles for which data may be retrieved from social media servers 330, 340, 350. Any or all updated information may also be communicated to data retrieval module 420, either directly from configuration module 410 or via database 430, to ensure that all relevant data is being requested from the social media platforms and/or unnecessary data is not being requested from the platforms.

In another aspect, in addition to transmitting data received from social media servers 330, 340, 350 to database 430, data retrieval module 420 may transmit some or all of the data received from the social media platforms to streaming module 440. In some embodiments, the data transmitted to streaming module 440 may comprise data collected from one or more social media servers 330, 340, 350 upon which the performance assessment of one or more social media profiles and/or assets may be based, at least in part. For example, data retrieval module 420 may transmit data comprising information to be used in conjunction with assessing any one or more of the audience, voice, engagement, reach, influence, and impact associated with a social media profile and/or asset, including but not limited to, information indicative of those components of audience, voice, engagement, and/or reach set forth above.

In one embodiment, data retrieval module 420 may transmit one subset of data received from configuration module 410 and/or social media servers 330, 340, 350 directly to database 430, and may transmit another subset of data received from configuration module 410 and/or social media servers 330, 340, 350 directly to streaming module 440. For instance, data retrieval module 420 may transmit social media profile identification information, asset identification information, authentication information, scoring profile information (including weights for various components to be used in performance assessments), other information input by a user, and/or historical data retrieved from one or more social media platforms directly to database 430. Other data retrieved from the social media platforms (e.g., data used in conjunction with assessing any one or more of the audience, voice, engagement, reach, influence, and impact associated with a social media profile and/or asset) by data retrieving module 420 may be transmitted directly to streaming module 440. In this manner, relatively static information (i.e., information typically not subject to relatively frequent change or requiring affirmative intervention to change) may be transmitted directly to database 430, whereas relatively dynamic information (i.e., information retrieved from the social media platforms that may be changing relatively frequently and/or updated in real-time, at pre-determined intervals, or otherwise automatically) may be transmitted directly to streaming module 440. It should be noted, however, that regardless of what information is transmitted directly to streaming module 440, data retrieval module 420 may then transmit any or all received information to database 430 in order to supplement or amend the data stored there. Thus, any or all real-time or relatively dynamic data retrieved from one or more social media servers may be collected and transmitted to an assessment module 450 (described in more detail below) via streaming module 440 as quickly and efficiently as possible, while still maintaining an up-to-date record in database 430 of any or all data retrieved from the one or more social media platforms, including any or all relatively dynamic information.

Assessment module 450 may comprise logic and/or algorithms for assessing the social media performance of one or more social media profiles and/or assets. In one embodiment, such performance assessments may be based, at least in part, on information received or retrieved from one or both of database 430 and streaming module 440. As discussed above, such assessments may be based, among other things, on data retrieved from one or more social media platforms, including but not limited to, "friends," "followers," "fans," "posts," "comments," "tweets," "replies," "retweets," "shares," "likes," "mentions," and "favorites." These components and/or data associated therewith may be used in determining the audience, voice, engagement, reach, influence, and/or impact associated with a social media profile and/or asset. Moreover, and as discussed above, the information upon which an assessment is based may rely, at least in part, on information retrieved from a dedicated content channel associated with a social media profile and/or public conversations associated with an asset or social media profile.

In another aspect, assessment module 450 may determine an audience associated with one or more social media profiles. As discussed above, the audience associated with a social media profile may reflect a relationship between a social media profile and other members of the social media platform. In one embodiment, the audience associated with a social media profile may indicate the number of platform members that have confirmed a relationship with the social media profile on the respective social media platform. Depending on the nomenclature used by the respective social media platform, the audience associated with a social media profile may be based, at least in part, on one or more components, including but not limited to, "friends," "followers," or "fans" associated with the social media profile. Such components may or may not be weighted equally when determining the audience associated with a social media profile. For example, "friends" may be weighted heavier than "fans," or vice versa.

In one aspect, the audience, a, associated with a social media profile may be determined using the following Equation (1):

$$a, v, e, r = \frac{\sum_{j=1}^{t} \sum_{m=1}^{k} (l_j w_m x_{mj})}{t} \quad \text{Eq. (1)}$$

As used in Equation (1), x may represent each component associated with the social media profile to be included in the audience determination for components 1 through k. For example, where the audience associated with an illustrative FACEBOOK social media profile may comprise three components (e.g., "friends," "followers," and "fans"), then k may equal 3 and Eq. (1) may include $x_1$, $x_2$, and $x_3$. The number or type of components to be considered when determining the audience associated with another FACEBOOK social media profile, a TWITTER social media profile, or some other social media profile may be different and the examples provided herein are only intended to demonstrate the possibilities. For instance, the audience associated with an illustrative TWITTER social media profile may comprise only one component (e.g., "followers").

Regardless of the number of components, each component, x, may represent the sum of all event instances during the relevant time period, t. For instance, where the audience comprises a "friends" component, x for that particular component may be the total number of "friends," however that term may be defined, associated with the social media profile during the relevant time period.

Further, w may represent the weight afforded each component, x, 1 through k, such that where, for example, audience is based, at least in part, on the aforementioned three components, then w may reflect the weight afforded each of those components.

Furthermore, l may represent the weight afforded a temporal period for time periods 1 through t, such that where, for example, only one time period is being included within the analysis, then l may be set to 1.0 and t, the number of time periods, may also be set to 1.0. In alternative embodiments, however, where several different time periods are being included in the analysis, l may reflect a weight afforded each time period, t. For example, in one embodiment, where a performance assessment may be made based on the social media performance associated with a social media profile over a time period (e.g., a day, week, month, year, etc.), relatively recent activity may be weighted more heavily than relatively older activity. In one example, where performance may be evaluated with respect to all activity over a week-long timespan, activity associated with a first day (the oldest activity) may be discounted, for example weighted 1/7, as compared to activity associated with the seventh day (the most recent activity). Social media activity associated with the second day may be discounted to a lesser extent, for example weighted 2/7, as compared to social media activity associated with the seventh day, and so on, such that more recent activity may be weighted more heavily within the performance assessment. Of course, this example is only illustrative and alternative formulations and/or considerations for weighting both recent and older activity are also possible. Moreover, in alternative embodiments, it may be desirable to weight older activity greater than more recent activity, or not consider temporal factors at all when weighting social media activity.

In another aspect, the voice, v, associated with a social media profile may also be determined using Equation (1). As described above with respect to the audience, x may represent each component to be included in the voice determination for components 1 through k. For example, where the voice associated with an illustrative FACEBOOK social media profile may comprise two components (e.g., "posts," and "comments"), then k may equal 2 and Equation (1) may include $x_1$ and $x_2$. The number or type of components to be considered when determining the voice associated with another FACEBOOK social media profile, a TWITTER social media profile, or some other social media profile may be different and the examples provided herein are only intended to demonstrate the possibilities. For instance, the voice associated with an illustrative TWITTER social media profile may comprise three components (e.g., "tweets," "replies," and "re-tweets").

Regardless of the number of components, each component, x, may again represent the sum of all event instances during the relevant time period, t. For instance, where the voice comprises a "posts" component, x for that particular component may be the total number of "posts," however that term may be defined, associated with the social media profile during the relevant time period.

Likewise, w and l, representing the weight afforded each component, x, and the weight afforded each time period, t, respectively, may be treated similarly to the corresponding variables described above with respect to the audience associated with a social media profile.

The engagement, e, associated with a social media profile may also be determined using Equation (1). Similar to determining the audience and voice, x may represent each component to be included in the engagement determination for components 1 through k. For example, where the engagement associated with an illustrative FACEBOOK social media profile may comprise four components (e.g., "shares," "likes," "comments," and "mentions"), then k may equal 4 and Equation (1) may include $x_1$, $x_2$, $x_3$, and $x_4$. The number or type of components to be considered when determining the engagement associated with another FACEBOOK social media profile, a TWITTER social media profile, or some other social media profile may be different and the examples provided herein are only intended to demonstrate the possibilities. For instance, the engagement associated with an illustrative TWITTER social media profile may comprise six components (e.g., "re-tweets," "favorites," "mentions," "replies," hashtag matches, and keyword matches).

Regardless of the number of components, each component, x, may again represent the sum of all event instances during the relevant time period, t. For instance, where the engagement comprises a "re-tweets" component, x for that particular component may be the total number of "re-tweets," however that term may be defined, associated with the social media profile during the relevant time period.

Likewise, w and l, representing the weight afforded each component, x, and the weight afforded each time period, t, respectively, may be treated similarly to the corresponding variables described above with respect to the audience and voice associated with a social media profile.

The reach, r, associated with a social media profile may also be determined using Equation (1). Similar to determining the audience, voice, and engagement, x may represent each component to be included in the reach determination for components 1 through k. For example, where the reach associated with an illustrative FACEBOOK social media profile may comprise six components (e.g., "friends," "followers," "fans," "friends" of engaged users, "followers" of engaged users, and "fans" of engaged users), then k may equal 6 and Equation (1) may include $x_1$, $x_2$, $x_3$, $x_4$, $x_5$, $x_6$. It should be noted, in this particular example, one or more of the components may be based, at least in part, on an engagement determination, described above. The number or type of components to be considered when determining the reach associated with another FACEBOOK social media profile, a TWITTER social media profile, or some other social media profile may be different and the examples provided herein are only intended to demonstrate the possibilities. For instance, the reach associated with an illustrative TWITTER social media profile may comprise two components (e.g., "followers" and "followers" of engaged users).

Regardless of the number of components, each component, x, may again represent the sum of all event instances during the relevant time period, t. For instance, where the engagement comprises a "followers" component, x for that particular component may be the total number of "followers," however that term may be defined, associated with the social media profile during the relevant time period.

Likewise, w and l, representing the weight afforded each component, x, and the weight afforded each time period, t, respectively, may be treated similarly to the corresponding variables described above with respect to the audience, voice, and engagement associated with a social media profile.

In another aspect, the influence associated with a social media profile may be determined using the following Equation (2):

$$inf = \frac{e}{r} = \frac{\sum_{j=1}^{t}\sum_{m=1}^{k}(l_j w_m x_{mj})}{\sum_{j=1}^{t}\sum_{m=1}^{k}(l_j w_m x_{mj})} \quad \text{Eq. (2)}$$

As presented in Equation (2), the influence, inf, associated with a social media profile may comprise a ratio of the engagement associated with the social media profile, e, and the reach associated with the social media profile, r. The influence associated with a social media profile may reflect, among other things, an ability for the social media profile to convert reach into engagement. Thus, and for example, assuming two social media profiles having equal reach, the social media profile associated with greater engagement may have greater influence.

In another aspect, the impact associated with a social media profile may be determined using the following Equation (3):

$$imp = \frac{e}{v \times r} = \frac{\sum_{j=1}^{t}\sum_{m=1}^{k}(l_j w_m x_{ijm})}{\sum_{j=1}^{t}\sum_{m=1}^{k}(l_j w_m x_{ijm}) \times \sum_{j=1}^{t}\sum_{m=1}^{k}(l_j w_m x_{ijm})} \quad \text{Eq. (3)}$$

As presented in Equation (3), the impact, imp, associated with a social media profile may, like the influence, comprise a ratio of the engagement associated with the social media profile, e, and the reach associated with the social media profile, r, but further take into account the voice associated with the social media profile. Thus, the impact associated with a social media profile may reflect, among other things, an efficiency with which a social media profile may generate influence and/or engagement. Thus, and for example, assuming two social media profiles having equal influence and/or engagement, the social media profile associated with less voice may have greater impact, as the entity that maintains the social media profile may be expending less energy while achieving equal results as compared to the other social media profile.

In a further aspect, and as discussed above, the social media performance of an asset may comprise the social media performance of one or more social media profiles, n. Thus, and for example, the audience, voice, engagement, reach, influence, and/or impact associated with a plurality of social media profiles may be combined to generate the audience, voice, engagement, reach, influence, and/or impact, respectively, associated with an asset.

$$A, V, E, R = \frac{\sum_{i=1}^{n}\sum_{j=1}^{t}\sum_{m=1}^{k}(l_j w_m x_{ijm})}{t} \quad \text{Eq. (4)(a)}$$

In one embodiment, the audience, A, voice, V, engagement, E, and reach, R associated with an asset may be determined in accordance with Equation (4)(a). In particular, for all social media profiles 1 through n that define an asset, and for all time periods 1 through t that are being included in the assessment, and for all components of either the audience, voice, engagement, or reach (as described above) 1 through k, the products of the time period weight, l, component weight, w, and component value, x, may be summed. The result may then be divided by the number of time periods, t.

$$A, V, E, R = \frac{\sum_{i=1}^{n}\sum_{j=1}^{t}\sum_{m=1}^{k}(c_i l_j w_m x_{ijm})}{t} \quad \text{Eq. (4)(b)}$$

In another embodiment, the audience, A, voice, V, engagement, E, and reach, R, associated with an asset may be determined in accordance with Equation (4)(b). Equation (4)(b) may be substantially similar to Equation (4)(a), but Equation (4)(b) may allow for the independent weighting of one or more social media profiles to be included within the performance assessment of an asset. For example, FACEBOOK and TWITTER social media profiles may be weighted more heavily than Instagram or LinkedIn social media profiles. In further embodiments, geographic considerations may be taken into consideration when weighting one or more social media profiles to be included in a performance assessment. For example, and as discussed in further detail below, when the performance assessment of an asset includes the performance of social media profiles maintained by other entities/assets, the weight afforded the social media profiles maintained by the other assets may be based, at least in part, on the geographic proximity of those entities compared to the asset being assessed. Of course, these are only a couple illustrative embodiments of how or why a social media profile included in the assessment of an asset's social media performance may be afforded varying weights. Any suitable or otherwise useful criteria may be used to determine, at least in part, the weight afforded a social media profile included within a performance assessment.

Equation (4)(b) may convey that for all social media profiles 1 through n that define an asset, and for all time periods 1 through t that are being included in the assessment, and for all components of either the audience, voice, engagement, or reach (as described above) 1 through k that may be included in any social media profile associated with the asset, the products of the contribution weight, c (i.e., the weight afforded a particular social media profile), time period weight, l, component weight, w, and component value, x, may be summed. The result may then be divided by the number of time periods, t.

It should be noted, although either of Equations (4)(a) or (4)(b) may be used to determine the audience, voice, engagement, and/or reach associated with an asset, for simplicity of explanation, where the audience, voice, engagement, and/or reach of an asset is incorporated in, or forms the basis of, further equations or algorithms below, Equation (4)(a) will be used. However, one may appreciate that Equation (4)(b) may be substituted in other embodiments.

The influence, INF, associated with an asset may, thus, be determined in accordance with Equation (5):

$$INF = \frac{E}{R} = \frac{\sum_{i=1}^{n}\sum_{j=1}^{t}\sum_{m=1}^{k}(l_j w_m x_{ijm})}{\sum_{i=1}^{n}\sum_{j=1}^{t}\sum_{m=1}^{k}(l_j w_m x_{ijm})}$$ Eq. (5)

It follows that in some emmbodiments, the impact, IMP, associated with an asset may, thus, be determined in accordance with Equation (6):

$$IMP = \frac{E}{V \times R} = \frac{\sum_{i=1}^{n}\sum_{j=1}^{t}\sum_{m=1}^{k}(l_j w_m x_{ijm})}{\sum_{i=1}^{n}\sum_{j=1}^{t}\sum_{m=1}^{k}(l_j w_m x_{ijm}) \times \sum_{i=1}^{n}\sum_{j=1}^{t}\sum_{m=1}^{k}(l_j w_m x_{ijm})}$$ Eq. (6)

In one aspect, in addition to determining an audience, voice, engagement, reach, influence, and/or impact for an asset, a determination as to the asset's "share" of audience, voice, engagement, and/or reach within a peer group may be made. In one embodiment, an asset's share of audience, voice, engagement, and/or reach may represent a portion or percentage of a total audience, voice, engagement, and/or reach, respectively, associated with a peer group that includes the asset. In this manner, a performance assessment of an asset may directly compare the asset's social media performance, including a number of facets thereof, against the performance of its peers. As described in more detail above, the peer groups may be defined in a variety of ways and/or may be customized by a user.

$$A_{share}, V_{share}, E_{share}, R_{share} = \frac{\sum_{i=1}^{n}\sum_{j=1}^{t}\sum_{m=1}^{k}(l_j w_m x_{ijm})}{\sum_{i=1}^{p}\sum_{j=1}^{t}\sum_{m=1}^{k}(l_j w_m x_{ijm})}$$ Eq. (7)

In one embodiment, the share of an asset's audience, $A_{share}$, the share of an asset's voice, $V_{share}$, the share of an asset's engagement, $E_{share}$, and the share of an asset's reach, $R_{share}$, with respect to the overall audience, voice, engagement, and reach associated with an asset's peer group as a whole may be determined using Equation (7). As shown in Equation (7), the numerator may represent any of an asset's audience, voice, engagement, or reach, and takes into consideration one or more social media profiles associated with the asset. The denominator, on the other hand, may represent the entire audience, voice, engagement, or reach of the asset's peer group, where p represents the total number of social media profiles associated with all assets within the peer group. As discussed previously, the peer group may be defined relatively broadly, thereby encompassing a large number of assets, or it may be defined relatively narrowly, encompassing only those assets most closely related or most similar to the asset for which social media performance is being assessed. The type and/or quantity of social media profiles encompassed by the peer group may reflect the breadth or scope of the peer group. In a further embodiment, to arrive at a percentage (or a whole number), the result of Equation (7) may be multiplied by one hundred (100).

In a further aspect, an asset may also be ranked within the context of a peer group, i.e., ranked against its peers (however a particular peer group may be defined). In one embodiment, an asset may be ranked against its peers according to any one or more of the audience, voice, engagement, reach, influence, impact, audience share, voice share, engagement share, and reach share. In other embodiments, an asset may be ranked within a peer group on a scale of 1 through 100, or some other scale intuitive to a user (e.g., 1 through 10, an IQ-like scale of 1 through 160, etc.).

In one aspect, prior to ranking an asset within a peer group, it may be determined how far an asset's performance lies above or far below the peer group's average performance. In such an embodiment, the performance of each asset or entity within the peer group may also be determined, for example, in accordance with Equation (4)(a) or (4)(b).

$$\mu_A = \frac{\sum_{h=1}^{a} A}{a} = \frac{\sum_{h=1}^{a}\sum_{i=1}^{n}\sum_{j=1}^{t}\sum_{m=1}^{k}(l_j w_m x_{hijm})}{ta}$$ Eq. (8)

The mean performance across all assets of a peer group may then be determined, in one embodiment, using Equation (8). Equation (8) depicts a determination for a mean audience across all assets within a peer group. However, the same formula may be applied to arrive at the mean voice, $\mu_V$, engagement, $\mu_E$, and/or reach, $\mu_R$, across all assets for a peer group. In particular, Equation (8) adds the audience assessment for each asset 1 through a in a peer group, and divides that sum by the number of assets, a, in the peer group.

In one embodiment, the mean performance across all assets of a peer group may then be used to determine a standard deviation for performance assessment of a peer group.

Eq. (9)

$$\sigma_A = \sqrt{\frac{\sum_{h=1}^{a}(A_h - \mu_A)^2}{a}}$$

$$= \sqrt{\frac{\sum_{h=1}^{a}\left(\frac{a\sum_{n=i}^{n}\sum_{j=1}^{t}\sum_{m=1}^{k}(l_j w_m x_{ijm}) - \sum_{h=1}^{a}\sum_{i=1}^{n}\sum_{j=1}^{t}\sum_{m=1}^{k}(l_j w_m x_{hijm})}{ta}\right)^2}{a}}$$

Equation (9) affords one illustrative method for determining the standard deviation associated with a peer group's performance assessments. As was the case with respect to Equation (8), a method for determining the standard deviation for a peer group's audience assessment is shown. However, the same formula may be used for determining the standard deviation for a peer group's voice, $\sigma_V$, engagement, GE, and/or reach, $\sigma_R$, assessment. As used in Equation (9), $A_h$ may represent the audience assessment for any asset within the peer group (determined, for example, using Equation (4)(a) or (4)(b)). In particular, and for each asset within a peer group, 1 through a, the mean audience assessment for the peer group may be subtracted from the respective asset's assessment and the difference may be squared. The summation of all such results for each asset in the peer group may then be divided by the number of assets in the peer group. The positive square root of that quotient may then represent the standard deviation for the peer group's assessment.

Using such a standard deviation, performance assessments for assets/entities associated with above average performance with respect to a peer group may result in positive numbers (a number of standard deviations above the mean), and performance assessments for assets/entities associated with below average performance with respect to a peer group may result in negative numbers (a number of standard deviations below the mean). The assessments that may have been converted into units of standard deviation may then be rescaled to convert the standardized scores to an intuitive scale comprising only positive numbers (e.g., 1 through 100, 1 through 10, 1 through 160, etc.).

In one embodiment, the standardized scores of each asset/entity within a peer group may be converted to a percentile and/or ranked against the other assets of the peer group in accordance with its percentile.

$$\text{percentile } score_A = \left(\frac{1}{\sqrt{2\pi}}\int_{-\infty}^{\frac{A-\mu_A}{\sigma_A}} e^{\frac{-y^2}{2}} dy\right) \times 100 \quad \text{Eq. (10)}$$

Equation (10) provides one illustrative method for converting an asset's standardized audience assessment into an audience assessment percentile score. However, the same formula may be used for determining the percentile score for an asset's voice, percentile $score_V$, engagement, percentile $score_E$, and/or reach assessment, percentile $score_R$. In other embodiments, upon calculating the percentile score for each asset in a peer group, the assets in the peer group may be ranked in accordance with each asset's percentile score.

There are a number of advantages to presenting and/or ranking a plurality of assets' performance assessments or scores as percentile scores. For example, this method affords a range of resulting scores bound by 0 and 100 which may be fairly intuitive to the user and easy to infer approximately where in a peer group an asset's performance falls. Perhaps more obviously, it may be immediately recognized in what percentile of the peer group the asset's performance falls. Additionally, this methods provides for easier movement of scores within the mid-range of the peer group than at the tails or extremes. In other words, an asset may find it easier to improve its percentile score from 50 to 60 than from 60 to 70, and easier still than improving from 70 to 80. In fact, improvement of such a percentile score becomes very difficult the closer the asset's score approaches 100. Likewise, degradation of the percentile score may become very difficult the closer the asset's rank approaches 0.

In another embodiment, rather than converting the standardized scores of each asset/entity within a peer group to a percentile score, the standardized scores may be converted to a T-score.

$$T\text{-}score_A = \frac{10(A - \mu_A)}{\sigma_A} + 50 \quad \text{Eq. (11)}$$

Equation (11) provides one illustrative method for converting an asset's standardized audience assessment into an audience assessment T-score. Again, the same formula may be used for determining the T-score for an asset's voice, T-score$_V$, engagement, T-score$_E$, and/or reach, T-score$_R$. In other embodiments, upon calculating the T-score for each asset in a peer group, the assets in the peer group may be ranked in accordance with each asset's T-score.

Presenting and/or ranking a plurality of asset's performance assessments or scores as T-scores also has advantages. Like the percentile scores discussed above, this method affords a range of resulting scores bound by 0 and 100 which may be fairly intuitive to the user and easy to infer approximately where in a peer group an asset's performance falls. Additionally, this methods affords a wider range of resulting scores at the extreme ends of the spectrum, as percentile scores may result in a score of 0 for all entities with performance assessment scores falling more than 3 standard deviations below the mean for the peer group and/or a score of 100 for all entities with performance assessment scores greater than 3 standard deviations above the mean for the peer group.

In a further aspect, and regardless of whether asset performance assessments may be determined as percentile scores or T-scores, the scores for one or more of audience, voice, engagement, and/or reach may be combined into a composite score.

$$\text{composite score} = \frac{\sum_{i=1}^{k}(w_i x_i)}{\sum_{i=1}^{k} w_i} \qquad \text{Eq. (12)}$$

Equation (12) provides one illustrative method for determining a composite score based on one or more of an audience, voice, engagement, and/or reach score. In one aspect, either a percentile score or a T-score may be used for each component to be combined into the composite score (provided all components of the composite are based on the same scoring methodology). In one embodiment, Equation (12) may be used to determine the weighted arithmetic mean of the components of the composite score. In particular, for each component, k, the corresponding score associated with that component, x, may be multiplied by a weight, w, afforded that component. The product may then be divided by the sum of the weights associated with each component.

In another embodiment, a similar composite score may be calculated based on the share scores set forth above with respect to Equation (7). Such a composite score may reflect an asset's total share of social media activity within a peer group, including any one or more of audience share, voice share, engagement share, and reach share.

In a further embodiment, the influence and impact determinations for an asset (e.g., Equations (5) and (6)) may be taken into consideration when calculating any one or more of an asset's composite percentile score, composite T-score, and composite share score. As discussed above with respect to audience, voice, engagement, and reach, the influence and/or impact components may be afforded their own respective weights when determining a composite score that includes them.

Regardless of the type of assessments conducted in assessment module 450, or how those assessments are made, assessment of the social media data associated with one or more assets and/or social media profiles may take place on a continuous basis (e.g., in real-time) or at predetermined intervals (e.g., every x seconds, minutes, hours, days, etc.). The results of any assessment made at a given time, which may be referred to as an assessment "snapshot," may be transmitted to database 430 for storing of the assessment information. In particular, the assessment information (or assessment snapshot) may be associated within database 430 with one or more asset identifiers and/or social media profile identifiers stored there. Thus, a historical record of an asset's or social media profile's performance may be developed over time.

In another aspect, in the course of performing assessments with respect to data received directly or indirectly from social media servers 330, 340, 350, assessment module 450 may determine that the data associated with one or more assets or social media profiles appears stale or outdated. For example, when assessing the social media performance of an asset within a peer group, assessment module 450 may determine that the most recent social media activity information associated with an asset is older than a predetermined threshold. In one embodiment, the predetermined threshold may be a time interval, such as x seconds, minutes, hours, days, etc. In another embodiment, the predetermined threshold may be a function of previous social media activity levels detected for the asset. In other words, the predetermined threshold may be a relatively short period of time for assets that typically exhibit frequent social media activity, while the threshold may be a relatively long period of time for assets that typically exhibit less social media activity. In other embodiments, the predetermined threshold may be a function of the social media activity level associated with the asset's peer group. Thus, the threshold may be a relatively short period of time for an asset belonging to a peer group that typically exhibits frequent social media activity, while the threshold may be a relatively long period of time for an asset belonging to a peer group that typically exhibits little or infrequent social media activity.

In one embodiment, where assessment module 450 determines that the data associated with one or more assets or social media profiles appears stale, assessment module 450 may transmit a request for updated data to streaming module 440. In a further embodiment, the request may then be transmitted to data retrieval module 420. Retrieval module 420 may then transmit a request to one or more social media servers 330, 340, 350 to collect the desired data. The process of retrieving data from the one or more social media servers by data retrieval module is described in more detail above, as is the process of receiving the updated data and transmitting that data to one or more of database 430, streaming module 440, and assessment module 450.

In an alternative embodiment, rather than (or in addition to) the request for updated data being transmitted to data retrieval module 420 via streaming module 440, the request for updated data from assessment module 450 may be transmitted to a supplemental data module 460.

In one aspect, supplemental data module 460 may be configured to interface with one or more social media servers 330, 340, 350 and/or a corresponding API in a similar fashion as, and independent of, data retrieval module 420. In this manner, a redundancy of social media server connections may be established. This may be particularly useful when one of the connections fails, is overwhelmed by data volume, or content retrieval over that connection is otherwise limited.

In one embodiment, the data requested by supplemental data module 460 may be limited to information associated with one or more assets or social media profiles determined to be stale. For example, where the threshold for determining that an asset's social media data is stale is one day, supplemental data module 460 may only request data associated with the respective assets or social media profiles from the last 24 hours. Similar to data retrieval module 420, supplemental data module 460 may request any type of information from the one or more social media servers that may be useful in the assessment of an asset's, peer group's, or social media profile's social media performance. Such information may include, but is not limited to, any one or more of the aforementioned components of the audience, voice, engagement, reach, influence, and impact of an asset's social media presence or performance.

In a further aspect, supplemental data module 460 may maintain one or more records comprising one or more peer groups, assets, or social media profiles in need of frequent updates. The entities identified in the records may be identified algorithmically within host server 320 in accordance with any previously-described embodiment, or they may be identified by a user. Regardless of how the entities are identified, one or more requests for updated data with respect to these entities may be made at frequent and/or predetermined time intervals. In one embodiment, the time intervals at which requests are made by supplemental data module 460 with respect to any or all assets in need of frequent updates may be shorter than the time intervals at which data may be requested from the social media servers via data retrieval module 420. In this manner, the social media data associated with the entities in the records maintained at supplemental data module 460 may be kept as up-to-date as possible.

In another embodiment, any request for data transmitted by supplemental data module 460 may be accompanied by authentication information or credentials necessary to access the databases associated with one or more social media servers. As described above, authentication information may be stored and/or recalled from database 430. Alternatively, or additionally, supplemental data module 460 may be configured to communicate with a token management module 470.

In one aspect, token management module 470 may maintain up-to-date authentication information used by one or both of supplemental data module 460 and data retrieval module 420 to retrieve data from one or more social media servers 330, 340, 350.

In another aspect, token management module 470 may be configured to periodically confirm the status of any or all authentication information stored at host server 320. In one embodiment, token management module 470 may be further configured to delete obsolete authentication information, obtain and/or store new authentication information, or update/renew existing authentication information.

In another embodiment, any changes to the authentication information, including deletions, additions, modifications, renewals, or updates may be stored in database 430 or may be stored locally at token management module 470. In an alternative embodiment, any changes to the authentication information may be stored in both database 430 and token management module 470 for, among other things, security and data redundancy purposes.

In another aspect, one or more performance assessments conducted at assessment module 450 may be transmitted to presentation module 480. The performance assessments may comprise assessments performed with respect to one or more assets, peer groups, and/or social media profiles. The assessments may comprise any one or more of the audience, voice, engagement, reach, influence, and impact associated with an asset, peer group, or social media profile. The assessments may also comprise any one or more of the share of the audience, voice, engagement, or reach associated with an asset, peer group, or social media profile. Moreover, the assessments may comprise the mean performance assessment for a peer group, a plurality of assets, or a plurality of social media profiles. The assessments may also comprise a standard deviation associated with the performance assessments of a peer group, a plurality of assets, or a plurality of social media profiles. Additionally, or alternatively, the assessments may comprise a percentile score for any one or more of the audience, voice, engagement, and reach of an asset or social media profile. The assessments may also comprise a T-score for any one or more of the audience, voice, engagement, and reach of an asset or social media profile. In further embodiments, the assessments may comprise one or more composite scores for an asset or social media profile, the composite score being based on components derived from any of a percentile score, a T-score, or a share assessment. In still further embodiments, the assessments transmitted from assessment module 450 to presentation module 480 may be any type of assessment described herein and may, in some instances, include historical assessment data pertaining to one or more assets, peer groups, or social media profiles.

In a further aspect, the assessment information received at presentation module 480 may be organized and/or prepared for presentation to the user via a graphical user interface ("GUI") appearing at the user device 310. In one embodiment, the GUI may present any of the aforementioned assessment information transmitted by assessment module 450. In a further embodiment, the GUI may simultaneously present performance information pertaining to an asset, as well as information pertaining to the other entities within an asset's peer group. In this manner, a side-by-side comparison of an asset's performance can be interpreted within the context of the performance of its peers. In one such embodiment, the asset's performance, or some aspect thereof, may be numerically ranked against the performance of other entities within the asset's peer group.

Additionally, or alternatively, the GUI may simultaneously present performance assessment information associated with multiple tiers of a peer group. In one embodiment, not only may performance assessment information corresponding to a plurality of assets belonging to a common tier be presented, but additional performance assessment information associated with one or more assets belonging to a higher or lower tier of the peer group may be presented to a user. Alternatively, additional performance assessment information associated with one or more assets belonging to a different peer group entirely may be simultaneously presented to the user.

In still further embodiments, any combination of one or more of the aforementioned aspects of performance assessment information associated with an asset, a peer group, or a social media profile may be simultaneously displayed within the GUI. Moreover, any performance assessment data stored in database 430 may be directly or indirectly transmitted to presentation module 480 for display in the GUI. In one embodiment, the performance assessment information displayed in the GUI may be based, at least in part, on user input. In particular, the user may desire to customize the information displayed in the GUI based on any one or more of assets, peer groups, social media profiles, an aspect of performance assessment (e.g., audience, voice, engagement, and reach), and any of the aforementioned share and/or score assessments. The user may further customize the information presented in the GUI by sorting based on the aforementioned tagged trait information associated with one or more assets and/or social media profiles. Of course, the examples provided herein are only illustrative of the possibilities, and any suitable presentation that the user finds helpful and/or places the performance assessment information in context for the user may be implemented. Further details regarding embodiments of the GUI are described below with respect to FIGS. 12-17.

Figure 5:
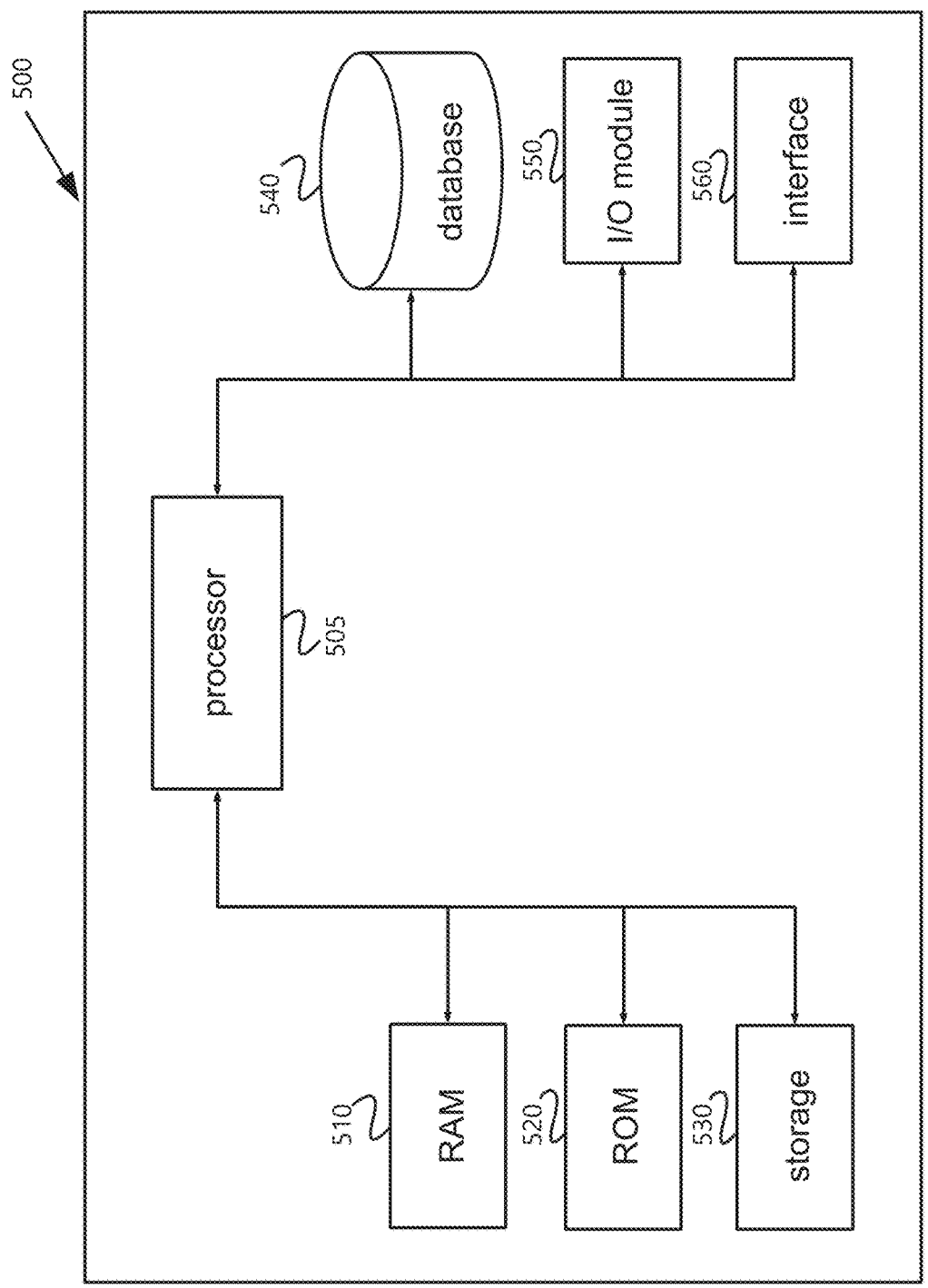
FIG. 5 depicts an illustrative embodiment of a computing system as described herein.

FIG. 5 depicts an illustrative processor-based computing system 500 representative of the type of computing system that may be present in or used in conjunction with any one or more of end user's device 310, host server 320, and social media servers 330, 340, 350. The computing system 500 is illustrative only and does not exclude the possibility of another processor- or controller-based system being used in or with one of the aforementioned components.

In one aspect, system 500 may include one or more hardware and/or software components configured to execute software programs, such as software for storing, processing, and analyzing data. For example, system 500 may include one or more hardware components such as, for example, processor 505, a random access memory (RAM) module 510, a read-only memory (ROM) module 520, a storage system 530, a database 540, one or more input/output (I/O) modules 550, and an interface module 560. Alternatively and/or additionally, system 500 may include one or more software components such as, for example, a computer-readable medium including computer-executable instructions for performing methods consistent with certain disclosed embodiments. It is contemplated that one or more of the hardware components listed above may be implemented using software. For example, storage 530 may include a software partition associated with one or more other hardware components of system 500. System 500 may include additional, fewer, and/or different components than those listed above. It is understood that the components listed above are illustrative only and not intended to be limiting or exclude suitable alternatives or additional components.

Processor 505 may include one or more processors, each configured to execute instructions and process data to perform one or more functions associated with system 500. The term "processor," as generally used herein, refers to any logic processing unit, such as one or more central processing units (CPUs), digital signal processors (DSPs), application specific integrated circuits (ASICs), field programmable gate arrays (FPGAs), and similar devices. As illustrated in FIG. 5, processor 505 may be communicatively coupled to RAM 510, ROM 520, storage 530, database 540, I/O module 550, and interface module 560. Processor 505 may be configured to execute sequences of computer program instructions to perform various processes, which will be described in detail below. The computer program instructions may be loaded into RAM for execution by processor 505.

RAM 510 and ROM 520 may each include one or more devices for storing information associated with an operation of system 500 and/or processor 505. For example, ROM 520 may include a memory device configured to access and store information associated with system 500, including information for identifying, initializing, and monitoring the operation of one or more components and subsystems of system 500. RAM 510 may include a memory device for storing data associated with one or more operations of processor 505. For example, ROM 520 may load instructions into RAM 510 for execution by processor 505.

Storage 530 may include any type of storage device configured to store information that processor 505 may need to perform processes consistent with the disclosed embodiments.

Database 540 may include one or more software and/or hardware components that cooperate to store, organize, sort, filter, and/or arrange data used by system 500 and/or processor 505. For example, database 540 may include user-specific account information, predetermined menu/display options, and other user preferences. Alternatively, database 540 may store additional and/or different information.

I/O module 550 may include one or more components configured to communicate information with a user associated with system 500. For example, I/O module 550 may include a console with an integrated keyboard and mouse to allow a user to input parameters associated with system 500. I/O module 550 may also include a display including a graphical user interface (GUI) for outputting information on a monitor. I/O module 550 may also include peripheral devices such as, for example, a printer for printing information associated with system 500, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 560 may include one or more components configured to transmit and receive data via a communication network, such as the Internet, a local area network, a workstation peer-to-peer network, a direct link network, a wireless network, or any other suitable communication channel. For example, interface 560 may include one or more modulators, demodulators, multiplexers, demultiplexers, network communication devices, wireless devices, antennas, modems, and any other type of device configured to enable data communication via a communication network.

Figure 6:
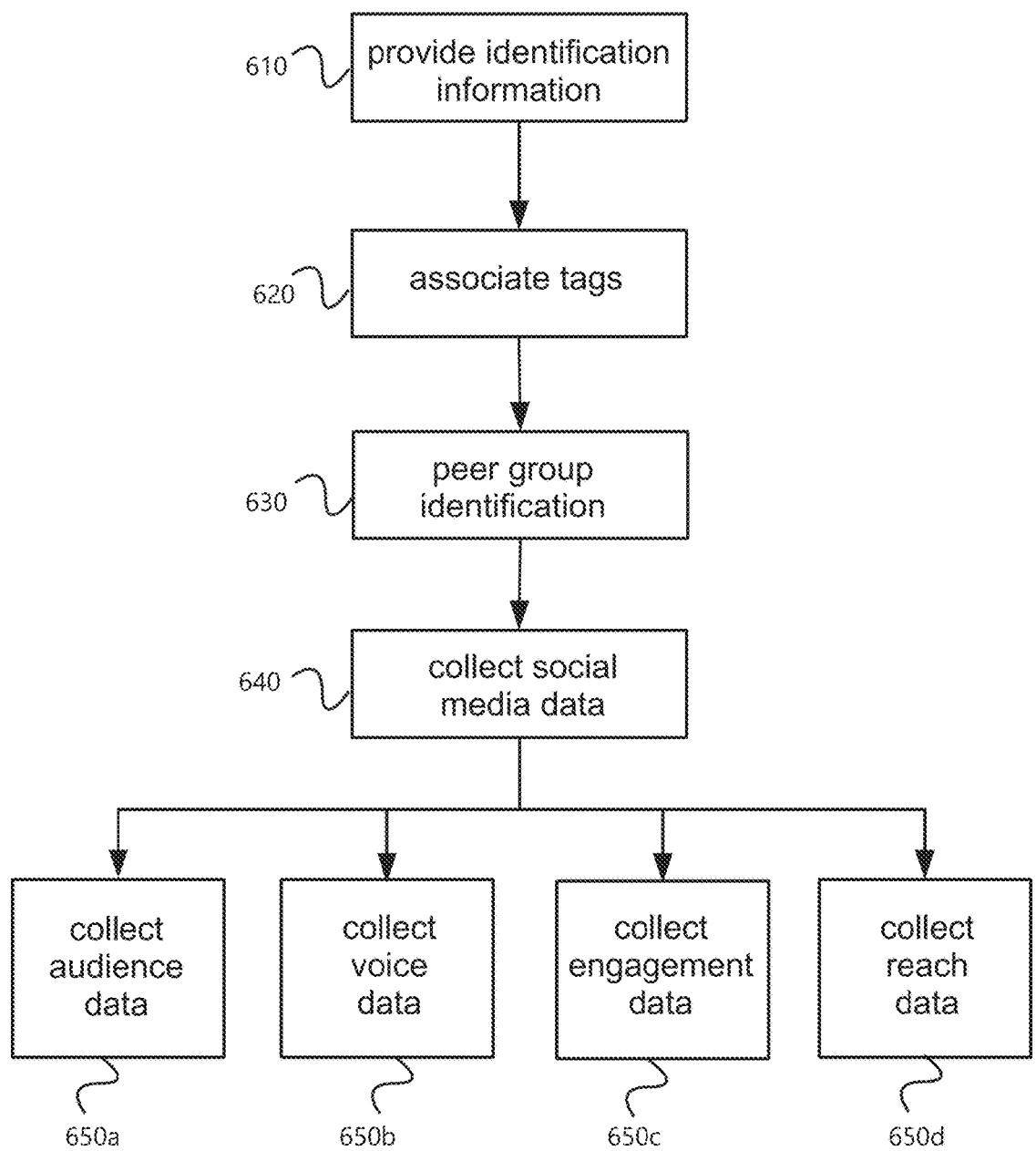
FIG. 6 depicts some aspects of an illustrative embodiment of a method as described herein.

FIG. 6 depicts an illustrative embodiment of a method for gathering information pertaining to one or more assets, peer groups, or social media profiles, and collecting any or all associated social media data from one or more social media platforms.

At step 610, identification information associated with one or more assets, entities, and/or social media profiles may be provided. In one embodiment, a user desiring to assess the social media performance of one or more assets or entities may provide information identifying those assets or entities, as well as information identifying one or more social media profiles to be associated with any or each of those assets/entities. As described above, each asset or entity may be associated with one or more social media profiles. Conversely, each social media profile may be associated with one or more assets or entities.

The user may utilize a personal computer, a tablet, a smart phone, or any other suitable, processor-based or controller-based device to provide the identifying information and/or transmit the identifying information to a host server. In particular, the user may provide the identifying information via a dedicated software application installed on a user device. Alternatively, the user may provide the identifying information to the host server via an Internet or web interface that facilitates communication between the user device and the host server (e.g., a remotely-hosted software application or software as a service, "SaaS"). In other embodiments, the user may communicate the identifying information in any suitable fashion.

In other embodiments, the user may only provide identifying information associated with one or more assets or entities. In response to receiving the identifying information, the host server may perform a search of one or more social media platforms and return a list of associated social media profiles to the user. In such an embodiment, the user may then select which of the returned social media profiles should or may be included in an assessment with respect to each asset or entity identified.

In another aspect, a user may also provide authentication information associated with each identified social media profile. The authentication information may, among other things, enable the host server to retrieve information pertaining to the social media profiles from one or more social media servers. In one embodiment, the authentication information may comprise a username and/or password for each identified social media profile. In other embodiments, the authentication information may comprise some other suitable information for gaining access to the information associated with a social media profile.

At step 620, the user may associate or tag each asset or entity for which social media performance is to be assessed with additional trait or characterization information. In one embodiment, the user may manually input and/or associate desired trait or characterization information with one or more assets. In other embodiments, the host server may provide the user with a plurality of tags to selectively associate with one or more assets. In still further embodiments, the host server may programmatically tag one or more assets with trait or characterization information based on other information provided by the user. It should be noted, however, that these examples are only illustrative and any suitable method or system for tagging one or more assets (i.e., associating one or more assets with trait or characterization information) is possible.

In one aspect, one or more assets may be tagged with any trait information that may be helpful in assessing the asset's performance, placing the asset's performance in a proper or desirable context, and/or identifying the asset's peers. The tagged information may also be useful in sorting the eventual performance assessment results presented to the user.

For example, the asset may be tagged with information including, but not limited to: information identifying the a peer group to which the asset belongs; an organization associated with the asset; information identifying one or more tiers within a peer group's hierarchical structure to which the asset belongs; information indicative of the industry in which the asset participates; information identifying the job responsibilities of the asset; information identifying which other assets within the peer group the asset may be related (and, for subsequent weighting purposes, how closely the asset may be related to any such other assets); information indicative of the geographic location, reach, or territory of the asset; information indicative of the market size associated with the asset's activities; information indicative of the target demographic associated with the asset's activities; and/or information identifying a time period associated with the asset's activities. It should be noted that these examples are only illustrative of the possibilities, and assets may be tagged with any suitable information useful in the assessment of the asset's social media performance, determining the members of an asset's peer group, and/or defining relationships between an asset and one or more other entities within an industry or hierarchical structure.

At step 630, one or more peers associated with each asset or entity may be identified. In one embodiment, any or all of the aforementioned asset/entity/social media profile identification information may serve to aid in the automated identification of those entities within an asset's peer group. In a further embodiment, any or all of the tagged information (i.e., trait or characterization information associated with one or more assets or social media profiles) may be used to identify the members of an asset's peer group. For example, any or all entities comprising one or more similar tags may be presumed to belong to a common peer group.

In one embodiment, the host server may programmatically identify one or more entities sharing one or more common traits as compared to an asset. In such an embodiment, the host server may automatedly construct peer groups for one or more of the assets. Alternatively, the host server may provide the user with a list of the one or more programmatically-identified entities, such that the user is then afforded an opportunity to selectively include one or more of those entities within each asset's peer group. Additionally or alternatively, the user may manually identify entities to include within each asset's peer group. Regardless of the particular method employed, for any or each asset, the user may be afforded an opportunity to customize a peer group comprising one or more other entities.

One or more social media profiles may then be associated with any or each entity within the peer group(s) in a manner substantially similar to that described above with respect to the user's assets or entities. Moreover, each peer group and/or peer group member may be tagged with trait or characterization information in a manner substantially similar to that described above with respect to previously-identified assets.

At step 640, the asset, entity, and peer group information, including any or all associated social media profile information, may be used to collect relevant data from one or more social media platforms. In one embodiment, a data request may be generated based, at least in part, on the asset, entity, or peer group information, including any or all associated social media profile information. The data request may then be transmitted to one or more social media platforms from either the host server or the user's device. In one embodiment, the data request may be transmitted to the social media platforms via one or more APIs associated with the respective platforms. In another embodiment, the data request may be accompanied by authentication information or credentials for verifying the validity of the request.

In one embodiment, the data request may request all of the data maintained in one or more databases of the social media platform. This data may include, but is not limited to, data associated with any or all members of the social media platform, including information provided directly from those members and information indicative of the members' activities over the social media platform.

In other embodiments, all of the data maintained in one or more databases of the social media platform that may be associated with one or more social media profiles may be requested. In particular, all information associated with the social media profiles identified in steps 610-630 may be requested. Such social media profiles may comprise one or more social media profiles associated with the assets and/or one or more social media profiles associated with other entities within those assets' respective peer groups. In a further embodiment, only a subset of data maintained in one or more databases of the social media platform that may be associated with one or more social media profiles may be requested. The data associated with a social media profile may include, but is not limited to, data associated with those assets, entities, or peer groups affiliated with the social media profile, as well as data associated with those members of the social media platform that in some way interacted with the respective social media profile.

In another aspect, and depending upon the permissions and/or policies of each social media platform, a data request may be transmitted to one or more social media platforms to initiate the transmission of: historical data associated with one or more social media profiles; an ongoing, real-time stream of data associated with one or more social media profiles; or periodic transmissions of the latest available data at predetermined time intervals. In some embodiments, any one or more of the aforementioned requests may be accomplished with a single request and/or transmission of authentication information, or alternatively, may be accomplished through a plurality of requests and/or authentication information transmissions. For example, where an ongoing, real-time data stream associated with one or more social media profiles is requested, updated authentication information may be periodically transmitted at predetermined intervals in order to receive the stream in an uninterrupted fashion.

In another aspect, where one or more social media profiles may include public conversations, as discussed previously herein, a data request transmitted to one or more social media platforms may comprise one or more keywords for searching any or all publically available data of the respective social media platform. In an alternative embodiment, all publically available data may be requested, or a subset of the publically available data may be requested based, at least in part, on some criteria different from, or in addition to, keywords.

In a further aspect, any data may be requested from one or more social media servers 330, 340, 350 that may be useful in conjunction with assessing the social media performance of an asset, entity, or peer group. In one embodiment, and as set forth in steps 650a-650d, data may be requested from one or more social media platforms for assessing any one or more of the audience, voice, engagement, and reach of an asset's social media presence or performance. As described above, an asset's social media audience, voice, engagement, or reach may comprise the audience, voice, engagement, or reach, respectively, of one or more social media profiles associated with that asset.

In particular, at step 650a, data indicative of the audience associated with an asset or social media profile may be retrieved or collected from one or more respective social media platforms. As previously described, the audience associated with a social media profile may reflect a relationship between a social media profile and other users of the social media platform. In one embodiment, the audience associated with a social media profile may indicate the number of social media users that have confirmed a relationship with the social media profile on the respective social media platform. In a further embodiment, and depending on the nomenclature used by the respective social media platform, the audience associated with a social media profile may be based, at least in part, on one or more components, including but not limited to, "friends," "followers," or "fans" associated with the social media profile. In some embodiments, these components may or may not be weighted equally when determining the audience associated with a social media profile.

At step 650b, data indicative of the voice associated with an asset or social media profile may be retrieved or collected form one or more respective social media platforms. As described above, the voice associated with a social media profile may reflect a messaging activity level associated with a social media profile. In one embodiment, the voice associated with a social media profile may indicate the frequency with which content is published to the social media platform by an entity that maintains the social media profile. In a further embodiment, and depending on the nomenclature used by the respective social media platform, the voice associated with a social media profile may be based, at least in part, on one or more components, including but not limited to, "posts," "comments," "tweets," "replies," or "re-tweets" associated with the social media profile. In some embodiments, these components may or may not be weighted equally when determining the voice associated with a social media profile. In still further embodiments, content published by the audience or other members of the respective social media platform may also be included among the components of the voice associated with a social media profile, though content published by the asset that maintains the social media profile may be weighed differently than content published by the audience or other members. Additionally, information indicative of the media format associated with each component may be retrieved or collected from the one or more social media platforms. Such format information may be taken into consideration when weighing the components.

Data indicative of the engagement associated with an asset or social media profile may be retrieved or collected form one or more respective social media platforms at step 650c. As described above, the engagement associated with a social media profile may reflect an ability for the social media profile to communicate a message reliably, i.e., while the voice associated with a social media profile may indicate the frequency with which content is published by an entity that maintains the social media profile, engagement may indicate whether that activity is worthwhile. In one embodiment, the engagement associated with a social media profile may indicate whether other users of the respective social media platform are interacting with the published content. In a further embodiment, and depending on the nomenclature used by the respective social media platform, the engagement associated with a social media profile may be based, at least in part, on one or more components, including but not limited to, "shares," "likes," "comments," "mentions," "re-tweets," "favorites," and "replies," and may also include, but may not be limited to, hashtag mentions and/or search term/keyword matches within a public conversation. In some embodiments, these components may or may not be weighted equally when determining the engagement associated with a social media profile. In still further embodiments, interactions with published content by any one or more of the asset that maintains the social media profile, the audience of the social media profile, and other members of the respective social media platform may be included in one or more of the components of the voice associated with the social media profile, though interactions by the asset that maintains the social media profile may be weighed differently than interactions by the audience or other members. Additionally, information indicative of the media format associated with each component may be retrieved or collected from the one or more social media platforms. Such format information may be taken into consideration when weighing the components.

In a further aspect, data indicative of the reach associated with an asset or social media profile may be retrieved or collected form one or more respective social media platforms at step 650d. As set forth above, the reach associated with a social media profile may reflect a potential first and second order audience, i.e., while the audience associated with a social media profile may indicate the number of platform members that have confirmed a relationship with the social media profile, reach may indicate whether that audience is a beneficial or useful audience. In one embodiment, the reach associated with a social media profile may indicate both the audience associated with the social media profile, as well as the audience of the audience. In a further embodiment, rather than simply taking into consideration the audience of the audience, the reach associated with a social media profile may take into consideration the audience of the engaged audience, i.e., the audience of those social media platform members that not only are considered a part of the social media profile's audience, but those members that have engaged the content associated with the social media profile.

In alternative embodiments, data indicative of any one or more, but not necessarily each, of the audience, voice, engagement, and reach associated with an asset or social media profile may be retrieved. Further, the data indicative of one or more of the audience, voice, engagement, and/or reach associated with an asset or social media profile may be retrieved or collected in any suitable order or it may be collected simultaneously or at an overlapping time. Data collection restraints and/or other limitations imposed by the one or more social media platforms may further dictate how, when, or in what order particular data may be retrieved.

Figure 7:
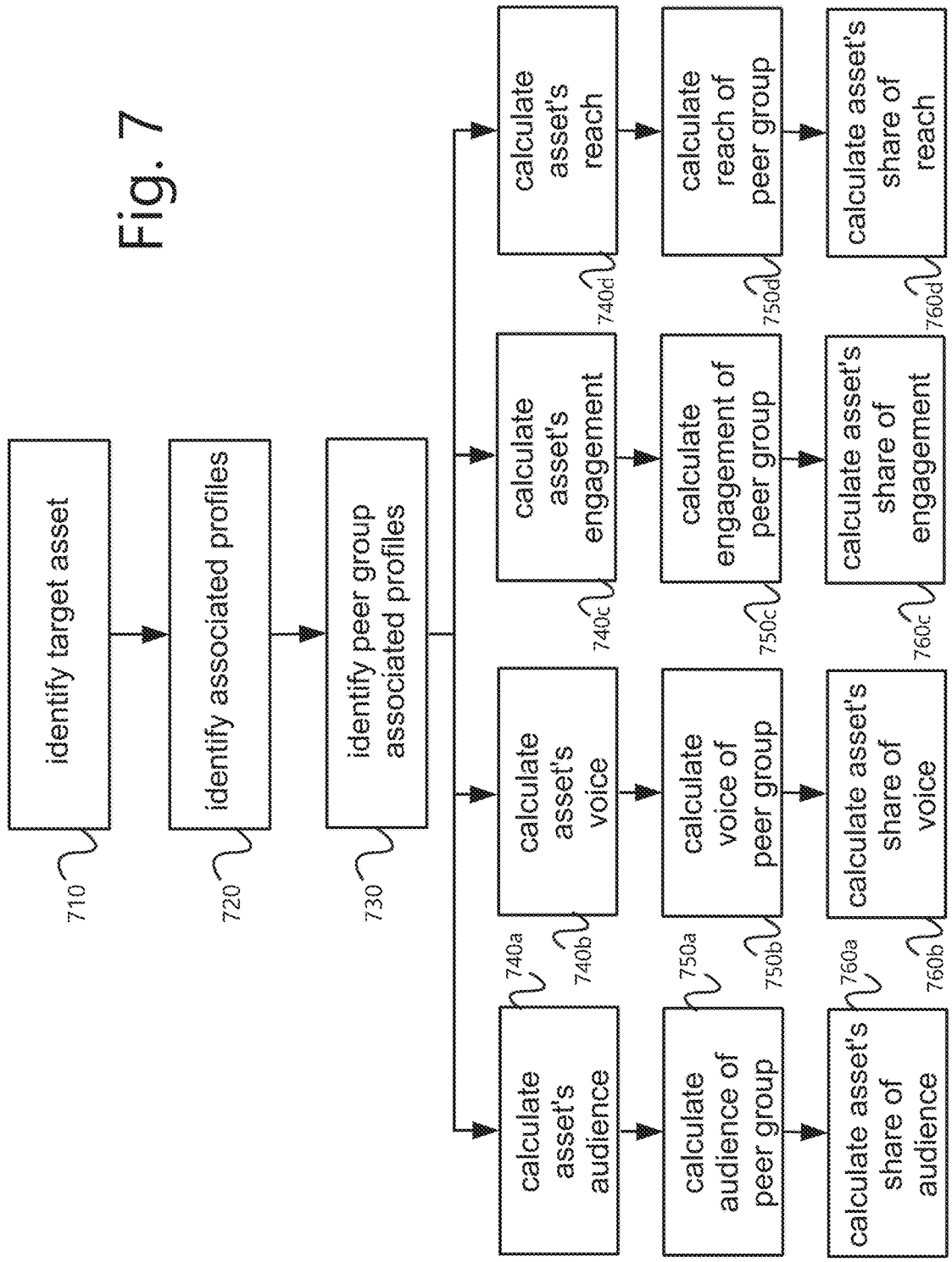
FIG. 7 depicts some aspects of an illustrative embodiment of a method as described herein.

FIG. 7 depicts an illustrative method for determining the aforementioned share assessment pertaining to an asset. At step 710, an asset for which one or more share assessments is to be made may be identified. In one embodiment, a share assessment may be performed with respect to an asset identified by a user or the host server. In alternative embodiments, the user or host server may identify a peer group, the assets of which are to be assessed. In such an embodiment, assets belonging to the identified peer group may be serially assessed, one after another, or share assessments for a plurality of assets may be conducted in parallel, i.e., simultaneously or at overlapping times.

Regardless of how an asset is identified, at step 720, each of the asset's associated social media profiles may be identified. In one embodiment, one or more social media profiles may be stored in an accessible database and associated with corresponding assets. In this manner, the one or more social media profiles that serve as the basis for an asset's social media performance may be easily identified and/or recalled.

Similarly, the other entities belonging to the asset's peer group may be identified at step 730. In one embodiment, peer group information may be stored in an accessible database and associated with corresponding assets. In this manner, the one or more peer groups to which an asset belongs, and any entity therein, may be easily identified and/or recalled. Further, upon identification of each entity in the asset's peer group, one or more of the social profiles that serve as the basis for each of those entity's social media performance may be identified and/or recalled in a manner similar to that described above with respect to the asset.

At steps 740, one or more aspects of the asset's social media performance may be assessed. In one embodiment, the audience, voice, engagement, and reach associated with an asset's social media performance may be assessed at steps 740a, 740b, 740c, and 740d, respectively. In a further embodiment, any one or more of the audience, voice, engagement, and reach associated with an asset's social media performance may be determined using Equation (4)(a) or (4)(b), above. In particular, where Equation (4)(b) is used, each social media profile contributing to the assessment of the respective aspect (i.e., audience, voice, engagement, or reach) may be assigned a weight. Such weights may reflect the relative control or influence an asset has with respect to activities associated with social media profile. Alternatively, or additionally, such weights may reflect the inter- or intra-organizational proximity of the social media profile to the asset. In other words, a social media profile directly maintained by the asset may be assigned a greater weight than a social media profile directly maintained by another entity within the same or a different tier of a peer group. Of course, other suitable methods and/or algorithms may also be used to determine the audience, voice, engagement, and/or reach associated with the social media performance of an asset and Equations (4)(a) and (4)(b) are only illustrative of the possibilities.

It should also be noted that any one or more of steps 740a-740d may be performed in any suitable order. Alternatively, or additionally, any one or more of steps 740a-740d may be performed in parallel, simultaneously, or at overlapping times.

At step 750, one or more aspects of the social media performance of the peer group to which the asset belongs may be assessed. Similar to steps 740a-740d, the audience, voice, engagement, and reach associated with the peer group's social media performance may be assessed at steps 750a, 750b, 750c, and 750d, respectively. Assessing these aspects of the peer group's performance is substantially similar to assessing the same aspects of the asset's performance. In one embodiment, whereas assessing the performance of an asset may comprise assessing the performance of each social media profile associated with the asset, assessing the performance of a peer group may comprise assessing the performance of each social media profile associated with the peer group (which would necessarily include the same social media profiles assessed with respect to the asset). Thus, as is the case when assessing an asset, any one or more of the audience, voice, engagement, and reach associated with a peer group's social media performance may be determined using Equation (4)(a) or (4)(b), above. Where Equation (4)(b) is used, each social media profile contributing to the assessment of the respective aspect (i.e., audience, voice, engagement, or reach) of the peer group's performance may be assigned a weight. Other suitable methods and/or algorithms may also be used to determine the audience, voice, engagement, and/or reach associated with the social media performance of a peer group and Equations (4)(a) and (4)(b) are only illustrative of the possibilities. Moreover, it should be noted that any one or more of steps 740a-740d and 750a-750d may be performed in any suitable order. Alternatively, or additionally, any one or more of steps 740a-740d and 750a-750d may be performed in parallel, simultaneously, or at overlapping times.

Once the audience, voice, engagement, and/or reach associated with both an asset's social media performance and a corresponding peer group's social media performance has been determined, the asset's share of the audience, share of the voice, share of the engagement, and/or share of the reach associated with a peer group may be determined. In one embodiment, an asset's share of audience, voice, engagement, and/or reach may represent a portion or percentage of a total audience, voice, engagement, and/or reach, respectively, associated with the peer group that includes the asset. In a further embodiment, the share of an asset's audience, voice, engagement, and/or reach may be determined using Equation (7), above. Of course, other suitable methods and/or algorithms may also be used to determine an asset's share of the audience, voice, engagement, and/or reach associated with the social media performance of a peer group and Equation (7) is only illustrative of the possibilities.

Figure 8:
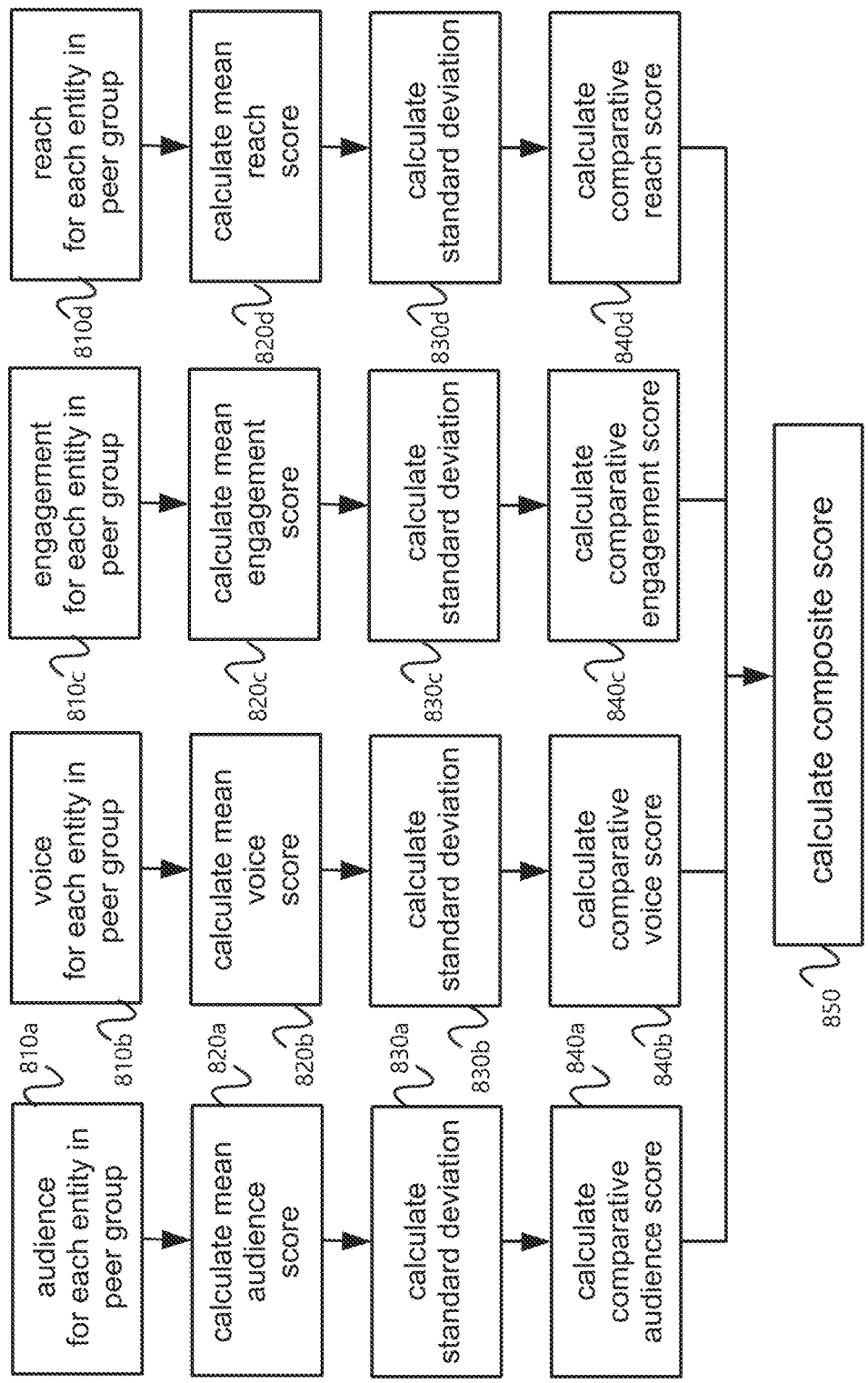
FIG. 8 depicts some aspects of an illustrative embodiment of a method as described herein.

FIG. 8 depicts an illustrative embodiment of a method for determining a comparative score for one or more assets or entities in a peer group. In one embodiment, a comparative score may be determined for any one or more of the audience, voice, engagement, or reach, associated with an asset's social media performance. In a further embodiment, a composite comparative score may be determined for one or more entities, the composite comparative score being based, at least in part, on the comparative scores determined for the audience, voice, engagement, and/or reach of the corresponding asset. Such comparative scores and composite comparative scores may then be used to directly compare and/or rank assets within a peer group.

In one embodiment, at step 810, aspects of the social media performance of a plurality of assets may be assessed. In one embodiment, the audience, voice, engagement, and reach associated with each asset's social media performance may be assessed at steps 810a, 810b, 810c, and 810d, respectively. In a further embodiment, any one or more of the audience, voice, engagement, and reach associated with each asset's social media performance may be determined using Equation (4)(a) or (4)(b), above. In particular, where Equation (4)(b) is used, each social media profile contributing to the assessment of a respective aspect (i.e., audience, voice, engagement, or reach) for each asset may be assigned a weight. Of course, other suitable methods and/or algorithms may also be used to determine the audience, voice, engagement, and/or reach associated with the social media performance of each asset and Equations (4)(a) and (4)(b) are only illustrative of the possibilities.

It should also be noted that any one or more of steps 810a-810d may be performed in any suitable order. Alternatively, or additionally, any one or more of steps 810a-810d may be performed in parallel, simultaneously, or at overlapping times.

At step 820, the performance assessments associated with each asset may be used to calculate the average social media performance across the peer group. In particular, the audience associated with each asset in the peer group (step 810a) may be used to determine an average audience for the peer group (step 820a), the voice associated with each asset in the peer group (step 810b) may be used to determine an average voice for the peer group (820b), the engagement associated with each asset in the peer group (step 810c) may be used to determine an average engagement for the peer group (820c), and the reach associated with each asset in the peer group (step 810d) may be used to determine an average reach for the peer group (820d). In one embodiment, Equation (8), described above, may be used to determine the average social media performance for any one or more aspects of the peer group. Of course, other suitable methods and/or algorithms may also be used to determine the average audience, voice, engagement, and/or reach associated with the social media performance of a peer group and Equation (8) is only illustrative of the possibilities.

It should also be noted that any one or more of steps 820a-820d may be performed in any suitable order. Alternatively, or additionally, any one or more of steps 820a-820f may be performed in parallel, simultaneously, or at overlapping times.

At step 830, the standard deviation associated with one or more aspects of a peer group's performance assessments may be determined. In particular, the audience associated with each asset in the peer group (step 810a) and the average audience for the peer group (step 820a) may be used to determine the standard deviation of the audience associated with the peer group (step 830a), the voice associated with each asset in the peer group (step 810b) and the average voice for the peer group (step 820b) may be used to determine the standard deviation of the voice associated with the peer group (step 830b), the engagement associated with each asset in the peer group (step 810c) and the average engagement for the peer group (step 820c) may be used to determine the standard deviation of the engagement associated with the peer group (step 830c), and the reach associated with each asset in the peer group (step 810d) and the average reach for the peer group (step 820d) may be used to determine the standard deviation of the reach associated with the peer group (step 830d). In one embodiment, Equation (9), described above, may be used to determine the standard deviation associated with any one or more aspects of the peer group's social media performance. Of course, other suitable methods and/or algorithms may also be used to determine the standard deviation associated with any one or more aspects of the peer group's social media performance and Equation (9) is only illustrative of the possibilities.

It should also be noted that any one or more of steps 830a-830d may be performed in any suitable order. Alternatively, or additionally, any one or more of steps 830a-830d may be performed in parallel, simultaneously, or at overlapping times.

At step 840, a comparative score for each aspect of each asset's social media performance may be determined. In one embodiment, a comparative score may be determined for any one or more of the audience (step 840a), voice (step 840b), engagement (step 840c), or reach (step 840d) associated with each asset of a peer group. Such comparative scores may then be used to directly compare and/or rank assets or entities within a peer group against each other within the context of the corresponding aspect. In one embodiment, a comparative score for each aspect of each asset's social media performance may be determined using Equation (10), above. In particular, Equation (10) may be used to determine a percentile score for each aspect of each asset's social media performance. As described above, there may be a number of advantages to presenting and/or ranking a plurality of assets in accordance with their respective percentile scores. For example, such a scoring methodology yields an intuitive range of resulting scores bound by 0 and 100, and it may be immediately recognized in what percentile of the peer group the asset's performance falls. This methodology also provides for easier movement of scores within the mid-range of the peer group than at the tails or extremes. In other words, an asset may find it easier to improve its percentile score from 50 to 60 than from 60 to 70, and easier still than improving from 70 to 80. In fact, improvement or degradation of a percentile score becomes very difficult the closer the asset's score approaches 100 or 0, respectively.

In another embodiment, a comparative score for each aspect of each asset's social media performance may be determined using Equation (11), above. In particular, Equation (11) may be used to determine a T-score for each aspect of each asset's social media performance. As described previously herein, presenting and/or ranking assets or entities within a peer group in accordance with their respective T-scores also has advantages. Like the percentile scores, this methodology yields an intuitive range of resulting scores bound by 0 and 100. Additionally, this methods affords a wider range of resulting scores at the extreme ends of the spectrum, as percentile scores may result in a score of 0 for all entities with assessment scores falling more than 3 standard deviations below the mean for the peer group and/or a score of 100 for all entities with assessment scores greater than 3 standard deviations above the mean for the peer group.

Of course, other suitable methods and/or algorithms may also be used to determine a comparative score associated with any one or more aspects of each asset's social media performance and Equations (10) and (11) are only illustrative of the possibilities. It should also be noted that any one or more of steps 840a-840f may be performed in any suitable order. Alternatively, or additionally, any one or more of steps 840a-840f may be performed in parallel, simultaneously, or at overlapping times.

At step 850, any one or more comparative scores associated with respective aspects of an asset's social media performance may be combined into a single composite score. For example, a composite score for an asset may be determined based, at least in part, on any one or more of its comparative audience score, its comparative voice score, its comparative engagement score, and/or its comparative reach score. In one embodiment, a composite score may be determined for one or more assets in the peer group using Equation (12), above. In one aspect, either a percentile score or a T-score (described above with respect to steps 830a-830d) may be used to determine each component upon which the composite score may be based (provided all components of the composite score are based on the same scoring methodology).

In a further embodiment, the influence and impact determinations for an asset (e.g., Equations (5) and (6)) may also be taken into consideration when calculating the composite score associated with one or more assets. In such an embodiment, the influence and/or impact components may be afforded their own respective weights when determining a composite score that includes them.

In alternative embodiments, a composite score may also be calculated based on the share of audience, share of voice, share of engagement, and share of reach assessments described above and depicted in FIG. 7. Such a composite score, in one embodiment, may be determined using Equation (12) and may be based, at least in part, on one or more share assessments determined using Equation (7).

Figure 9:
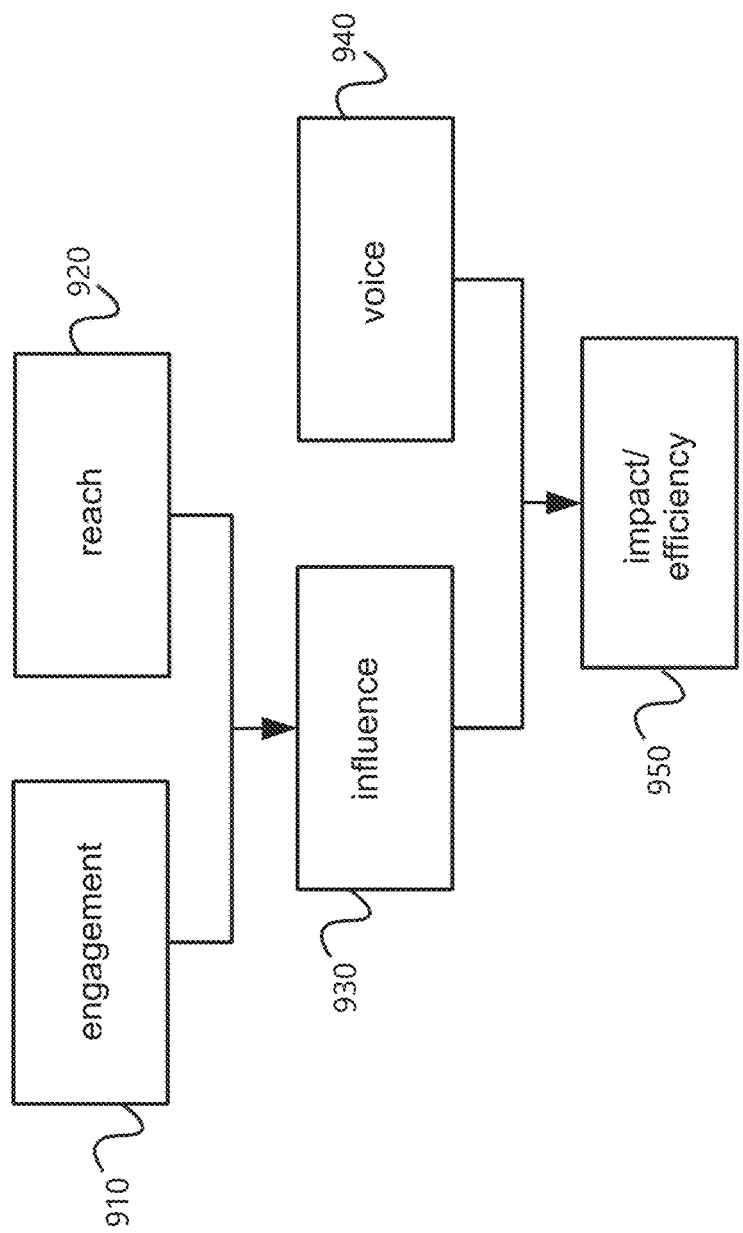
FIG. 9 depicts some aspects of an illustrative embodiment of a method as described herein.

FIG. 9 depicts an illustrative embodiment of a method for determining the influence and impact associated with a social media profile's or asset's social media performance. As described above, the influence associated with a social media profile or asset may reflect, among other things, an ability for the social media profile to convert reach into engagement. In one embodiment, the influence associated with a social media profile or asset may represent a ratio of the engagement associated with the social media profile or asset to the reach associated with the social media profile or asset. Thus, and for example, assuming two social media profiles having equal reach, the social media profile associated with greater engagement may have greater influence.

On the other hand, the impact associated with a social media profile or asset may reflect, among other things, an efficiency with which the social media profile or asset may generate influence and/or engagement. In one embodiment, the impact associated with a social media profile or asset may represent a ratio of the engagement associated with the social media profile or asset to the reach associated with the social media profile (similar to the influence) but further take into account the voice associated with the social media profile. Thus, and for example, assuming two social media profiles or assets having equal influence and/or engagement, the social media profile or asset associated with less voice may have greater impact, as less energy may be exerted while achieving equal results as compared to the other social media profile or asset.

In one aspect, at steps 910 and 920, the engagement and reach associated with a social media profile or asset may be determined. In one embodiment, the engagement and reach associated with the social media performance of a social media profile may be determined using Equation (1), described above, while the engagement and reach associated with the social media performance of an asset (comprising one or more social media profiles) may be determined using either of Equations (4)(a) or (4)(b), also described above. Of course, other suitable methods and/or algorithms may also be used to determine the engagement and reach associated with a social media profile or asset, and Equations (1), (4)(a), and (4)(b) are only illustrative of the possibilities.

It should also be noted that steps 910 and 920 may be performed in any suitable order. Alternatively, or additionally, steps 910 and 920 may be performed in parallel, simultaneously, or at overlapping times.

At step 930, an influence associated with the social media profile or asset may be determined based, at least in part, on the engagement and reach determinations made at steps 910 and 920, respectively. In one embodiment, the influence associated with the social media performance of a social media profile may be determined using Equation (2), described above, while the influence associated with the social media performance of an asset (comprising one or more social media profiles) may be determined using Equation (5), also described above. Of course, other suitable methods and/or algorithms may also be used to determine the influence associated with a social media profile or asset, and Equations (2) and (5) are only illustrative of the possibilities.

At step 940, the voice associated with a social media profile or asset may be determined. In one embodiment, the voice associated with the social media performance of a social media profile may be determined using Equation (1), described above, while the voice associated with the social media performance of an asset (comprising one or more social media profiles) may be determined using either of Equations (4)(a) or (4)(b), also described above. Of course, other suitable methods and/or algorithms may also be used to determine the voice associated with a social media profile or asset, and Equations (1), (4)(a), and (4)(b) are only illustrative of the possibilities.

It should also be noted that steps 930 and 940 may be performed in any suitable order. Alternatively, or additionally, steps 930 and 940 may be performed in parallel, simultaneously, or at overlapping times. Moreover, steps 910, 920, and 940 may be performed in in any order, parallel, simultaneously, or at overlapping times.

At step 950, an impact associated with the social media profile or asset may be determined based, at least in part, on the influence and voice determinations made at steps 930 and 940, respectively. In one embodiment, the impact associated with the social media performance of a social media profile may be determined using Equation (3), described above, while the impact associated with the social media performance of an asset (comprising one or more social media profiles) may be determined using Equation (6), also described above. Of course, other suitable methods and/or algorithms may also be used to determine the impact associated with a social media profile or asset, and Equations (3) and (6) are only illustrative of the possibilities.

It should also be noted that steps 930 and 950 may be performed in any suitable order. Alternatively, or additionally, steps 930 and 950 may be performed in parallel, simultaneously, or at overlapping times.

Figure 10:
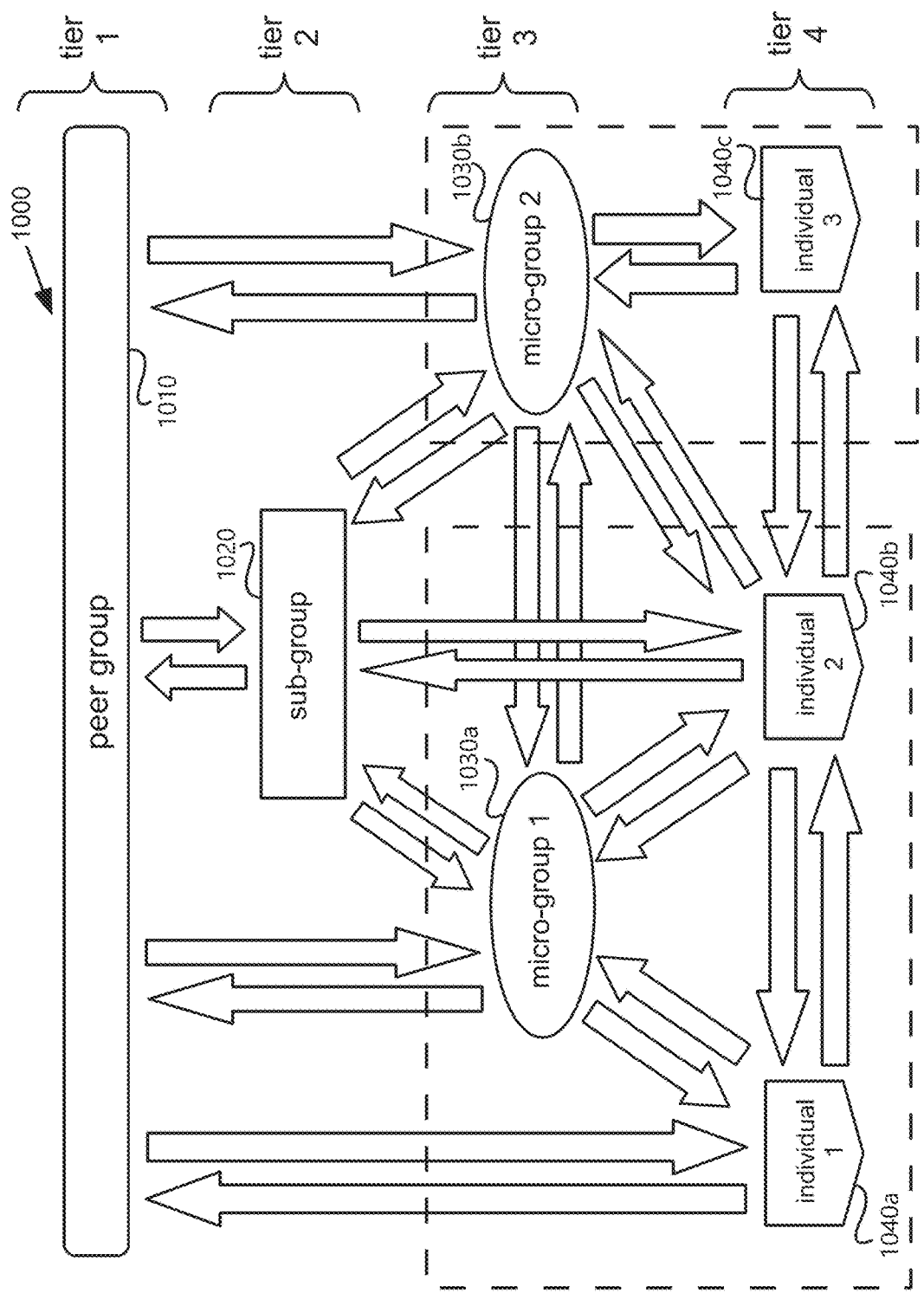
FIG. 10 depicts some aspects of an illustrative embodiment of a system as described herein.

FIG. 10 depicts illustrative examples of how one asset's social media performance may impact other assets' social media performance within entity peer group, however that peer group may be defined. In particular, examples of both vertical and horizontal goodwill are shown.

In one aspect, a hierarchical structure 1000 is depicted that may be substantially similar to structure 100 depicted in FIG. 1. In one embodiment, structure 1000 may comprise four vertical tiers, each tier representing one or more subsets or groupings within the hierarchy. Of course, in alternative embodiments, structure 1000 may comprise additional or fewer tiers. In particular, the first tier may represent a peer group or asset that may comprise every other asset within the hierarchical structure. Each subsequent tier, i.e., tiers 2, 3, and 4, may comprise progressively narrower subsets or groups than the previous tier and/or represent one or more subsets or groups of the assets belonging to the previous tier in the hierarchy. At tier 4, the lowest tier in the embodiment depicted in FIG. 10, each asset may represent an individual or even a subset of an individual's responsibilities.

In another aspect, any or all assets within structure 1000 may be associated with one or more social media profiles. The profiles may comprise platform-specific user profiles and may be used to, among other things, communicate announcements, politicize events, advertise products, disseminate news stories, or otherwise reach customers, consumers, or the public. For example, one or more assets of structure 1000 may be associated with one or more of a FACEBOOK, TWITTER, LINKEDIN, and INSTAGRAM profile.

In a further aspect, where the audience, voice, engagement, and/or reach associated with an asset's social media performance may be determined using Equation (4)(b), each social media profile upon which the determination may be based may be afforded its own weight, c. In this manner, and in one embodiment, social media profiles more closely related to an asset and/or more reflective of the asset's social media activity may be afforded greater weight than other social media profiles that are more tangentially related to the asset. In other embodiments, the weighting of the various social media profiles to be included in a performance assessment may depend upon other factors, such as the particular social media platform associated with the social media profile.

In one embodiment, each asset within a peer group may have one or more social media profiles for which it is responsible for placing content and/or engaging with the public. Thus, when assessing the social media performance of an asset, any such social media profiles for which the asset is directly responsible, i.e., "primary social media profiles," may be included in the assessment. However, social media profiles for which the asset may not be directly responsible, i.e., "secondary social media profiles," may also be included in the assessment. For example, and again where an assessment of an asset's performance weights the various social media profiles that may be taken into account, primary social media profiles may be afforded greater weight than secondary social media profiles.

Moreover, depending upon whether the entity that is directly responsible for a secondary social media profile may be classified as within the same tier of structure 1000 as the asset being assessed or a different tier than the asset being assessed, the effect that a secondary social media profile may have upon the asset's performance assessment may be deemed horizontal goodwill or vertical goodwill, respectively. Thus, an assessment of the social media performance of each asset within hierarchical structure 1000 may account for the contributions, both positive and negative, of other entities within the same structure.

In one aspect, the arrows depicted in FIG. 10 may represent examples of the effect one asset's social media performance may have on another, i.e., horizontal and vertical goodwill. More precisely, the arrows depicted in FIG. 10 may represent the effect that a secondary social media profile directly maintained by one asset has on the social media performance of another asset that does not have direct responsibility for the secondary social media profile.

In one embodiment, each of asset 1040a and 1040b may be associated with one or more social media profiles that they maintain, or are directly responsible for, independent of one another (i.e., respective primary social media profiles). Nonetheless, when assessing the social media performance of asset 1040a, the primary social media profile of asset 1040b may be included in the assessment as a secondary social media profile associated with asset 1040a. In a further embodiment, a portion of asset 1040a's assessment attributable to, or based on, that secondary social media profile may be afforded less weight than the portion attributable to, or based on, a primary social media profile. Moreover, because asset 1040a and 1040b may belong to the same tier of peer group 1010, any effect that a social media profile maintained by asset 1040b may have on the performance assessment of asset 1040a, positive or negative, may be deemed horizontal goodwill.

In another embodiment, any similar effect that a social media profile maintained by asset 1040b may have on a performance assessment of 1040c, positive or negative, may also be deemed horizontal goodwill. As depicted in FIG. 10, though assets 1040a, 1040b, and 1040c each belong to a common tier of peer group 1010 (i.e., a fourth tier), assets 1040a and 1040b may belong to a common asset 1030a of tier 3. Asset 1030a may be, for example, a department, section, division, or local office of peer group 1010. Asset 1040c, on the other hand, may belong to an asset 1030b, which may belong to a same tier of peer group 1010 as asset 1030a (i.e., the third tier). In such an embodiment, when assessing the social media performance of 1040a, not only may an assessment of any social media profiles maintained by asset 1040b be taken into consideration, but any social media profiles maintained by asset 1040c may also be taken into consideration. Further, any effect that a social media profile maintained by asset 1040c may have on the performance assessment of asset 1040a, positive or negative, may be deemed horizontal goodwill. However, because assets 1040a and 1040b may belong to a common tier 3 entity (i.e., asset 1030a) and asset 1040c may belong to a different tier 3 entity (i.e., asset 1030b), a portion of asset 1040a's assessment attributable to, or based on, a social media profile maintained by asset 1040c may be afforded less weight than a portion attributable to, or based on, a social media profile maintained by asset 1040b.

Similar instances of horizontal goodwill, i.e., the effect one asset's primary social media profile's performance may have on the performance assessment of another asset belonging to a same tier, may also be present at other tiers of peer group 1010. For example, any effect that the primary social media profile of asset 1030a may have on an assessment of the social media performance of asset 1030b may be deemed horizontal goodwill, and vice versa. Comparable instances of horizontal goodwill may also be present within the second tier of peer group 1010 where the performance of a primary social media profile of asset 1020 may affect a performance assessment of another entity belonging to the second tier (not shown in FIG. 10).

In another aspect, examples of vertical goodwill are also depicted in FIG. 10. For example, a social media performance assessment of asset 1030a may not only take one or more primary social media profiles into consideration, but also one or more social media profiles maintained by asset 1040a or 1040b. Because asset 1030a belongs to a different tier of peer group 1010 (i.e., a third tier) as compared to assets 1040a and 1040b (i.e., a second tier), any effect that the social media profiles maintained by asset 1040a or 1040b may have on a performance assessment of asset 1030a, positive or negative, may be deemed vertical goodwill. It should be noted, however, that a weight afforded each of the social media profiles maintained by assets 1040a and 1040b may not necessarily be the same.

In another embodiment, the performance of a social media profile maintained by asset 1040b (a fourth tier asset), for example, may be taken into consideration when assessing the social media performance of asset 1030b (a third tier asset), despite the fact that asset 1040b may not belong to an entity subset or group of asset 1030b. In such an embodiment, the performance of a social media profile maintained by asset 1040*b* may be weighted in a manner reflective of the tangential relationship between asset 1040*b* and asset 1030*b*. For example, where an assessment of the social media performance of asset 1030*b* may take into consideration the performance of social media profiles maintained by both assets 1040*b* and 1040*c*, the performance of the social media profile maintained by asset 1040*c* may be afforded more weight than the performance of the social media profile maintained by asset 1040*b*. Of course, these examples are only illustrative of the possibilities, and any suitable weight may be afforded the performance of any social media profile in structure 1000.

In a further aspect, vertical goodwill may not necessarily extend only one vertical tier. In one embodiment, not only may the performance of a social media profile maintained by asset 1040*a* (a fourth tier asset) be taken into consideration when assessing the social media performance of asset 1030*a* (a third tier asset), but the performance of the social media profile maintained by asset 1040 may also be taken into consideration when assessing the social media performance of asset 1020 or 1010. In such embodiments, a weight afforded the performance of a social media profile maintained by asset 1040*a* may be reflective of the degrees of separation (i.e., the organizational or structural distance) between asset 1040*a* and the asset whose performance is being assessed. In other words, the weight afforded the performance of a social media profile maintained by asset 1040*a* may be greater when assessing the performance of asset 1030*a* than when assessing the performance of asset 1020, and greater still than when assessing the performance of asset 1010.

Though the foregoing examples of vertical goodwill demonstrate how the performance of a social media profile maintained by an asset may be taken into consideration during a performance assessment an asset belonging to a higher tier, vertical goodwill may also flow in an opposite direction. For example, the performance of a social media profile maintained by any one or more of asset 1010, asset 1020, asset 1030*a*, and asset 1030*b* may be taken into consideration when assessing the social media performance of asset 1040*a*, 1040*b*, or 1040*c*. Moreover, a weight afforded the performance of a social media profile maintained by an entity belonging to a higher tier may reflect the degrees of separation, or structural distance, between the maintaining asset and the asset whose performance is being assessed.

In addition to assessing the performance of one or more assets and/or social media profiles, the "velocity" of a content item published on a social media platform may also be assessed. As described above, the engagement associated with a social media profile may indicate whether members of a social media platform are interacting with content published by an asset maintaining the social media profile. As described above, and depending on the nomenclature used by the respective social media platform, the engagement associated with a social media profile may be based, at least in part, on one or more components, including but not limited to, "shares," "likes," "comments," "mentions," "re-tweets," "favorites," and "replies," and may also include, but may not be limited to, hashtag mentions and/or search term/keyword matches within a public conversation.

Velocity, as used herein, may represent a derivative, or rate of change, of one or more engagement components with respect to a content item. As such, a high velocity may be associated with a popular or quickly-disseminating content item. Identification of such content items may be useful to a user for a variety of reasons.

Figure 11:
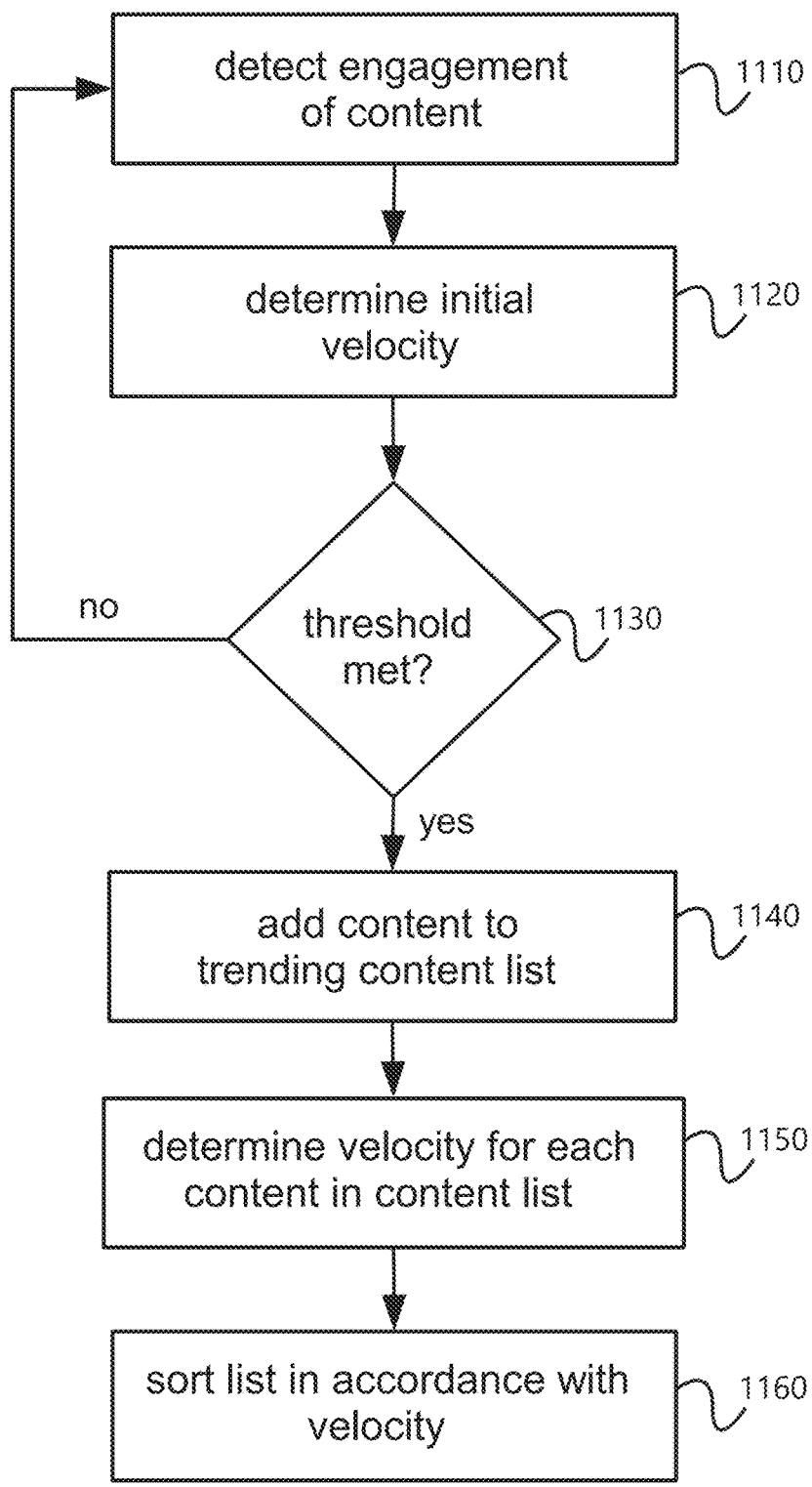
FIG. 11 depicts some aspects of an illustrative embodiment of a method as described herein.

FIG. 11 depicts one illustrative embodiment of a method for determining the velocity associated with a content item. At step 1110, engagement of a content item may be detected. As described above, engagement may refer to any interaction that a member of a social media platform may have with a content item published via a social media profile maintained by an asset.

In one embodiment, detection of an engagement of a content item may be based, at least in part, on data retrieved from one or more social media platforms by the host server. The retrieved data may be transmitted to any one or more of a data retrieval module, a streaming module, a supplemental data module, or an assessment module, as described above with respect to FIG. 4. Any or all of these modules may be further configured to detect a new engagement not previously retrieved from the one or more social media platforms.

Upon detection of a new engagement with respect to a content item, an initial velocity for that content item may be determined at step 1120. In one embodiment, the initial velocity for a content item may be determined by the total number of engagements to-date, with respect to that content item, divided by the period of time that may have lapsed since the content item was initially published via the respective social media profile. In some embodiments, the period of time that may lapsed since the content item was initially published may be considered in terms of seconds, microseconds, minutes, hours, or days. Of course, these units of time are only illustrative of the possibilities.

In one example, where a new engagement, for example a re-tweet, is detected with respect to a content item published via a respective social media profile on the TWITTER platform, the host server may retrieve information indicative of the total number of engagements associated with that content item to-date. Such information may be retrieved from the TWITTER social media platform or it may be stored in a database associated with the host server. The total number of engagements associated with the content to-date may reflect a running total of, for example, all re-tweets, favorites, mentions, and hashtag mentions, as well as any keyword matches within a public conversation associated with the content item since the content item was first published. This total number of engagements may then be divided by the time that may lapsed since the content item was published, for example x seconds. The resulting quotient may represent the current or initial velocity associated with the content item.

At step 1130, this current or initial velocity may be compared to a threshold velocity. In one embodiment, the threshold velocity may be some predetermined velocity value above which a content item may be said to be "trending" or otherwise quickly disseminating over the respective social media platform. For example, the threshold may be y number of engagements per second. It should be noted, however, that the threshold may be any suitable number of engagements over any suitable period of time.

Where the current or initial velocity of the content item is below the threshold, no further immediate action may be necessary with respect to the content item until another new engagement is detected. Upon detection of a new engagement associated with the content item, the aforementioned process may repeat itself, beginning with step 1110.

On the other hand, where the current or initial velocity of the content item is above the threshold, the content item may be transmitted or otherwise written to a list of trending content at step 1140. In one embodiment, the list of trending content may comprise one or more content items, each associated with a velocity deemed reflective of relatively quickly disseminating content. The list of trending content may be maintained in a database associated with host server, or within storage associated with any module of the host server, including but not limited to, the assessment module or the presentation module.

At step 1150, upon the addition of the content item to the trending content list, the present velocity of each content item on the trending content list may be determined. In one embodiment, the velocity associated with each content item on the trending content list may be determined in a fashion substantially similar to the method employed for determining the initial velocity of a content item at step 1120. In other words, for each content item in the trending content list, a total number of engagements to-date may be determined and that number may be divided by the time that may have lapsed since the content was first published.

After a present velocity has been determined for each content item in the trending content list, the list may be sorted based, at least in part, on the respective velocity determinations. In this manner, content associated with the highest velocity may be presented at the top of the trending content list and content associated with the lowest velocity may be presented at the bottom of the trending content list.

In one aspect, as content gains traction over a social media platform, its associated velocity may increase and, assuming the velocity associated with the content item was greater than a predetermined threshold, that content item may rise within the trending content list. Conversely, as content grows stale and/or loses traction within a social media platform, its associated velocity may decrease and that content item may fall within the trending content list. Further details regarding the content list, including how the list may be presented to a user within a GUI, are described below with respect to FIGS. 12-17.

Figure 12:
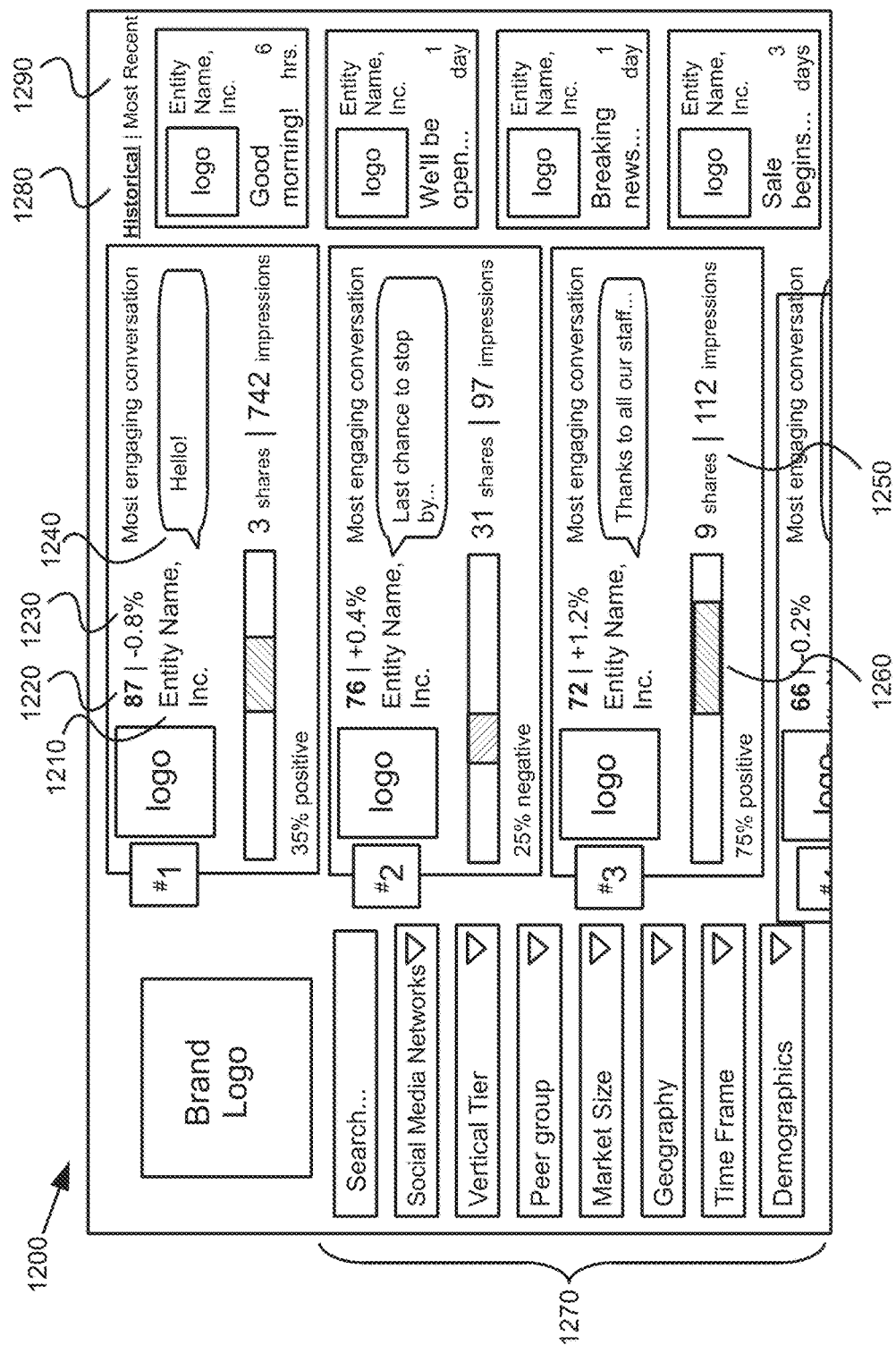
FIG. 12 depicts some aspects of an illustrative graphical user interface as described herein.

FIG. 12 depicts an illustrative embodiment of a GUI 1200 for presenting social media performance assessment and/or score rankings to a user. In one aspect, one or more assets 1210 may be presented and/or ranked in ascending or descending order based, at least in part, on their respective social media performance assessments 1220. In one embodiment, in addition to information identifying each asset and corresponding performance information, information 1230 indicative of any recent change in an assessment over a predetermined time period, such as an hour, day, or week, may also be presented. Of course, these predetermined time periods are only illustrative and a recent change in an assessment may be determined based on any reasonable or desirable time period.

In another aspect, information 1240 identifying the most engaging social media content items associated with each asset may be presented. In one embodiment, the social media content may be content placed on a social media platform by the asset. Alternatively, the social media content may reflect a conversation started by an entity or platform member other than the asset, but otherwise associated with the asset, e.g., the asset may be mentioned by name in the conversation. Ancillary information 1250 pertaining to the most engaging social media content for each asset may also be presented. In some embodiments, the original content and/or a most recent engagement with the original content may be presented. Additionally or alternatively, further information indicating how members of a social media platform have interacted with the most engaging social media content may be displayed. For example, information may be displayed indicating how many members have viewed the content and/or how many members have engaged the content. Of course, additional or alternative information indicative of members' interactions with the content may also be displayed and the aforementioned examples are not intended to be exhaustive of the possibilities.

In a further aspect, information 1260 indicative of a sentiment surrounding each presented asset may be displayed. In one embodiment, social media content associated with each asset may be analyzed over a predetermined time period and it may be determined whether the general sentiment surrounding the content is favorable or unfavorable, and to what extent. Sentiment may be determined through analysis of text, keywords, or character strings associated with the content item and/or asset. Systems and methods for analyzing social media content and calculating a sentiment associated with the content are known, and any such system or method is suitable for use in the GUI described herein.

A user presented with data reflective of an asset's performance assessment within the content of a peer group, the assessments of one or more entities within the peer group, information indicative of any recent changes in the assessments, and/or the sentiment surrounding content items associated with each asset or entity may gain an appreciation not only for how the asset's social media performance currently compares to its peers, but whether the asset is engaging in behavior likely to result in a future rise or fall in performance with respect to the peer group. A user may also appreciate, apart from an asset's performance assessment, whether the asset's recent efforts are outperforming or underperforming those of its peers.

In another aspect of the GUI presented in FIG. 12, one or more drop-down menus or selectable filters 1270 may be presented to the user for manipulation. These filters may correspond, in some embodiments, to information tagged or otherwise associated with one or more assets, entities, social media profiles, and/or peer groups. Information tagging is discussed in more detail above with respect to FIG. 4. Moreover, because a user may select or otherwise determine the types of information with which to tag one or more assets, entities, social media profiles, and/or peer groups, the user may also select or otherwise determine the types of corresponding filters are displayed within the GUI. For example, where a user elects not to tag any assets, entities, social media profiles, and/or peer groups with geographic data, or otherwise indicates that geographic considerations are unimportant, a geographic filter may not be present or displayed within the GUI.

In one embodiment, a user of the GUI may select from which social media platforms data is to be analyzed and/or presented. A user may further select a tier within a peer group for which the user desires to receive information and/or a subset of entities within a tier. Moreover, each the options available in any one or more menus may be responsive to input received at another. For example a user's selection within a "vertical tier" drop-down menu or filter may have an effect on the options available under the "peer group" drop-down menu or filter.

Additional drop-down menus or filters may also be present for limiting and/or refining the presented assessment information. For example, using a market size drop-down menu or filter, a user may be able to select between a "small," "mid-size," "large" and/or "mega" market. Alternatively, a user may be able to select all markets or a subset of markets. In this manner, the user may dynamically define a peer group within which an asset may be assessed.

A user may further define a peer group using geographic filters. For example, a user may limit a peer group to entities located in the same country, time zone, state, zip code, county, school zone, or voting precinct. The user may also select no geographic restraints. Of course, other geographic restraints are also possible and the aforementioned list is only illustrative of the possibilities.

In a further aspect, the user may also select a time frame over which to collect and analyze social media data. The time frames may be, for example, a minute, an hour, a day, a week, or a month. Of course, these examples are only illustrative and other suitable time frame may be possible, including but not limited to a real-time stream of all available data that may or may not include all or a subset of historical data. In any such embodiments, and as described above in more detail, different time intervals within the selected time frame may be weighted in some suitable fashion. For example, more recent activity may be weighted more heavily than relatively old or stale activity. Using the selectable time frames in this manner, in instances where the impact of an event, report, story, or activity is of particular interest, a user may select a time frame such that only data collected since the occurrence of the event, report, story, or activity may be analyzed and/or presented within the GUI.

A user may also be afforded an opportunity to define a demographic subset of social media users from which to analyze and/or present assessment information. For example, a user may be interested in an asset's social media performance and that of its peers among a particular demographic such as, for example, men between 25 and 50 years old or women over 50 years old.

Using any combination of the one or more filters 1270, a user may define, re-define, or customize a peer group and/or the presented assessment information to best suit the user's needs. For example, the user may view relatively high-level performance assessments for a large or loosely defined peer group by applying few if any filters, or the user may view relatively micro-level assessments corresponding to a narrowly tailored peer group by applying a number or all of the available filters.

GUI 1200 may further present information indicative of a "Historical" record 1280. Among other things, this feature may present information pertaining to each presented asset indicative of: (1) the asset's identity; (2) the asset's current assessment rank within its peer group; (3) the asset's highest rank to-date; (4) the date on which the asset achieved its highest rank; (5) the date on which the asset first entered the ranking; and/or (6) the number of places the asset has risen or fallen since any preceding assessments were conducted. Of course, these examples only illustrative of the possibilities and any other useful or desirable data may also be presented within the Historical record.

Figure 13:
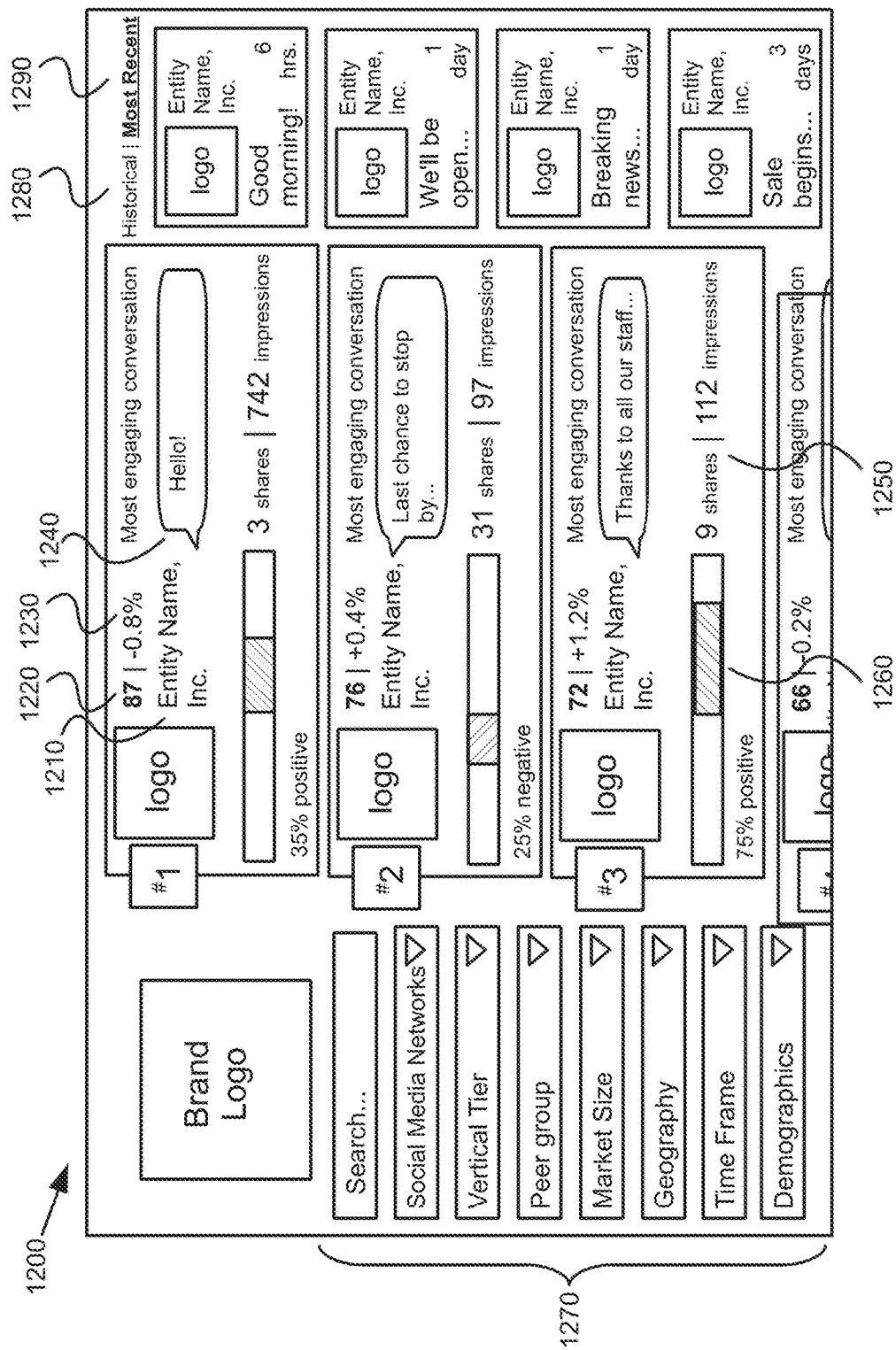
FIG. 13 depicts some aspects of an illustrative graphical user interface as described herein.

In some embodiments of the GUI, such as the embodiment depicted in FIG. 13, a "Most Recent" record 1290 may be displayed or presented. This record may comprise a list of the most recent social media activity of all assets for which assessment data is presented within the GUI. This listing may be presented in ascending or descending order, and may provide a user with information regarding which assets have most recently been active within a social media platform. Among other things, this feature may present information pertaining to: (1) an asset's identity; (2) the time elapsed since the asset's most recent social media activity; and/or (3) information indicative of the content associated with the asset's most recent social media activity. Of course, these examples are only illustrative of the possibilities and any other useful or desirable data may also be presented within the Most Recent record.

Figure 14:
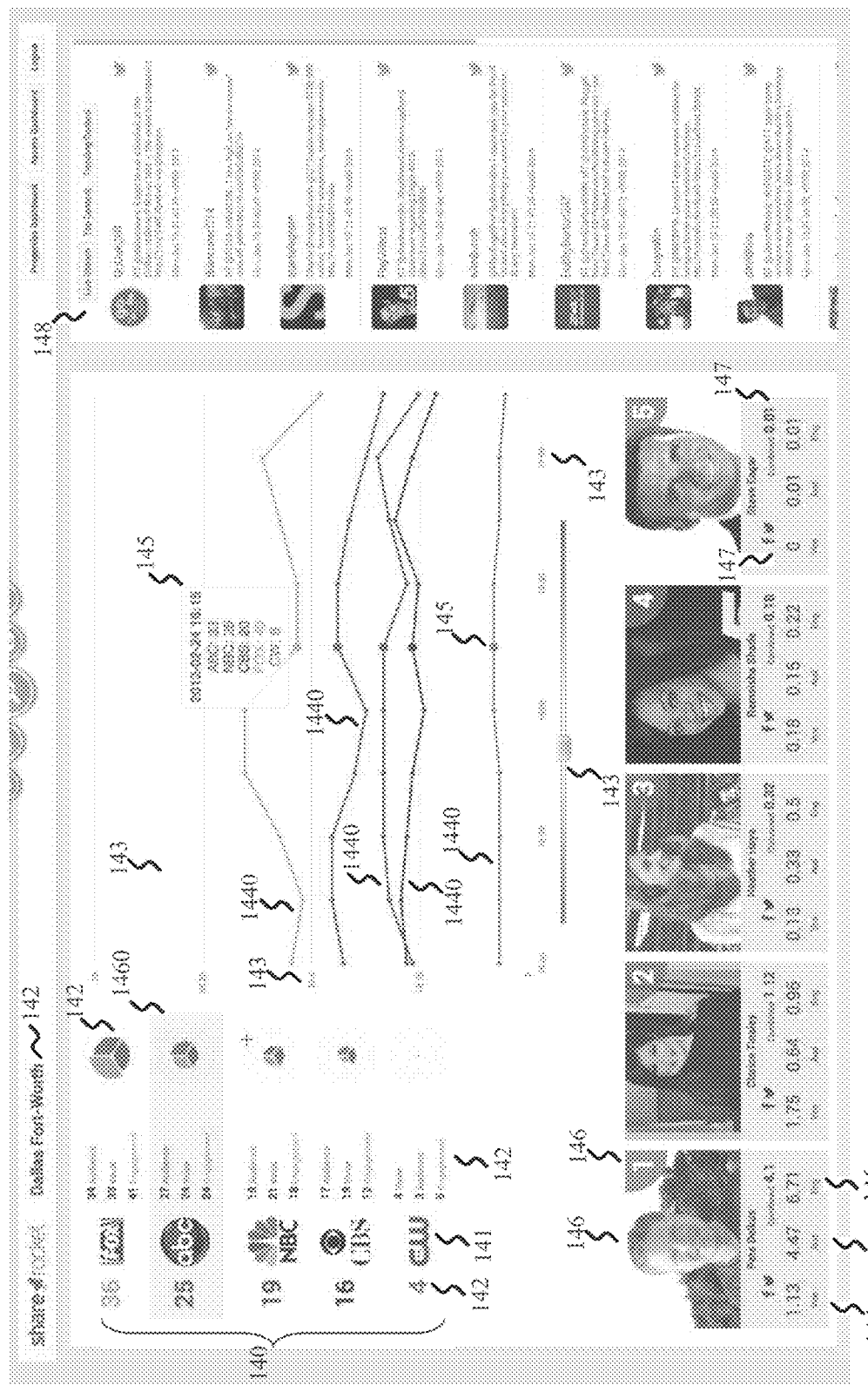
FIG. 14 depicts some aspects of an illustrative graphical user interface as described herein.

FIG. 14 depicts another illustrative embodiment of a GUI for presenting social media performance assessment information to a user. In one embodiment, social media performance assessment information for a peer group 1405 may be presented. Peer group 1405 may comprise a plurality of assets 1410. In the depicted embodiment, peer group 1405 may comprise a plurality of television networks. In alternative embodiments, however, peer group 1405 may comprise a plurality of any type of entities.

In one aspect, performance assessment information may accompany each asset 1410 within peer group 1405. In one embodiment, the performance assessment information may comprise performance assessment share information 1420 and performance assessment composite information 1422. Systems and methods for determining the share information 1420 and composite information 1422 is described above.

In another aspect, the share information may comprise any one or more of a share of audience, a share of voice, a share of engagement, and a share of reach associated with each asset 1410 within peer group 1405. In one embodiment, the share information 1420 may further comprise a graphical representation 1424 of share information. For example, graphical representation 1424 may graphically depict any one of the share of audience, voice, engagement, or reach associated with an asset 1410. In further embodiments, the overall size of graphical representation 1424 may reflect the market size of peer group 1405 or the market size of a corresponding asset 1410. Market or filter information 1426 substantially similar to that described with respect to FIGS. 12 and 13 may also be displayed within the GUI.

In a further aspect, the GUI depicted in FIG. 14 may comprise a chart 1430 graphically depicting the performance assessments of each asset 1410 in peer group 1405 over time. In one embodiment, chart 1430 may comprise a line graph depicting performance assessments 1432 along a y-axis over time 1434 along an x-axis. Moreover, a user may navigate to different time frames using an element 1436 of the GUI. Of course, other charts or graphical representations of performance assessment information pertaining to one or more entities may also be presented, and chart 1430 is only illustrative of one possibility.

In particular, performance assessment information may be charted for each asset 1410, represented by lines 1440*a*, 1440*b*, 1440*c*, 1440*d*, and 1440*e*, respectively. More detailed information regarding performance assessment information at a selected time may also be depicted at chart 1430. For example, a user may select a point 1452 in time at which to view performance assessment information 1450 corresponding to each asset 1410. Performance assessment information 1450 may comprise any type of assessment information corresponding to point 1452 in time, including but not limited to, composite information, share information, and comparative score information.

In one aspect, not only may assessment information be presented for each asset 1410 within peer group 1405, but performance assessment information may be presented for associated assets belonging to lower or higher tiers of peer group 1405. In one embodiment, one or more assets 1410 may be selected from peer group 1405 (a selection may be indicated by the grayed out area 1460*a* surrounding the ABC asset in FIG. 14). One or more associated assets 1460 belonging to a higher or lower tier of peer group 1405, and associated with any selected assets 1410, may then be presented. In this manner, a user may simultaneously view performance assessment information pertaining to multiple tiers of a peer group or an industry as a whole. Such a multi-tier view affords the user a great deal of context within which to assess the performance of one or more assets, and intuitively decipher how the social media performance of one or more assets within a first tier of a peer group may affect the social media performance of one or more assets within another tier of the peer group.

These one or more associated assets 1460 may represent assets whose primary social media profiles were taken into consideration when assessing the social media performance of an asset 1410 of peer group 1405. In such an embodiment, the one or more associated assets 1460 may represent their own peer group (i.e., a plurality of assets, each of which contributes to the social media performance of an asset 1410.)

In one embodiment, performance assessment information may accompany each of the associated assets 1460 and reflect the social media performance of those associated assets 1460. For example, one associated asset may be accompanied by a composite score rank information 1462 indicative of where the respective associated asset ranks among its peer group with respect to social media performance. As discussed above, the composite score rank may be based on various composite scores, including but not limited to, a percentile score, a T-score, or a share assessment.

Alternatively, or additionally, each associated asset 1460 may be presented in conjunction with share information 1464, 1466, 1468 comprising any one or more of a share of audience, a share of voice, a share of engagement, and a share of reach for each associated asset 1460. Additional composite score information 1470 may also be presented, upon which rank information 1462 may be based.

In a further embodiment, each associated asset may be further accompanied by an indicator 1472 indicating one or more social media platforms from which data may have been retrieved and/or analyzed for assessing the performance of the respective associated asset 1460.

In another aspect, the GUI depicted in FIG. 14 may further comprise a list of social media content items 1480. In one embodiment, the content items may be content items published to one or more social media platforms by any one or more of assets 1410. In an alternative embodiment, the content items may be content items published by any one or more of associated assets 1460. In other embodiments, the content items may be content items published by any or more of a combination of assets 1410 and associated assets 1460.

Among other things, the list of content items 1480 may present information comprising: (1) information identifying the asset that published the respective content; (2) information identifying the social media platform at which the content was published; (3) the published content or a portion thereof; (4) the time and/or date on which the content was published; and/or (5) a link for accessing additional information associated with each content item. Of course, these examples only illustrative of the possibilities and any other useful or desirable data may also be presented within the list of content items 1480.

In a further aspect, content list 1480 may comprise a plurality of selectable lists (selectable using, for example, tabs at the top of content list 1480). In one embodiment, content list 1480 may comprise, for example, a "live stream" list, a "top content" list, and/or a "trending content" list. A live stream list may comprise a list of content items as they are published over one or more social media platforms. Such a list may be updated in real-time, as content items publish, or as new content items are retrieved from the one or more social media servers. In a further embodiment, the newest or most recently published content items may appear at the top of the list, while older content items move progressively further down the list as new content items appear.

A top content list may, among other things, rank content items based on one or more criteria. For instance, content items retrieved from the one or more social media servers may be ranked according to any one or more of their respective audience, voice, engagement, reach, influence, or impact. As an example, content items at the top of the list may reflect those content items with the highest engagement (as described above). As additional data may be retrieved from the one or more social media platforms, whether in real-time or otherwise, engagement information may be updated with respect to each content item and the top content list may be updated accordingly.

Similarly, a trending content list may, among other things, rank content items based on one or more criteria. In one embodiment, content items presented in the trending content list may be ranked based, at least in part, on the velocity associated with each content item. Systems and methods for determining a velocity associated with a content item are presented in more detail above. Content items at the top of the trending content list may represent those content items associated with the highest velocity, while the content items lower on the list may be associated with progressively lower velocity. As additional data may be retrieved from the one or more social media platforms, whether in real-time or otherwise, the velocity associated with each content item may be updated and the trending content list may be updated accordingly.

Figure 15:
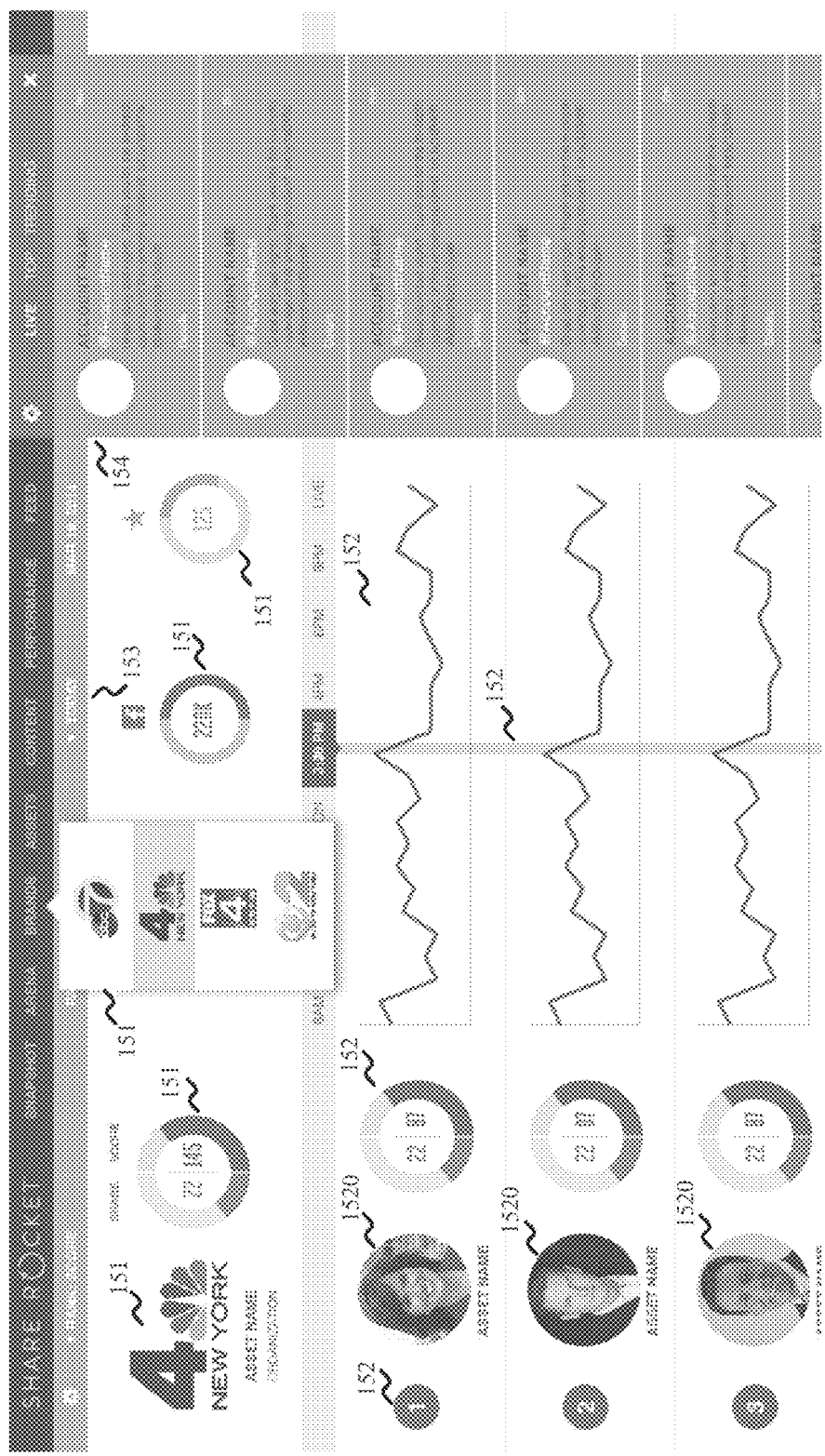
FIG. 15 depicts some aspects of an illustrative graphical user interface as described herein.

FIG. 15 depicts another illustrative embodiment of a GUI for the presentation of social media performance assessment information. Like the GUI depicted in FIG. 14, the GUI depicted in FIG. 15 may display multi-tier information, i.e., assessment information pertaining to one or more assets belonging to different tiers within a peer group or an industry/marketplace.

In one aspect, an asset 1510 may be identified and presented in conjunction with performance assessment information 1512, 1514, and 1516. In one embodiment, assessment information 1512 may reflect one or more composite scores associated with asset 1510, including but not limited to, a composite share score, a composite T-score, and/or a composite percentile score. Assessment information 1514 and 1516, on the other hand, may reflect social media platform-specific information, such as but not limited to, one or more of a composite share score, a composite T-score, and/or a composite percentile score with respect to a specific social media platform. Selection or identification of asset 1510 may be performed, among other ways, using a drop-down menu or filter 1518. In one embodiment, selection of an asset filter such as 1518 may present a list of one or more assets within a common tier of a peer group. An asset to be featured within the GUI may then be selected from filter 1518 (here, as an example, New York Channel 4 has been highlighted and/or selected).

In another aspect, associated assets 1520a, 1520b, and 1520c may be presented in the GUI in conjunction with assessment information associated with each respective associated asset. As described above with respect to FIG. 14, associated assets 1520a, 1520b, and 1520c may represent assets within the same peer group, but belonging to a different tier, as compared to asset 1510. For example, assets 1520a, 1520b, and 1520c may be assets the social media performance of which affect (or otherwise taken into consideration when determining) the social media performance of asset 1510. In the particular embodiment depicted, asset 1510 may be a local news station (e.g., New York Channel 4) and assets 1520*a*, 1520*b*, and 1520*c* may be television personalities or news anchors appearing on the local news station.

In conjunction with each associated asset, performance assessment information pertaining to the respective asset may be presented. In one embodiment, each associated asset may be presented in conjunction with rank information 1522, score information 1524, and/or an assessment graph 1526.

In one embodiment, rank information 1522 indicative of where an associated asset ranks among its peer group with respect to social media performance may be presented for one or more associated assets. As discussed above, the rank information may be based, at least in part, on any performance assessment information, including but not limited to a composite score. In further embodiments, such a composite score may be based, at least in part, on any one or more of a percentile score, a T-score, or a share assessment/score. Moreover, each associated asset may be displayed in a list sorted in accordance with its corresponding rank within a peer group.

Score information 1524 may represent any suitable assessment information pertaining to an associated asset. For example, score information 1524 may comprise any one or more of a composite score, such as a composite percentile score, a composite T-score, or a composite share assessment/score. Additionally, or alternatively, score information 1524 may comprise any one or more aspects of a composite score, including but not limited to, an audience, voice, engagement, and/or reach associated with the respective asset. Score information 1524 may also comprise influence or impact assessment information.

In another aspect, in addition to presenting rank information 1522 and score information 1524, the GUI may also comprise a graph 1526 reflecting assessment information for a corresponding asset over time. The assessment information represented within the graph may be any suitable assessment information, including but not limited to, a composite percentile score, a composite T-score, a composite share assessment/score, audience assessment information, voice assessment information, engagement assessment information, reach assessment information, influence assessment information, and/or impact assessment information. In one embodiment, as was the case with the GUI described with respect to FIG. 14, a time 1528 within graph 1526 may be selected by the user in order to present a "snapshot" of assessment information at that time. Moreover, the time frame represented in graph 1526 may be shortened or lengthened using a drop-down menu or filter 1530. In one embodiment, selection of filter 1530 may bring up one or more selectable time frames over which to display data at graph 1526. For example, filter 1530 may comprise an hour time frame, a day time frame, a week time frame, a month time frame, a year time frame, and/or an all-time time frame. It should be noted, however, that these examples are only illustrative of the possibilities, and any suitable time frame may be included in filter 1530.

It may be appreciated that using a GUI such as the GUI depicted in FIG. 15, not only may a user view social media performance data associated with asset 1510, but the user may also gain an understanding of which associated assets within a peer group or hierarchical structure are bolstering or hindering the social media performance of asset 1510. Moreover, a user may understand whether each such associated asset's performance is trending upward or downward. In one embodiment, an associated asset's score information 1524 may comprise a plurality of score types, and each may be based on a unique time frame. For example, score information 1524 may comprise both a composite percentile score and a composite share assessment score. In particular, the composite percentile score may take into consideration social media data collected over a longer time period than the data upon which the share assessment score is based. In this manner, the user may be presented with one score (e.g., a composite percentile score) reflective of an asset's social media performance established over a relatively long time period and a second score (e.g., a share assessment score) reflective of more recent social media performance. Viewing the two scores simultaneously may facilitate a determination as to the direction in which the asset's social media performance may be trending. The same multi-time frame scoring assessments may also be displayed with respect to asset 1510. Of course, these examples of the types of information that may be interpreted from viewing the GUI of FIG. 15 are only illustrative, and a user may derive many other insights from the GUI.

In another aspect, the GUI depicted in FIG. 15 may further comprise a list of social media content items 1540. In one embodiment, the content items may be content items published to one or more social media platforms by asset 1510. In an alternative embodiment, the content items may be content items published by any one or more of associated assets 1520*a*, 1520*b*, 1520*c*. In other embodiments, the content items may be content items published by any or more of a combination of asset 1510 and associated assets 1520*a*, 1520*b*, 1520*c*.

Among other things, the list of content items 1540 may present information comprising: (1) information identifying the asset that published the respective content; (2) information identifying the social media platform at which the content was published; (3) the published content or a portion thereof; and (4) the time and/or date on which the content was published (or some indication as to how long ago the content was published). Of course, these examples only illustrative of the possibilities and any other useful or desirable data may also be presented within the list of content items 1540.

In a further aspect, and like content list 1480 described with respect to FIG. 14, content list 1540 may comprise a plurality of selectable lists (selectable using, for example, tabs at the top of content list 1540). In one embodiment, content list 1540 may comprise, for example, a "live stream" list, a "top content" list, and/or a "trending content" list. In one embodiment, these lists may be substantially similar to those described above with respect to content list 1480. In alternative embodiments, these lists may incorporate additional, fewer, or alternative features as compared to the corresponding lists described above with respect to content list 1480.

Figure 16:
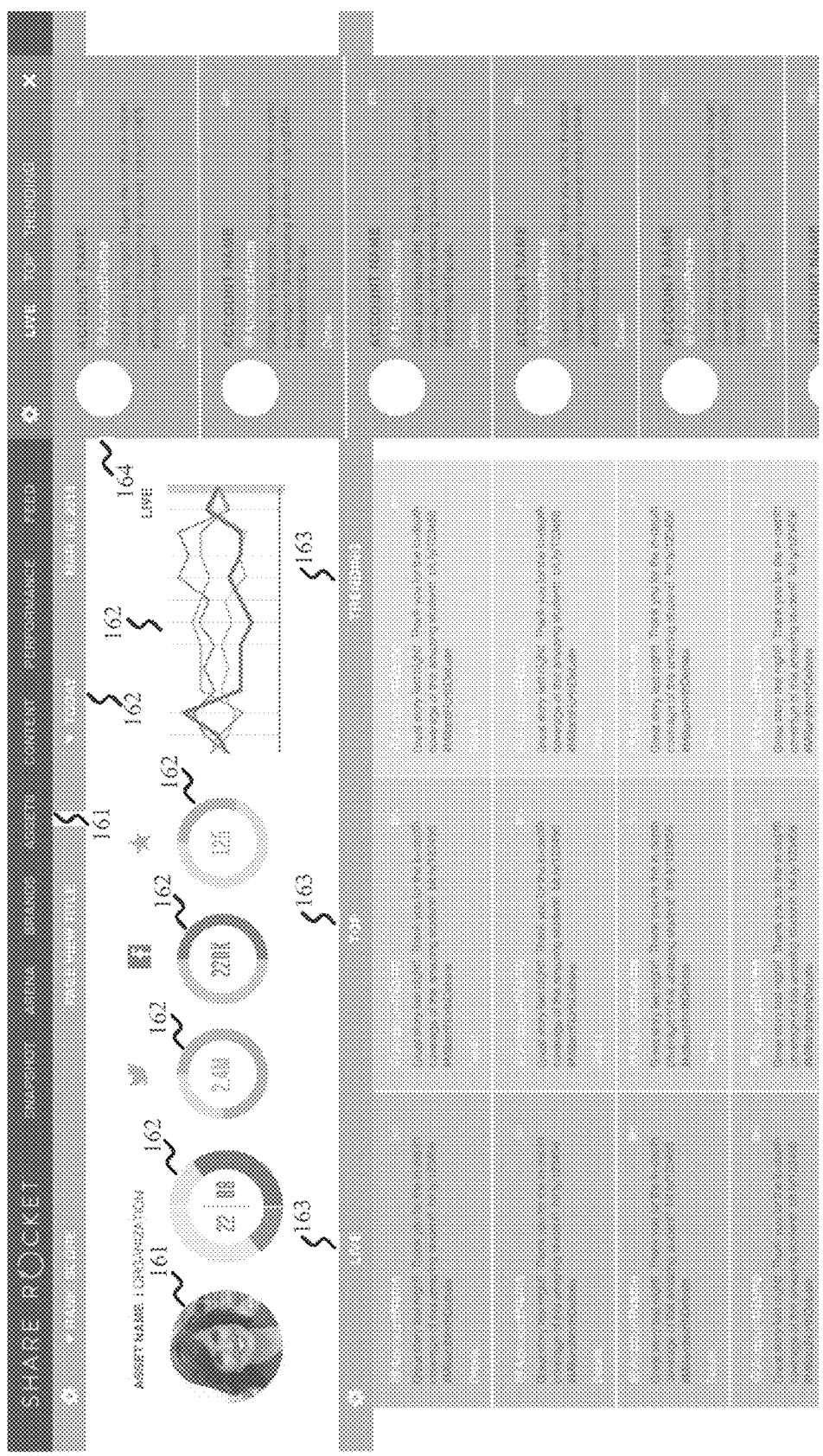
FIG. 16 depicts some aspects of an illustrative graphical user interface as described herein.

FIG. 16 depicts another illustrative embodiment of a GUI for the presentation of social media performance assessment information. In one aspect, the GUI depicted in FIG. 16 may display detailed assessment information associated with an asset 1610. In one embodiment, asset 1610 may be identified and presented in conjunction with performance assessment information 1620, 1622, 1624, and 1626. Assessment information 1620 may represent, among other things, one or more composite scores associated with asset 1610, including but not limited to, a composite share score, a composite T-score, and/or a composite percentile score. Additionally, or alternatively, assessment information 1620 may comprise any one or more aspects of a composite score, including but not limited to, an audience, voice, engagement, and/or reach associated with asset 1610. Assessment information 1620 may also comprise influence or impact assessment information.

Rank information identifying a rank associated with asset 1610 within a peer group may also be presented at assessment information 1620. As discussed above, any such rank information may be based, at least in part, on any performance assessment information, including but not limited to a composite score. Such a composite score may be based, at least in part, on any one or more of a percentile score, a T-score, or a share assessment/score.

In another aspect, assessment information 1622, 1624, and 1626 may reflect social media platform-specific information, such as but not limited to, one or more of a composite share score, a composite T-score, and/or a composite percentile score with respect to a specific social media platform. Selection or identification of asset 1610 may be performed, among other ways, using a drop-down menu or filter 1612. In one embodiment, selection of an asset filter such as 1612 may present a list of one or more assets within a common tier of a peer group. An asset to be featured within the GUI may then be selected from filter 1612.

In a further aspect, the GUI may also comprise an assessment graph 1628 reflecting assessment information associated with asset 1610 over time. The assessment information represented within the graph may be any suitable assessment information, including but not limited to, a composite percentile score, a composite T-score, a composite share assessment/score, audience assessment information, voice assessment information, engagement assessment information, reach assessment information, influence assessment information, and/or impact assessment information. In the embodiment depicted in FIG. 16, social media platform-specific assessment information may be represented at graph 1628, such that a user may determine how asset 1610 is performing on each social media platform with respect to the others.

In a further embodiment, as was the case with the GUI described with respect to FIGS. 14 and 15, a particular time within graph 1628 may be selected by the user in order to present a "snapshot" of assessment information at that time. Moreover, the time frame represented in graph 1628 may be shortened or lengthened using a drop-down menu or filter 1629. In one embodiment, selection of filter 1629 may bring up one or more selectable time frames over which to display data at graph 1628. For example, filter 1629 may comprise an hour time frame, a day time frame, a week time frame, a month time frame, a year time frame, and/or an all-time time frame. It should be noted, however, that these examples are only illustrative of the possibilities, and any suitable time frame may be included in filter 1629.

In one aspect, the GUI may further comprise asset-specific content lists, including but not limited to, a "live stream" list 1630, a "top content" list 1632, and a "trending content" list 1634. In one embodiment, asset-specific, live stream list 1630 may comprise a list of content items published by the asset, the content items appearing on the list as they are published over one or more social media platforms. Such a list may be updated in real-time, as content items publish, or as new content items are retrieved from the one or more social media servers at predetermined intervals. In a further embodiment, the newest or most recently published content items may appear at the top of the list, while older content items may move progressively further down the list as new content items appear. Each content item within the live stream list may also comprise additional details regarding the content item, including but not limited to, an indication of when the content item was published, all or a portion of the content, and/or a link to additional information associated with the content item.

Asset-specific, top content list 1632 may, among other things, rank content items published by asset 1610 based on one or more criteria. For instance, content items retrieved from the one or more social media servers may be ranked according to any one or more of their respective audience, voice, engagement, reach, influence, or impact. As an example, content items at the top of the list may reflect those content items published by asset 1610 associated with the highest engagement (as described above). As additional data may be retrieved from the one or more social media platforms, whether in real-time or otherwise, engagement information (or other criteria used) may be updated with respect to each content item and the asset-specific, top content list may be updated accordingly. Each content item within the asset-specific, top content list may also comprise additional details regarding the content item, including but not limited to, an indication of when the content item was initially published, all or a portion of the content, and/or a link to additional information associated with the content item.

Similarly, asset-specific, trending content list 1634 may, among other things, rank content items published by asset 1610 based on one or more criteria. In one embodiment, content items presented in the trending content list may be ranked based, at least in part, on the velocity associated with each content item. Systems and methods for determining a velocity associated with a content item are presented in more detail above. Content items at the top of the trending content list may represent those content items published by asset 1610 that may be associated with the highest velocity, while the content items lower on the list may be associated with progressively lower velocity. As additional data may be retrieved from the one or more social media platforms, whether in real-time or otherwise, the velocity associated with each content item published by asset 1610 may be updated and the trending content list may be updated accordingly.

In another aspect, the GUI depicted in FIG. 16 may further comprise a list of social media content items 1640. In one embodiment, the content items may be content items published to one or more social media platforms by asset 1640, as well as other entities within asset 1640's peer group. Thus, while lists 1630, 1632, and 1634 may reflect content items and social media activity specific to asset 1610, content list 1640 may reflect content items and social media activity within the asset's peer group.

Among other things, the list of content items 1540 may present information comprising: (1) information identifying the asset that published the respective content; (2) information identifying the social media platform at which the content was published; (3) the published content or a portion thereof; and (4) the time and/or date on which the content was published (or some indication as to how long ago the content was published). Of course, these examples only illustrative of the possibilities and any other useful or desirable data may also be presented within content list 1640.

In a further aspect, and like the content lists described above with respect to FIGS. 14 and 15, content list 1640 may comprise a plurality of selectable lists (selectable using, for example, tabs at the top of content list 1640). In one embodiment, content list 1640 may comprise, for example, a "live stream" list, a "top content" list, and/or a "trending content" list. In one embodiment, these lists may be substantially similar to those described above with respect to content lists 1480 and 1540. In alternative embodiments, these lists may incorporate additional, fewer, or alternative features as compared to the corresponding lists described above with respect to content lists 1480 and 1540.

Figure 17:
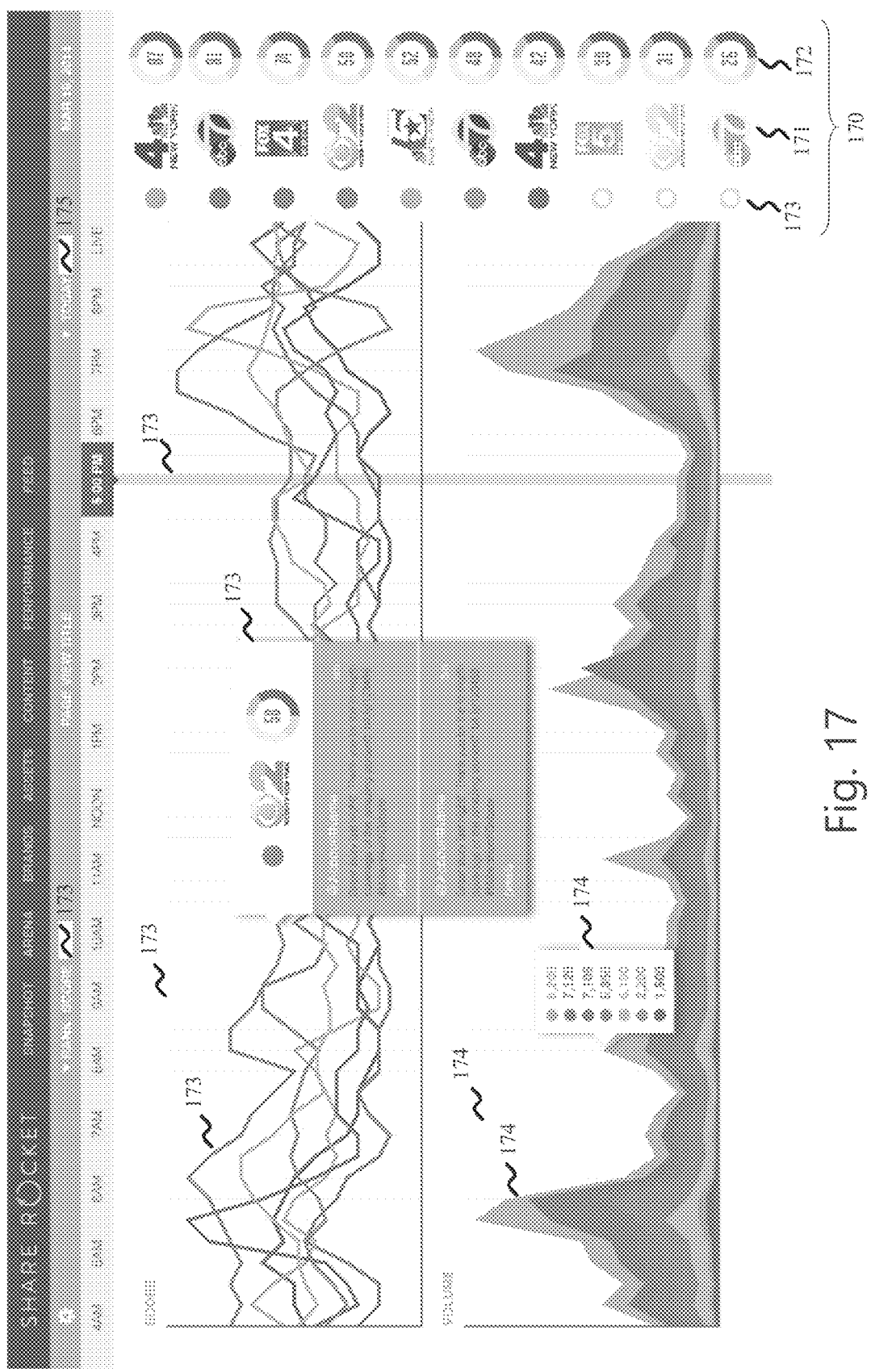
FIG. 17 depicts some aspects of an illustrative graphical user interface as described herein.

FIG. 17 depicts another illustrative embodiment of a GUI for presenting social media performance assessment information to a user. In one embodiment, social media performance assessment information for a peer group 1705 may be presented. The peer group may comprise a plurality of assets 1710. In the embodiment depicted in FIG. 17, assets 1710 may comprise a plurality of television networks. In alternative embodiments, however, assets 1710 may comprise a plurality of any type of entities.

In one aspect, performance assessment information may accompany each asset 1710 within peer group 1705. In one embodiment, the performance assessment information may comprise performance assessment information 1720 and performance assessment graphs 1730 and 1740. Assessment information 1720 may represent, among other things, one or more composite scores associated with each corresponding asset 1710, including but not limited to, a composite share score, a composite T-score, and/or a composite percentile score. Additionally, or alternatively, assessment information 1720 may comprise any one or more aspects of a composite score, including but not limited to, an audience, voice, engagement, and/or reach associated with asset 1710. Assessment information 1720 may also comprise influence or impact assessment information.

Rank information identifying a rank associated with each asset 1710 within peer group 1705 may also be presented at assessment information 1720. As discussed above, any such rank information may be based, at least in part, on any performance assessment information, including but not limited to a composite score. In further embodiments, such a composite score may be based, at least in part, on any one or more of a percentile score, a T-score, or a share assessment/score.

In another aspect, the GUI may also comprise assessment graphs 1730 and 1740 reflecting performance assessment information associated with each of assets 1710 over time. In one embodiment, the assessment information represented within graph 1730 for each asset 1710 may be any suitable assessment information, including but not limited to, a composite percentile score, a composite T-score, a composite share assessment/score, audience assessment information, voice assessment information, engagement assessment information, reach assessment information, influence assessment information, and/or impact assessment information associated with each asset. In particular, the type of assessment information presented in graph 1730 may be selected by a user using, for example, a drop-down menu or filter 1732.

In one embodiment, graph 1730 may comprise a line graph depicting performance assessment information. In particular, performance assessment information within graph 1730 may be represented by a plurality of lines 1734, each line corresponding to performance assessment information for one of the assets 1710. In one embodiment, each of the plurality of lines is color-coded to a corresponding indicator 1736 associated with each of the assets 1710. Of course, other graphs, charts, or graphical representations of performance assessment information pertaining to assets 1710 may also be presented, and graph 1730 is only illustrative of one possibility.

More detailed information regarding performance assessment information at a selected time may also be depicted at graph 1730. For example, a user may select a point in time 1736 at which to view a snapshot of performance assessment information 1738 associated with one or more assets 1710. Performance assessment information 1738 may comprise any type of assessment information corresponding to time 1736, including but not limited to, composite information, share information, comparative score information, and/or any aspect thereof.

In the embodiment depicted at FIG. 17, assessment information 1738 may comprise asset-specific information, i.e., assessment information specific to one of the assets 1710 within peer group 1705 (as shown, assessment information 1738 may depict assessment information associated with a CBS Channel 2 television station). Assessment information 1738 may comprise any additional or suitable assessment information, including but not limited to, a composite percentile score, a composite T-score, a composite share assessment/score, audience assessment information, voice assessment information, engagement assessment information, reach assessment information, influence assessment information, and/or impact assessment information. Assessment information 1738 may further include content items associated with an asset at time 1736. The content items may comprise, among other things: (1) information identifying an asset that published the respective content; (2) information identifying the social media platform at which the content was published; (3) the published content or a portion thereof; (4) the time and/or date on which the content was published (or an amount of time that may have lapsed since the content was published; and/or (5) a link for accessing additional information associated with each content item. Of course, these examples are only illustrative of the possibilities and any other useful or desirable data may be presented within the content items.

In another aspect, the GUI may comprise graph 1740. In one embodiment, graph 1740 may convey any previously-described assessment information associated with any one or more of assets 1710, including but not limited to, a composite percentile score, a composite T-score, a composite share assessment/score, audience assessment information, voice assessment information, engagement assessment information, reach assessment information, influence assessment information, and/or impact assessment information associated with each asset. In particular, like the information presented in graph 1730, the type of assessment information presented in graph 1740 may be selected by a user using, for example, a drop-down menu or filter 1732. In one embodiment, the type of information presented in graph 1740 may be specified independent of the type of information presented in graph 1730. In an alternative embodiment, specifying a particular type of information for presentation in one of graphs 1730 and 1740 may automatically determine the type of information to be presented in the other graph.

As shown in FIG. 17, graph 1740 may also comprise a graph depicting the volume of some aspect of social media activity associated with assets 1710. The aspect depicted may be any suitable aspect described previously herein, including but not limited to an audience, voice, engagement, or reach associated with each of assets 1710.

Moreover, where a user has selected a time 1736 overlaying both graphs 1730 and 1740, more detailed information 1744 regarding the depicted performance assessment information within graph 1740 at time 1736 may be displayed. For example, detailed information 1744 may present a snapshot of the volume for some aspect of social media activity associated with assets 1710 at time 1736.

In a further aspect, a time frame represented in graphs 1730 and 1740 may be shortened or lengthened using a drop-down menu or filter 1750. In one embodiment, selection of filter 1750 may bring up one or more selectable time frames over which to display data at graphs 1730 and 1740. For example, filter 1750 may comprise an hour time frame, a day time frame, a week time frame, a month time frame, a year time frame, and/or an all-time time frame. It should be noted, however, that these examples are only illustrative of the possibilities, and any suitable time frame may be included in filter 1750.

Additional features may also be incorporated into the described systems and methods to improve their functionality. For example, systems and/or methods may be devised for allowing a user to input rules for identifying both good social media performance and poor social media performance. Such rules may be based on any one or more of the social media performance assessment information, scoring, or ranking described herein. In one embodiment, excellent social media performance may trigger a congratulatory alert to the one or more assets associated with the social media performance. Alternatively, poor social media performance may trigger an alter to the one or more assets associated with the social media performance, informing those assets as to the performance assessment(s) and/or recommending steps that may be taken to improve future performance.

The systems and method described herein may also be used to survey the social media performance of a plurality of assets across an industry. Such a survey may then be used to benchmark an asset's social media performance against that of the industry and/or develop best practices for improving social media performance.

Other embodiments of the aforementioned systems and methods will be apparent to those skilled in the art from consideration of the specification and practice of this disclosure. It is intended that the specification and examples be considered as illustrative only, with the true scope and spirit of the disclosure being indicated by the following claims.

What is claimed is:

1. A non-transitory, computer readable medium containing instructions that, when executed by a processor, performs a method comprising:
    identifying an asset;
    associating a first subset of social media profiles with the asset;
    identifying a peer group comprising a plurality of entities, the plurality of entities comprising the asset;
    associating a second subset of social media profiles with the peer group, the second subset of social media profiles comprising the first subset of social media profiles;
    deriving profile performance information for each of the second subset of social media profiles;
    assigning a weight to the profile performance information for each of the second subset of social media profiles, the profile performance information for at least two of the second subset of social media profiles being assigned different weights, the weight assigned to the profile performance information of a respective social media profile being indicative of an ability of the profile performance information of the respective social media profile to affect the profile performance information of one or more of the first subset of social media profiles;
    deriving asset performance information based, at least in part, on the weighted profile performance information corresponding to each of the second subset of social media profiles;
    determining a share assessment associated with the asset based, at least in part, on the asset performance information and the profile performance information for each of the second subset of social media profiles; and
    displaying the share assessment associated with the asset.

2. The non-transitory, computer readable medium of claim 1, wherein the profile performance information for each of the second subset of social media profiles comprises one or more components corresponding to one or more aspects of social media performance.

3. The non-transitory, computer readable medium of claim 2, wherein determining the share assessment associated with the asset further comprises:
    determining peer group performance information based, at least in part, on the profile performance information for each of the second subset of social media profiles; and
    comparing the asset performance information with the peer group performance information.

4. The non-transitory, computer readable medium of claim 3, wherein the share assessment associated with the asset is indicative of a portion of the peer group's social media performance attributable to the asset's social media performance.

5. The non-transitory, computer readable medium of claim 4, wherein the peer group performance information and the asset performance information each comprise one or more components corresponding to the one or more aspects of social media performance.

6. The non-transitory, computer readable medium of claim 5, wherein the one or more components of the peer group performance information and the asset performance information correspond to the one or more components of the profile performance information for each of the second subset of social media profiles.

7. The non-transitory, computer readable medium of claim 6, wherein the one or more aspects of social media performance comprise an audience aspect, a voice aspect, an engagement aspect, and a reach aspect.

8. A method for assessing social media performance, the method comprising:
    identifying an asset and a peer group to which the asset belongs;
    associating the asset with a first plurality of social media profiles and the peer group with a second plurality of social media profiles, the second plurality of social media profiles comprising the first plurality of social media profiles;
    retrieving data from a social media platform, the data associated with each of the second plurality of social media profiles;
    assessing a profile performance for each of the second plurality of social media profiles based, at least in part, on the data retrieved from the social media platform;
    assigning a weight to the profile performance for each of the second plurality of social media profiles, the profile performance for at least two of the second plurality of social media profiles being assigned different weights, the weight assigned to the profile performance of a respective social media profile being indicative of an ability of the profile performance of the respective social media profile to affect the profile performance of one or more of the first plurality of social media profiles;

determining asset performance information based, at least in part, on the weighted profile performance corresponding to each of the second plurality of social media profiles;

determining a share assessment associated with the asset based, at least in part, on the asset performance information and the profile performance for each of the second plurality of social media profiles; and displaying the share assessment associated with the asset.

9. The method of claim 8, wherein determining the share assessment module further comprises:

determining peer group performance information based, at least in part, on the profile performance for each of the second plurality of social media profiles; and comparing the asset performance information to the peer group performance information.

10. The method of claim 9, wherein the share assessment associated with the asset is indicative of a portion of the peer group's social media performance attributable to the asset.

11. The method of claim 9, wherein the peer group is defined based, at least in part, on an input by a user.

12. The method of claim 9, further comprising determining entity performance for each member of the peer group based, at least in part, on the profile performance for each of the second plurality of social media profiles.

13. The method of claim 12, further comprising determining a share assessment associated with each member of the peer group based, at least in part, on the entity performance associated with the member.

14. The method of claim 13, further comprising simultaneously displaying the share assessment associated with the asset and the share assessment associated with one or more members of the peer group.

15. The method of claim 13, wherein determining the entity performance for each member of the peer group comprises assigning unique weights, different from first weights, to the profile performance corresponding to each of the second plurality of social media profiles.

16. The method of claim 9, wherein determining the peer group performance information comprises assigning a different weight to the profile performance corresponding to each of the second plurality of social media profiles.

17. A non-transitory, computer-readable medium containing instructions that, when executed by a processor, performs a method comprising:

identifying an asset and a plurality of peer group members, the peer group members belonging to a peer group comprising the asset;

associating the peer group with a plurality of social media profiles;

deriving profile performance information for each of the plurality of social media profiles;

assigning a weight to the profile performance information for each of the plurality of social media profiles, the profile performance information for at least two of the plurality of social media profiles being assigned different weights, the weight assigned to the profile performance information of a respective social media profile being indicative of an ability of the profile performance information of the respective social media profile to influence the profile performance information of one or more of a subset of social media profiles controlled by the asset;

determining asset performance information based, at least in part, on the weighted profile performance information for each of the plurality of social media profiles;

determining a share assessment for the asset based, at least in part, on the asset performance information and the profile performance information for each of the plurality of social media profiles; and displaying the share assessment for the asset.

18. The non-transitory, computer-readable medium of claim 17, further comprising determining a share assessment for each of the plurality of peer group members based, at least in part, on the profile performance information for each of the plurality of social media profiles.

* * * * *